(12) United States Patent
Kusudou et al.

(10) Patent No.: US 11,155,062 B2
(45) Date of Patent: Oct. 26, 2021

(54) INTERLAYER FILM FOR LAMINATED GLASS AND LAMINATED GLASS

(71) Applicant: KURARAY CO., LTD., Kurashiki (JP)

(72) Inventors: Takeshi Kusudou, Kurashiki (JP);
Takuya Kobayashi, Kurashiki (JP);
Taiga Yui, Kurashiki (JP); Mitsunori Asada, Kurashiki (JP); Yohei Kamata, Kurashiki (JP); Koichiro Isoue, Kurashiki (JP)

(73) Assignee: KURARAY CO., LTD., Kurashiki (JP)

( * ) Notice: Subject to any disclaimer, the term of this patent is extended or adjusted under 35 U.S.C. 154(b) by 464 days.

(21) Appl. No.: 15/525,515

(22) PCT Filed: Nov. 10, 2015

(86) PCT No.: PCT/JP2015/081665
§ 371 (c)(1),
(2) Date: May 9, 2017

(87) PCT Pub. No.: WO2016/076337
PCT Pub. Date: May 19, 2016

(65) Prior Publication Data
US 2018/0290439 A1    Oct. 11, 2018

(30) Foreign Application Priority Data

Nov. 10, 2014  (JP) .............................. JP2014-228354
Dec. 5, 2014   (JP) .............................. JP2014-246710

(51) Int. Cl.
*B32B 17/10*   (2006.01)
*E06B 3/67*    (2006.01)
(Continued)

(52) U.S. Cl.
CPC .. *B32B 17/10165* (2013.01); *B32B 17/10036* (2013.01); *B32B 17/1055* (2013.01);
(Continued)

(58) Field of Classification Search
CPC . B32B 25/08; B32B 25/042; B32B 2309/105; B32B 2605/006; E06B 3/66;
(Continued)

(56) References Cited

U.S. PATENT DOCUMENTS 4,668,574 A * 5/1987 Bolton ................... B32B 15/04
                                                     428/339
2001/0039310 A1  11/2001 Nomura et al.
(Continued)

FOREIGN PATENT DOCUMENTS

CN    102574379 A    7/2012
CN    102575080 A    7/2012
(Continued)

OTHER PUBLICATIONS

Lu et al, "Syn. of Difunct. Org. Lithium Compound as Initiator for the Poly. of Styrene/Butadiene/Isoprene-Styrene Triblock Copolymer," 2006, Wiley Periodicals, vol. 100, pp. 1395-1406 (Year: 2006).*

(Continued)

*Primary Examiner* — Maria V Ewald
*Assistant Examiner* — Ethan Weydemeyer
(74) *Attorney, Agent, or Firm* — Oblon, McClelland, Maier & Neustadt, L.L.P.

(57) ABSTRACT

The present invention provides an interlayer film for laminated glass which has excellent sound insulating properties even when the thickness is reduced, and also has a low degree of orientation and low shrinkability.
The invention relates to an interlayer film for laminated glass which includes at least one layer A containing a thermoplastic elastomer, wherein the thermoplastic elastomer includes a hard segment block and a soft segment block, the layer A has a sea-island phase separated structure in which the hard segment block is included as an island (Continued)

component and the soft segment block is included as a sea component, and the degree of orientation (1) defined by (maximum intensity value−minimum intensity value)/ (maximum intensity value+minimum intensity value) based on the maximum intensity value and the minimum intensity value in an arbitrary azimuth range of 180° including the azimuth at which the intensity reaches the maximum in the azimuthal intensity distribution of periodic scattering or coherent scattering by the hard segment block or the soft segment block obtained for the layer A by small-angle X-ray scattering measurement is 0.9 or less.

23 Claims, 9 Drawing Sheets

(51) Int. Cl.
 *E06B 3/66* (2006.01)
 *B32B 25/08* (2006.01)
 *B60J 1/00* (2006.01)
 B32B 25/04 (2006.01)
 B60J 1/02 (2006.01)
 B60J 1/08 (2006.01)
 B60J 1/18 (2006.01)
 B60J 7/043 (2006.01)
(52) U.S. Cl.
 CPC .... *B32B 17/1077* (2013.01); *B32B 17/10559* (2013.01); *B32B 17/10577* (2013.01); *B32B 17/10587* (2013.01); *B32B 17/10605* (2013.01); *B32B 17/10724* (2013.01); *B32B 17/10743* (2013.01); *B32B 17/10761* (2013.01); *B32B 17/10788* (2013.01); *B32B 25/08* (2013.01); *B60J 1/001* (2013.01); *E06B 3/66* (2013.01); *E06B 3/6707* (2013.01); *E06B 3/6715* (2013.01); *B32B 25/042* (2013.01); *B32B 2307/102* (2013.01); *B32B 2307/30* (2013.01); *B32B 2307/412* (2013.01); *B32B 2307/542* (2013.01); *B32B 2307/734* (2013.01); *B32B 2309/105* (2013.01); *B32B 2605/006* (2013.01); *B60J 1/02* (2013.01); *B60J 1/08* (2013.01); *B60J 1/18* (2013.01); *B60J 7/043* (2013.01)
(58) Field of Classification Search
 CPC ...... E06B 3/6707; E06B 3/6715; B60J 1/001; B60J 1/02; B60J 1/08; B60J 1/18; B60J 7/043
 USPC .................................................. 522/184, 186
 See application file for complete search history.

(56) References Cited

U.S. PATENT DOCUMENTS

| | | |
|---|---|---|
| 2004/0242721 A1 | 12/2004 | Muyldermans et al. |
| 2006/0008658 A1 | 1/2006 | Fukatani et al. |
| 2008/0280116 A1 | 11/2008 | Fukatani et al. |
| 2010/0209716 A1 | 8/2010 | Fukatani et al. |
| 2010/0227135 A1 | 9/2010 | Takagi et al. |
| 2011/0049434 A1 | 3/2011 | Ootsuki et al. |
| 2011/0143116 A1* | 6/2011 | Chung ................... B82Y 30/00 428/220 |
| 2011/0195295 A1* | 8/2011 | Manago .................... B32B 5/18 429/145 |
| 2012/0162752 A1 | 6/2012 | Kitano et al. |
| 2012/0164457 A1 | 6/2012 | Fukatani et al. |
| 2012/0202070 A1 | 8/2012 | Asanuma et al. |
| 2012/0204940 A1 | 8/2012 | Asanuma et al. |
| 2013/0157069 A1* | 6/2013 | Minamide ............... C08L 23/10 428/451 |
| 2013/0194659 A1* | 8/2013 | Hatta ................ B32B 17/10678 359/361 |
| 2013/0323515 A1 | 12/2013 | Okabayashi et al. |
| 2015/0104654 A1 | 4/2015 | Kohara et al. |
| 2015/0267012 A1 | 9/2015 | Tarutani et al. |
| 2015/0329750 A1 | 11/2015 | Ishiguro et al. |

FOREIGN PATENT DOCUMENTS

| | | |
|---|---|---|
| CN | 102625786 A | 8/2012 |
| CN | 104797653 A | 7/2015 |
| JP | 61-247646 A | 11/1986 |
| JP | 62-116140 A | 5/1987 |
| JP | 9-30846 A | 2/1997 |
| JP | 2001-294450 A | 10/2001 |
| JP | 2002-503627 A | 2/2002 |
| JP | 2004-175593 A | 6/2004 |
| JP | 2007-39278 A | 2/2007 |
| JP | 2007-91 491 A | 4/2007 |
| JP | 2007-91491 A | 4/2007 |
| JP | 2009-45874 A | 3/2009 |
| JP | 2009-256128 A | 11/2009 |
| JP | 2011-42552 A | 3/2011 |
| JP | 2011-240676 A | 12/2011 |
| JP | 2012-6406 A | 1/2012 |
| JP | 2013-6725 A | 1/2013 |
| JP | 2013-141800 A | 7/2013 |
| JP | 2013-224257 A | 10/2013 |
| JP | 2014-58409 A | 4/2014 |
| JP | 5469287 B1 | 4/2014 |
| WO | 2005/018969 A1 | 3/2005 |
| WO | 2010/055731 A1 | 5/2010 |
| WO | WO 2011/016494 A1 | 2/2011 |
| WO | WO 2011/016945 A1 | 2/2011 |
| WO | WO 2011/024787 A1 | 3/2011 |
| WO | WO 2011/024788 A1 | 3/2011 |
| WO | WO 2012/108537 A1 | 8/2012 |
| WO | WO 2013/176258 A1 | 11/2013 |
| WO | 2014/061669 A1 | 4/2014 |

OTHER PUBLICATIONS

Office Action dated Jan. 8, 2019 in corresponding Japanese Patent Application No. 2015-220812 (with English Translation), 6 pages.
Office Action dated Jan. 29, 2019 in corresponding Japanese Patent Application No. 2015-220814 (with English Translation), 8 pages.
Combined Chinese Office Action and Search Report dated Mar. 4, 2019 in Patent Application No. 201580061149.3 (with partial English translation and English translation of categories of cited documents), 12 pages.
Guo Hongxia, "The Structure. Properties and Applications of Wire and Cable Materials " China Machine Press, 1st edition, Jul. 2012, pp. 234-237.
Japanese Office Action dated Jul. 9, 2019 in Japanese Patent Application No. 2015-220812 (with unedited computer generated English translation), 9 pages.
International Search Report dated Jan. 26, 2016 in PCT/JP2015/ 081665 filed Nov. 10, 2015.
Notice of Opposition issued Dec. 7, 2017 in Japanese Patent Application No. 2017-701154 (with partial English language translation), 101 pages.
Notification of Reasons for Revocation dated Apr. 3, 2018 in Japanese Patent Application No. 2017-701154 (with partial English language translation) 6 pages.
Extended European Search Report dated Jun. 6, 2018 in Patent Application No. 15858658.6 6 pages.
Japanese Office Action dated Oct. 27, 2020 in Japanese Patent Application No. 2019-205658 (with unedited computer generated English translation), 11 pages.
Office Action in corresponding European Patent Application No. 15858658.6 dated May 14, 2021.
Japanese Office Action dated Oct. 15, 2019, in Patent Application No. 2015-220813, 9 pages (with unedited computer generated English translation).

(56) References Cited

OTHER PUBLICATIONS

Combined Chinese Office Action and Search Report dated Oct. 22, 2019 in corresponding Chinese Patent Application No. 201580061149.3 (with English Translation and English Translation of Category of Cited Documents), 20 pages.

Sun Wen-qian et al., "Design and Fabrication of Aluminum Alloy Doors and Windows", China Electric Power Publishing House, 1st Edition, Apr. 2013, pp. 88-89, 91-92 and cover pages.

\* cited by examiner

INTERLAYER FILM FOR LAMINATED GLASS AND LAMINATED GLASS

TECHNICAL FIELD

The present invention relates to an interlayer film for laminated glass and a laminated glass which have excellent sound insulating properties, a low degree of orientation, and reduced shrinkability.

BACKGROUND ART

Conventionally, in the case where construction with glass is carried out in a place requiring sound insulation such as windows, a method in which a sound insulating effect is increased by increasing the thickness of the glass to increase the weight, or a method in which a sound insulating effect is increased by using a laminated glass in which two or more glass plates and an interlayer film are laminated has been carried out. In the latter method using an interlayer film, the sound insulating properties of the glass are improved by the damping performance of the interlayer film and the performance of the interlayer film for converting vibrational energy to thermal energy.

As a method for improving the sound insulating properties, an interlayer film in which a copolymer of polystyrene and a rubber-based resin is laminated with a plasticized polyvinyl acetal-based resin has been proposed (see, for example, PTL 1). However, according to this proposal, the bending strength is not sufficient, and there is a room for further improvement in order to apply the proposal to a place where an external load has an influence such as a glass building material for construction or a sunroof or a rear window of a car.

Further, an interlayer film for laminated glass and a laminated glass which are composed of polyvinyl butyral and have certain impact resistance and sound insulating properties have been proposed (see, for example, PTL 2). However, according to this proposal, the bending strength is not sufficient, and there is a room for further improvement in order to apply the proposal to a place where an external load has an influence such as a glass building material for construction or a sunroof or a rear window of a car.

Further, recently, from the viewpoint of energy saving, the improvement of fuel efficiency of cars and the like has become a bigger issue. Examples of a method for improving fuel efficiency of cars and the like include a device to suppress the use of an air conditioner, and a device to reduce the weight of a car.

Examples of the device to suppress the use of an air conditioner include a method of using a laminated glass which has high heat shielding properties capable of suppressing an increase in the temperature in a car as the glass of a car. Examples of the device to reduce the weight of a car include a method of reducing the weight of a laminated glass itself.

In the case where the weight of a laminated glass itself is reduced, it is necessary to reduce the thickness of the laminated glass. However, a conventional laminated glass has a problem that the sound insulating properties are deteriorated by reducing the thickness.

As a method for producing a laminated glass having favorable sound insulating properties, a method for producing a laminated glass including forming an interlayer film having a three-layer structure by sandwiching a layer containing a copolymer of styrene and a rubber-based resin monomer between layers containing a thermally adhesive resin and laminating the interlayer film with two or more glasses (see, for example, PTL 3) and a method for producing a laminated glass using a laminate having improved adhesiveness between layers by laminating a layer A containing a polyvinyl acetal and a layer B containing a polyolefin (see, for example, PTL 4) have been proposed.

CITATION LIST

Patent Literature

PTL 1: JP-A-2007-91491
PTL 2: WO 2005/018969
PTL 3: JP-A-2009-256128
PTL 4: JP-A-2012-006406

SUMMARY OF INVENTION

Technical Problem

The invention solves the above problems and has its object to provide an interlayer film for laminated glass which has excellent sound insulating properties even when the thickness is reduced, and also has low shrinkability, and a laminated glass using the same.

Solution to Problem

As a result of intensive studies for achieving the above object, the present inventors found that the phase separation size of an island component is sometimes increased in a layer to be used in an interlayer film for laminated glass, and therefore, the interlayer film for laminated glass shrinks when producing a laminated glass or the haze of the laminated glass is decreased, and also found that a laminated glass using an interlayer film for laminated glass having a specific structure has excellent sound insulating properties even when the thickness is reduced and also has low shrinkability.

That is, the invention relates to an interlayer film for laminated glass including at least one layer A containing a thermoplastic elastomer, wherein the thermoplastic elastomer includes a hard segment block and a soft segment block, the layer A has a sea-island phase separated structure in which the hard segment block is included as an island component and the soft segment block is included as a sea component, and when the degree of orientation (1) is defined by the following formula (i) based on the maximum intensity value and the minimum intensity value in an arbitrary azimuth range of 180° including the azimuth at which the intensity reaches the maximum in the azimuthal intensity distribution of periodic scattering or coherent scattering by the hard segment block or the soft segment block obtained for the layer A by small-angle X-ray scattering measurement, the degree of orientation (1) is 0.9 or less.

[Math. 1]

$$\text{Degree of orientation (1)} = (\text{maximum intensity value} - \text{minimum intensity value})/(\text{maximum intensity value} + \text{minimum intensity value}) \quad (i)$$

It is preferred that the invention is further directed to the interlayer film for laminated glass, wherein when the degree of orientation (2) is defined by the following formula (ii), the degree of orientation (2) is 10 or less.

[Math. 2]

$$\text{Degree of orientation (2)} = \text{maximum intensity value} / \text{minimum intensity value} \qquad (ii)$$

It is preferred that the invention is further directed to the interlayer film for laminated glass, wherein when an island component having a largest major axis size is selected from the island components having a substantially elliptical shape or a substantially continuous linear shape in each phase image obtained by observation with an atomic force microscope of a region in the range of 200 nm×200 nm at arbitrary 5 sites on a sliced surface obtained by slicing a central area in the thickness direction of the layer A along a plane substantially parallel to the layer A, the average of the major axis size of the selected island components is 100 nm or less.

It is preferred that the invention is further directed to the interlayer film for laminated glass, wherein a laminated glass in which the interlayer film for laminated glass is sandwiched between two glasses has a birefringence phase difference of 0 to 140 nm.

It is preferred that the invention is further directed to the interlayer film for laminated glass, wherein the thermoplastic elastomer is a hydrogenated product of a block copolymer having a polymer block (a) containing 60 mol or more of an aromatic vinyl monomer unit and a polymer block (b) containing 60 mol % or more of a conjugated diene monomer unit, the polymer block (b) contains 50 mol % or more in total of an isoprene unit and a butadiene unit as the conjugated diene monomer unit, and the amount of residual carbon-carbon double bonds derived from the conjugated diene monomer unit is from 2 to 40 mol %.

It is preferred that the invention is further directed to the interlayer film for laminated glass, wherein the content of the hard segment block in the thermoplastic elastomer is less than 20 mass %.

It is preferred that the invention is further directed to the interlayer film for laminated glass, wherein the peak maximum in tan δ of the layer A as measured by performing a dynamic viscoelasticity test at a frequency of 1,000 Hz in accordance with ASTM D4065-06 appears in the range of −10 to 30° C.

It is preferred that the invention is further directed to the interlayer film for laminated glass, wherein the peak maximum in tan δ of the layer A as measured by performing a dynamic viscoelasticity test at a frequency of 1,000 Hz in accordance with ASTM D4065-06 is preferably 1.3 or more, and is 1.5 or more.

It is preferred that the invention is further directed to the interlayer film for laminated glass, wherein a layer B containing a thermoplastic resin is provided on at least one surface of the layer A.

It is preferred that the invention is further directed to the interlayer film for laminated glass, wherein the content of a plasticizer in the layer B is 50 parts by mass or less with respect to 100 parts by mass of the thermoplastic resin.

It is preferred that the invention is further directed to the interlayer film for laminated glass, wherein the thermoplastic resin in the layer B is a polyvinyl acetal.

It is preferred that the invention is further directed to the interlayer film for laminated glass, wherein the thermoplastic resin in the layer B is an ionomer.

It is preferred that the invention is further directed to the interlayer film for laminated glass, wherein a laminated glass in which the interlayer film is sandwiched between two glasses with the total thickness of the glasses being 4 mm or less has a sound transmission loss at 4,000 Hz as measured under the conditions of ASTM E 90-09 of 37 dB or more.

It is preferred that the invention is further directed to the interlayer film for laminated glass, wherein the hard segment block is a polystyrene block or a polymethyl methacrylate block.

It is preferred that the invention is further directed to the interlayer film for laminated glass, wherein a heat shielding material is contained in at least one of the layers constituting the interlayer film for laminated glass.

It is preferred that the invention is further directed to the interlayer film for laminated glass, wherein a laminated glass in which the interlayer film for laminated glass is sandwiched between two clear glasses with the total thickness of the clear glasses being 4 mm or less has a visible light transmittance of 70% or more and an average transmittance of infrared light in the wavelength range of 800 to 1,100 nm of 70% or less.

It is preferred that the invention is further directed to the interlayer film for laminated glass, wherein a laminated glass formed by sandwiching the interlayer film for laminated glass between two green glasses with the total thickness of the green glasses being 4 mm or less has a visible light transmittance of 70% or more and an average transmittance of infrared light in the wavelength range of 800 to 1,100 nm of 32% or less.

It is preferred that the invention is further directed to the interlayer film for laminated glass, wherein the heat shielding material is at least one material selected from tin-doped indium oxide, antimony-doped tin oxide, zinc antimonate, metal-doped tungsten oxide, a phthalocyanine compound, aluminum-doped zinc oxide, and lanthanum hexaboride.

It is preferred that the invention is further directed to the interlayer film for laminated glass, wherein the metal-doped tungsten oxide is cesium-doped tungsten oxide.

It is preferred that the invention is further directed to the interlayer film for laminated glass, wherein a heat shielding material is contained in at least one of the layer A and the layer B.

It is preferred that the invention is further directed to the interlayer film for laminated glass, wherein a UV absorber is contained in at least the layer B.

It is preferred that the invention is further directed to the interlayer film for laminated glass, wherein the UV absorber contains at least one compound selected from the group consisting of a benzotriazole-based compound, a benzophenone-based compound, a triazine-based compound, a benzoate-based compound, a malonic ester-based compound, and an oxalic anilide-based compound.

It is preferred that the invention is further directed to the interlayer film for laminated glass, wherein a laminated glass in which the interlayer film is sandwiched between two glasses with the total thickness of the glasses being 4 mm or less has a haze of 5 or less.

The invention relates to a laminated glass, including the above-mentioned interlayer film for laminated glass disposed between two glasses.

Advantageous Effects of Invention

According to the invention, an interlayer film for laminated glass and a laminated glass which have excellent sound insulating properties even when the thickness is reduced, and also have low shrinkability can be provided.

DESCRIPTION OF EMBODIMENTS

Figure 1:
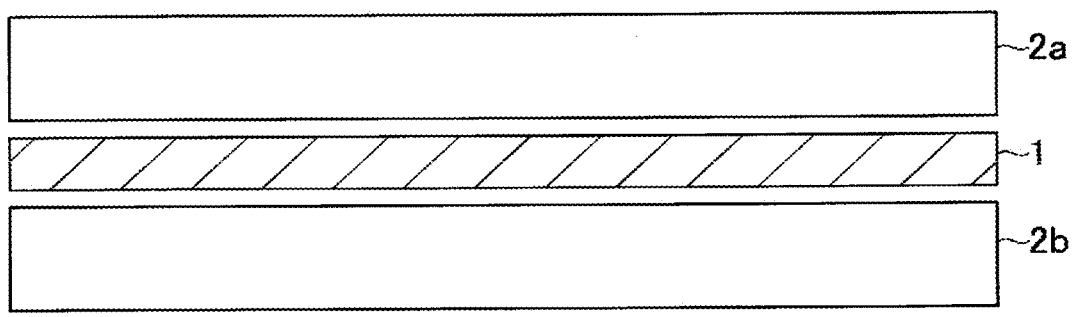
FIG. 1 is an exemplary cross-sectional view of the structure of an interlayer film for laminated glass.

Hereinafter, embodiments of the invention will be described, however, the invention is not limited to the embodiments.

[Layer A]

The invention is directed to an interlayer film for laminated glass including at least one layer A containing a thermoplastic elastomer, wherein the thermoplastic elastomer includes a hard segment block and a soft segment block. Further, in the layer A of the interlayer film for laminated glass of the invention, the thermoplastic elastomer has a sea-island phase separated structure in which the hard segment block is included as an island component and the soft segment block is included as a sea component.

The compatibility between the hard segment block and the soft segment block is not high, and therefore, in a mixed state, these blocks are separated into the phase of the hard segment block and the phase of the soft segment block to form a phase separated structure. The "sea-island phase separated structure" as used herein refers to a structure in which the phase of the hard segment block is dispersed in the phase of the soft segment block which is a continuous phase (sea component).

The layer A to be used in the invention is required to have a degree of orientation (1) as defined below within a predetermined range. The degree of orientation (1) as used herein is defined by the following formula (i) based on the maximum intensity value and the minimum intensity value in an arbitrary azimuth range of 180° including the azimuth at which the intensity reaches the maximum in the azimuthal intensity distribution of periodic scattering or coherent scattering by the hard segment block or the soft segment block obtained for the layer A by small-angle X-ray scattering measurement.

[Math. 3]

Degree of orientation (1)=(maximum intensity value−minimum intensity value)/(maximum intensity value+minimum intensity value)   (i)

The maximum intensity value tends to increase when the island components are oriented in one direction. Further, the maximum intensity value tends to decrease when the orientation of the island component is low. Due to this, from the viewpoint of obtaining an interlayer film for laminated glass having low shrinkability, it is preferred to use the layer A having a low maximum intensity value.

The minimum intensity value tends to increase when the island component is relatively small and has a shape close to a sphere. Further, the minimum intensity value tends to decrease when the island component is relatively large or when the shape of the island component is long and narrow. Due to this, from the viewpoint of obtaining an interlayer film for laminated glass having low shrinkability, it is preferred to use the layer A having a high minimum intensity value.

The maximum intensity value and the minimum intensity value can be measured by, for example, obtaining the azimuthal intensity distribution of periodic (coherent) scattering from the layer A using a small-angle X-ray scattering apparatus. Further, the periodic (coherent) scattering is observed based on the phase separated structure composed of the hard segment block and the soft segment block in the thermoplastic elastomer in the layer A.

Incidentally, the scattering intensity of the periodic (coherent) scattering from the layer A shows an intensity distribution with the maximum in an azimuth range of 180° and shows a periodic distribution with a period of 180°. Therefore, by obtaining a scattering intensity at an azimuth in an arbitrary range of 180°, the maximum intensity value and the minimum intensity value for the scattering intensity in an arbitrary azimuth range can be obtained. Further, in the case where the scattering intensity of the periodic (coherent) scattering from the layer A does not show a periodic distribution with a period of 180° due to a measurement error or the like, by obtaining a scattering intensity at an azimuth in an arbitrary range of 180° including the azimuth at which the scattering intensity reaches the maximum, the maximum intensity value and the minimum intensity value for the scattering intensity can be obtained.

The degree of orientation (1) is 0.9 or less, preferably 0.8 or less, more preferably 0.7 or less, further more preferably 0.6 or less, and particularly preferably 0.4 or less. When the degree of orientation (1) is 0.9 or less, the degree at which the island components are oriented in one direction is small, and the shrinkability is suppressed.

Examples of a method for setting the degree of orientation (1) to 0.9 or less include a method in which the content of the hard segment block in the thermoplastic elastomer is set to less than 20 mass %, and a method in which a film forming method is adjusted by adding an additive when forming the film or the like.

The degree of orientation (1) is preferably 0.01 or more, more preferably 0.05 or more, and further more preferably 0.1 or more. When the degree of orientation (1) is 0.01 or more, the heat creep resistance when a laminated glass is formed tends to be improved.

The layer A to be used in the invention preferably has a degree of orientation (2) as defined below within a predetermined range. The degree of orientation (2) as used herein is defined by the following formula (ii) based on the maximum intensity value and the minimum intensity value in an arbitrary azimuth range of 180° including the azimuth at which the intensity reaches the maximum in the azimuthal intensity distribution of periodic scattering or coherent scattering by the hard segment block or the soft segment block obtained for the layer A by small-angle X-ray scattering measurement.

[Math. 4]

$$\text{Degree of orientation (2)} = \text{maximum intensity value}/\text{minimum intensity value} \quad \text{(ii)}$$

The degree of orientation (2) is preferably 10 or less, more preferably 8 or less, further more preferably 6 or less, and particularly preferably 5 or less. When the degree of orientation (2) is 10 or less, the degree at which the island components are oriented in one direction is small, and the shrinkability tends to be suppressed.

Examples of a method for setting the degree of orientation (2) to 10 or less include a method in which the content of the hard segment block in the thermoplastic elastomer is set to less than 20 mass %.

The degree of orientation (2) is preferably 1.01 or more, more preferably 1.05 or more, and further more preferably 1.1 or more. When the degree of orientation (2) is 1.01 or more, the heat creep resistance when a laminated glass is formed tends to be improved.

The orientation distribution of the island component with respect to the azimuth is substantially the same as the distribution of the scattering intensity with respect to the azimuth, and therefore, it is preferred to make the difference between the maximum intensity value and the minimum intensity value small (for example, a difference between the maximum intensity value and the minimum intensity value is preferably 480 or less). Examples of a method for setting the difference between the maximum intensity value and the minimum intensity value to 480 or less include a method in which the content of the hard segment block in the thermoplastic elastomer is set to less than 20 mass %.

In the layer A in the interlayer film for laminated glass of the invention, when an island component having a largest major axis size is selected from the island components having a substantially elliptical shape or a substantially continuous linear shape in each phase image obtained by observation with an atomic force microscope of a region in the range of 200 nm×200 nm at arbitrary 5 sites on a sliced surface obtained by slicing a central area in the thickness direction of the layer A along a plane substantially parallel to the layer A, the average of the major axis size of the selected island components is preferably 100 nm or less.

Incidentally, the average is also referred to as the phase separation size of the layer A. Further, the above definition is deemed to be satisfied if there exists at least one combination of 5 regions in which the average of the major axis size of the selected island components is 100 nm or less.

Here, the island component having a substantially elliptical shape or a substantially continuous linear shape refers to an island component extending linearly in one direction, and is distinguished from an island component having a curved shape. The island component extending linearly in one direction such as an island component having a substantially elliptical shape or a substantially continuous linear shape affects the shrinkability. In the case where the island components are contained in a large amount, particularly, the island components having a long major axis size are contained in a large amount among the island components, the shrinkability is increased, and therefore, the interlayer film for laminated glass shrinks when producing a laminated glass, or the haze of the laminated glass is decreased.

In the layer A of the interlayer film for laminated glass of the invention, the average is preferably 100 nm or less, more preferably 90 nm or less, further more preferably 85 nm or less, and particularly preferably 80 nm or less. When the average exceeds 100 nm, the shrinkability is increased, and therefore, the interlayer film for laminated glass tends to shrink when producing a laminated glass, or the haze of the laminated glass tends to be decreased. Incidentally, the major axis size of the island component can be measured as the length of a segment from one end to the other end of the island component.

As a method for forming the layer A in which the average is 100 nm or less include a method in which the content of the hard segment block in the thermoplastic elastomer is set to less than 20 mass %.

Incidentally, in order to exclude arbitrariness when selecting the above-mentioned 5 regions, it is preferred that, for example, first, a region in the range of 1,000 nm×1,000 nm is measured, and then, a region in the range of 200 nm×200 nm at 5 sites in the region is measured again. Further, it is more preferred that a region in a smaller range, for example, a region in the range of 800 nm×800 nm is measured, and then, regions in the range of 200 nm×200 nm selected from the region are measured again than that regions in the range of 200 nm×200 nm selected from a region in the range of 1,000 nm×1,000 nm are measured again.

Incidentally, the number of regions in the range of 200 nm×200 nm to be selected may be increased, and for example, 6 regions may be selected and measured. Further, the range of the region of 200 nm×200 nm to be selected may be expanded, and for example, a region in the range of 300 nm×300 nm may be selected and measured.

Further, also by using the layer A in which the average of the major axis size of all the island components on the sliced surface is 100 nm or less, more preferably 90 nm or less, an interlayer film for laminated glass having a small phase separation size of the island component and low shrinkability can be formed. Incidentally, an approximate measurement method in which, instead of measuring the major axis size of all the island components, 5 regions in the range of 200 nm×200 nm are arbitrarily selected, and the average of the major axis size of all the island components therein is calculated may be adopted.

Further, also by using the layer A in which the ratio of the number of island components having a major axis size of 5 nm or more, more preferably 10 nm or more among the island components to the number of all the island components is 10% or more, and more preferably 20% or more, an interlayer film for laminated glass having a small phase separation size of the island component and low shrinkability can be formed. Incidentally, an approximate measurement method in which, instead of counting the number of all the island components, 5 regions in the range of 200 nm×200 nm are arbitrarily selected, and the number of island components therein is counted may be adopted.

Also in this case, in order to exclude arbitrariness when selecting the above-mentioned 5 regions, it is preferred that, for example, 5 regions in the range of 200 nm×200 nm are selected from a region in the range of 1,000 nm×1,000 nm and measured again. Further, it is more preferred that regions in the range of 200 nm×200 nm selected from a region in a smaller range, for example, a region in the range of 800 nm×800 nm are measured again than that regions in the range of 200 nm×200 nm selected from a region in the range of 1,000 nm×1,000 nm are measured again.

Similarly, the number of regions in the range of 200 nm×200 nm to be selected may be increased, and for example, 6 regions may be selected and measured again. Further, the range of the region of 200 nm×200 nm to be selected may be expanded, and for example, a region in the range of 300 nm×300 nm may be selected and measured.

It is preferred that a laminated glass in which the interlayer film for laminated glass of the invention is sandwiched between two glasses has a birefringence phase difference of 0 to 140 nm. The configuration of the layer A is important for obtaining a birefringence phase difference of 0 to 140 nm. As described above, the compatibility between the hard segment block and the soft segment block of the thermoplastic elastomer to be contained in the layer A to be used in the invention is not high, and therefore, in a mixed state, these blocks are separated into the phase of the hard segment block and the phase of the soft segment block to form a phase separated structure. As an index indicating what structure this phase separated structure is like, the birefringence phase difference of a laminated glass to be obtained can be used. It is indicated that when the birefringence phase difference falls within the above range, the orientation of the phase separated structure is small, and as a result, the interlayer film for laminated glass of the invention has low shrinkability while having excellent sound insulating properties.

The birefringence phase difference of the laminated glass is more preferably 130 nm or less, further more preferably 100 nm or less, particularly preferably 80 nm or less, and most preferably 50 nm or less. In the case where the birefringence phase difference when a laminated glass is formed is increased, particularly exceeds 140 nm, the orientation of the island component is increased to increase the shrinkability, and therefore, the interlayer film for laminated glass shrinks when producing a laminated glass, or the haze after forming the laminated glass is increased.

A polymer such as a polystyrene-based elastomer or polycarbonate having a benzene ring with high polarization anisotropy has a large intrinsic birefringence. Therefore, when a polymer with high anisotropy as described above is melted and injected into a mold, the molecules are generally likely to be oriented in the flow direction of the polymer, and therefore, the birefringence phase difference tends to be increased. Further, when the injected polymer is cooled and solidified, the polymer shrinks and residual strain occurs, and therefore, the birefringence phase difference is also increased.

Examples of a method for solving the problem as described above, that is, a method for producing an interlayer film for laminated glass in which the birefringence phase difference when a laminated glass is formed is 0 nm or more and 140 nm or less include a method using a thermoplastic elastomer in which the content of the hard segment block is less than 20 mass %, a method using a polystyrene-based elastomer in which the content of the styrene unit is less than 20 mass % as a thermoplastic elastomer, a method for producing an interlayer film for laminated glass by a melting method, and a method for producing an interlayer film for laminated glass by a melt extrusion method using a T die.

Incidentally, the birefringence phase difference when a laminated glass is formed can be measured by obtaining the polarization state distribution of the laminated glass using, for example, a wide-range birefringence evaluation system or the like.

The layer A to be used in the interlayer film for laminated glass of the invention contains a composition containing a specific thermoplastic elastomer. By constituting the layer A by the composition containing a specific thermoplastic elastomer, the sound insulating properties of the interlayer film for laminated glass to be obtained can be improved. The thermoplastic elastomer refers to a polymer compound which is softened to exhibit plasticity when heated and is solidified to exhibit rubber elasticity when cooled, and is distinguished from a thermoplastic resin.

The thermoplastic elastomer to be used in the invention is not particularly limited, however, examples thereof include thermoplastic elastomers such as a polystyrene-based elastomer (soft segment: polybutadiene, polyisoprene, or the like, hard segment: polystyrene), a polyolefin-based elastomer (soft segment: ethylene propylene rubber, hard segment: polypropylene), a polyvinyl chloride-based elastomer (soft segment: polyvinyl chloride, hard segment: polyvinyl chloride), a polyurethane-based elastomer (soft segment: polyether or polyester, hard segment: polyurethane), a polyester-based elastomer (soft segment: polyether, hard segment: polyester), a polyamide-based elastomer (soft segment: polypropylene glycol, polytetramethylene ether glycol, or polyester-based or polyether-based, hard segment: polyamide <nylon resin>), and a polybutadiene-based elastomer (soft segment: amorphous butyl rubber, hard segment: syndiotactic 1,2-polybutadiene resin). The above thermoplastic elastomers may be used alone or two or more types may be used in combination.

It is preferred to use a block polymer (block copolymer) having at least one hard segment and at least one soft segment in the thermoplastic elastomer of the invention from the viewpoint of achieving both moldability and sound insulating properties also in a thin laminated glass due to favorable rubber elasticity. Further, from the viewpoint of further improving the sound insulating properties, it is more preferred to use a thermoplastic elastomer (a styrene-based elastomer or an acrylic elastomer) in which the hard segment block is a polystyrene block or a polymethyl methacrylate block.

The content of the hard segment block in the thermoplastic elastomer is preferably less than 20 mass %, more preferably less than 19 mass %, further more preferably less than 18 mass %, and particularly preferably less than 16 mass %. When the content of the hard segment block in the thermoplastic elastomer is less than 20 mass %, the degree at which the island components are oriented in one direction is small, so that the shrinkability tends to be suppressed, and the birefringence of the thermoplastic elastomer tends to be decreased.

Further, in the thermoplastic elastomer of the invention, a rubber such as natural rubber, isoprene rubber, butadiene rubber, chloroprene rubber, nitrile rubber, butyl rubber, ethylene propylene rubber, urethane rubber, silicone rubber, chlorosulfonated polyethylene rubber, acrylic rubber, or fluororubber may be used.

It is preferred from the viewpoint of achieving both of the function as a rubber exhibiting sound insulating properties and the function as a plastic having high strength that at least one type of the thermoplastic elastomer in the invention is a block copolymer having a hard segment block such as an aromatic vinyl polymer block (hereinafter sometimes referred to as "polymer block (a)") and a soft segment block such as an aliphatic unsaturated hydrocarbon polymer block (hereinafter sometimes referred to as "polymer block (b)"), for example, a polystyrene-based elastomer.

The content of the styrene unit in the polystyrene-based elastomer is preferably less than 20 mass %, more preferably less than 16 mass %, and further more preferably less than 12 mass %. When the content of the styrene unit in the polystyrene-based elastomer is 20 mass % or more, the sound insulating properties tend to be deteriorated. Further, the island components are likely to be oriented in a specific direction, and therefore, also the shrinkability tends to be increased or the birefringence of the thermoplastic elastomer tends to be increased.

In the case where a block copolymer having at least one aromatic vinyl polymer block and at least one aliphatic unsaturated hydrocarbon polymer block is used as the thermoplastic elastomer, the bonding form of these polymer blocks is not particularly limited, and may be any of linear, branched, and radial bonding forms, or a bonding form in which two or more of these bonding forms are combined, but is preferably a linear bonding form.

Examples of the linear bonding form include, when the aromatic vinyl polymer block is represented by "a" and the aliphatic unsaturated hydrocarbon polymer block is represented by "b", a diblock copolymer represented by "a-b", a triblock copolymer represented by "a-b-a" or "b-a-b", a tetrablock copolymer represented by "a-b-a-b", a pentablock copolymer represented by "a-b-a-b-a" or "b-a-b-a-b", an (a-b)nX-type copolymer (X represents a coupling residue, and n represents an integer of 2 or more), and a mixture of these. Among these, a diblock copolymer or a triblock copolymer is preferred, and as the triblock copolymer, a triblock copolymer represented by "a-b-a" is more preferred.

The total amount of the aromatic vinyl monomer unit and the aliphatic unsaturated hydrocarbon monomer unit in the block copolymer is preferably 80 mass % or more, more preferably 95 mass % or more, and further more preferably 98 mass % or more with respect to the total monomer units. Incidentally, the aliphatic unsaturated hydrocarbon polymer block in the block copolymer may be partially or completely hydrogenated.

The content of the aromatic vinyl monomer unit in the block copolymer is preferably 5 mass % or more, more preferably 10 mass % or more, and further more preferably 12 mass % or more with respect to the total monomer units in the block copolymer. When the content of the aromatic vinyl monomer unit in the block copolymer is less than 5 mass %, the interlayer film for laminated glass tends to be difficult to mold. The content of the aromatic vinyl monomer unit in the block copolymer can be obtained from the charging ratio of the respective monomers when synthesizing the block copolymer and the measurement result of $^{1}$H-NMR of the block copolymer, or the like. In Examples of this description, the ratio of the monomer species was obtained from the measurement result of $^{1}$H-NMR, and the ratio of the respective monomers is expressed in mass %.

From the viewpoint of suppressing the shrinkability, the content of the aromatic vinyl monomer unit in the block copolymer is preferably less than 20 mass %, more preferably less than 19 mass %, further more preferably less than 18 mass %, particularly preferably less than 17 mass %, more particularly preferably less than 16 mass %, and most preferably less than 15 mass % with respect to the total monomer units in the block copolymer. When the content of the aromatic vinyl monomer unit in the block copolymer is 20 mass % or more, it is difficult to exhibit the characteristics as the thermoplastic elastomer, and thus, the sound insulating properties tend to be deteriorated.

In the aromatic vinyl polymer block, a monomer other than the aromatic vinyl monomer may be copolymerized if the amount is small. The ratio of the aromatic vinyl monomer unit in the aromatic vinyl polymer block is preferably 80 mass % or more, more preferably 95 mass % or more, and further more preferably 98 mass % or more with respect to the total monomer units in the aromatic vinyl polymer block.

Examples of the aromatic vinyl monomer constituting the aromatic vinyl polymer block include styrene; alkylstyrene such as α-methyl styrene, 2-methylstyrene, 3-methylstyrene, 4-methylstyrene, 4-propylstyrene, 4-cyclohexylstyrene, and 4-dodecylstyrene; arylstyrene such as 2-ethyl-4-benzylstyrene, 4-(phenylbutyl) styrene, 1-vinylnaphthalene, and 2-vinylnaphthalene; halogenated styrene; alkoxystyrene; and vinyl benzoate. These may be used alone or two or more types may be used in combination.

Examples of the monomer other than the aromatic vinyl monomer include unsaturated monomers such as ethylene, propylene, 1-butene, 1-pentene, 1-hexene, 1-heptene, 1-octene, 1-nonene, 1-decene, 4-phenyl-1-butene, 6-phenyl-1-hexene, 3-methyl-1-butene, 4-methyl-1-butene, 3-methyl-1-pentene, 4-methyl-1-pentene, 3-methyl-1-hexene, 4-methyl-1-hexene, 5-methyl-1-hexene, 3,3-dimethyl-1-pentene, 3,4-dimethyl-1-pentene, 4,4-dimethyl-1-pentene, vinylcyclohexane, hexafluoropropene, tetrafluoroethylene, 2-fluoropropene, fluoroethylene, 1,1-difluoroethylene, 3-fluoropropene, trifluoroethylene, 3,4-dichloro-1-butene, norbornene, and acetylene; (meth)acrylate-based monomers such as methyl acrylate and methyl methacrylate; and conjugated diene monomers such as butadiene, 1,3-pentadiene, 1,3-hexadiene, isoprene, cyclopentadiene, 1,3-cyclohexadiene, 1,3-octadiene, and 1,3-cyclooctadiene. The content of the monomer other than the aromatic vinyl monomer is preferably less than 20 mass %, more preferably less than 5 mass %, and further more preferably less than 2 mass % with respect to the total monomer units in the aromatic vinyl polymer block.

The content of the aliphatic unsaturated hydrocarbon monomer unit in the block copolymer is preferably 80 mass % or more, more preferably 81 mass % or more, furthermore preferably 82 mass % or more, particularly preferably 83 mass % or more, more particularly preferably 84 mass % or more, and most preferably 85 mass % or more with respect to the total monomer units in the block copolymer. When the content of the aliphatic unsaturated hydrocarbon monomer unit in the block copolymer is less than 80 mass %, the characteristics as the thermoplastic elastomer tend to be difficult to exhibit. The content of the aliphatic unsaturated hydrocarbon monomer unit in the block copolymer can be obtained from the charging ratio of the respective monomers when synthesizing the block copolymer and the measurement result of $^{1}$H-NMR of the block copolymer, or the like. In Examples of this description, the ratio of the monomer species was obtained from the measurement result of $^{1}$H-NMR, and the ratio of the respective monomers is expressed in mass %.

The content of the aliphatic unsaturated hydrocarbon monomer unit in the block copolymer is preferably 95 mass % or less, more preferably 90 mass % or less, and further more preferably 88 mass % or less with respect to the total monomer units in the block copolymer. When the content of the aliphatic unsaturated hydrocarbon monomer unit in the block copolymer exceeds 95 mass %, the interlayer film for laminated glass tends to be difficult to mold.

In the aliphatic unsaturated hydrocarbon polymer block, a monomer other than the aliphatic unsaturated hydrocarbon monomer may be copolymerized if the amount is small. The ratio of the aliphatic unsaturated hydrocarbon monomer unit in the aliphatic unsaturated hydrocarbon polymer block is preferably 80 mass % or more, more preferably 95 mass % or more, and further more preferably 98 mass % or more with respect to the total monomer units in the aliphatic unsaturated hydrocarbon polymer block.

As the aliphatic unsaturated hydrocarbon monomer in the aliphatic unsaturated hydrocarbon polymer block, it is preferred to use a conjugated diene monomer. The type of the conjugated diene monomer is not particularly limited, however, examples thereof include butadiene, 1,3-pentadiene, 1,3-hexadiene, isoprene, cyclopentadiene, 1,3-cyclohexadiene, 1,3-octadiene, and 1,3-cyclooctadiene. These conjugated diene monomers may be used alone or two or more types may be used in combination. Among the conjugated diene monomers, it is preferred to use butadiene or isoprene. Further, it is more preferred to use butadiene and isoprene in combination. Incidentally, as the monomer constituting the aliphatic unsaturated hydrocarbon polymer block, isobutylene may be used in place of the above-mentioned conjugated diene monomer. Further, isobutylene may be used along with the conjugated diene monomer. The content of the conjugated diene in the polymer block is preferably 60 mass % or more, more preferably 70 mass % or more, further more preferably 80 mass % or more, and particularly preferably 90 mass % or more. When the ratio of the conjugated diene monomer unit is within the above range, it is easy to exhibit the characteristics as the thermoplastic elastomer such as rubber elasticity, and thus, the sound insulating properties tend to be improved.

Examples of the monomer other than the conjugated diene monomer as the aliphatic unsaturated hydrocarbon monomer in the aliphatic unsaturated hydrocarbon polymer block include unsaturated monomers such as ethylene, propylene, 1-butene, 1-pentene, 1-hexene, 1-heptene, 1-octene, 1-nonene, 1-decene, 4-phenyl-1-butene, 6-phenyl-1-hexene, 3-methyl-1-butene, 4-methyl-1-butene, 3-methyl-1-pentene, 4-methyl-1-pentene, 3-methyl-1-hexene, 4-methyl-1-hexene, 5-methyl-1-hexene, 3,3-dimethyl-1-pentene, 3,4-dimethyl-1-pentene, 4,4-dimethyl-1-pentene, vinylcyclohexane, hexafluoropropene, tetrafluoroethylene, 2-fluoropropene, fluoroethylene, 1,1-difluoroethylene, 3-fluoropropene, trifluoroethylene, 3,4-dichloro-1-butene, butadiene, isoprene, dicyclopentadiene, norbornene, and acetylene.

From the viewpoint of ease of availability and handleability, the above aliphatic unsaturated hydrocarbon monomer is preferably an aliphatic unsaturated hydrocarbon having 2 or more carbon atoms, and more preferably an aliphatic unsaturated hydrocarbon having 4 or more carbon atoms. Further, the number of carbon atoms in the aliphatic unsaturated hydrocarbon is preferably 12 or less, and more preferably 8 or less. In particular, it is preferred to use butadiene or isoprene, or butadiene and isoprene in combination. Incidentally, as the monomer constituting the aliphatic unsaturated hydrocarbon polymer block, isobutylene may be used in place of the above-mentioned conjugated diene monomer. Further, isobutylene may be used along with the conjugated diene monomer.

From the viewpoint of ease of availability, handleability, and ease of synthesis, the above aliphatic unsaturated hydrocarbon monomer is preferably a conjugated diene. In the case where a conjugated diene is used as the monomer constituting the aliphatic unsaturated hydrocarbon polymer block, from the viewpoint of improving the heat creep resistance such as heat stability and the weather resistance such as a change in color difference, it is preferred to use a hydrogenated product in which the polymer block (b) containing the conjugated diene monomer unit is partially or completely hydrogenated. By hydrogenating the polymer block (b), the amount of residual carbon-carbon double bonds derived from the conjugated diene monomer unit can be adjusted. The amount of residual carbon-carbon double bonds derived from the conjugated diene monomer unit can be obtained by measuring an iodine value before and after the hydrogenation of the block copolymer and performing calculation from the measured values.

From the viewpoint of improving the heat creep resistance, the amount of residual carbon-carbon double bonds derived from the conjugated diene monomer unit is preferably 2 mol % or more, more preferably 3 mol % or more, further more preferably 4 mol % or more, and particularly preferably 5 mol % or more.

From the viewpoint of improving the weather resistance such as suppression of a change in color difference in the case where the laminated glass is used for a long period of time, the amount of residual carbon-carbon double bonds derived from the conjugated diene monomer is preferably 40 mol % or less, more preferably 35 mol % or less, further more preferably 30 mol % or less, and particularly preferably 25 mol % or less.

From the viewpoint of mechanical characteristics and molding processability, the weight average molecular weight of the block copolymer is preferably 30,000 or more, and more preferably 50,000 or more. Further, the weight average molecular weight of the block copolymer is preferably 400,000 or less, and more preferably 300,000 or less.

The ratio of the weight average molecular weight to the number average molecular weight (Mw/Mn) of the block copolymer is preferably 1.0 or more. Further, the ratio of the weight average molecular weight to the number average molecular weight (Mw/Mn) of the block copolymer is preferably 2.0 or less, and more preferably 1.5 or less. Here, the weight average molecular weight is a weight average molecular weight in terms of polystyrene determined by gel permeation chromatography (GPC) measurement, and the number average molecular weight is a number average molecular weight in terms of polystyrene determined by GPC measurement.

A production method for the block copolymer is not particularly limited, however, the block copolymer can be produced by, for example, an anionic polymerization method, a cationic polymerization method, a radical polymerization method, or the like. For example, in the case of anionic polymerization, specific examples of the method include:

(i) a method in which an alkyl lithium compound is used as an initiator, and the aromatic vinyl monomer, the conjugated diene monomer, and then the aromatic vinyl monomer are sequentially polymerized;

(ii) a method in which an alkyl lithium compound is used as an initiator, and the aromatic vinyl monomer and the conjugated diene monomer are sequentially polymerized, and then, a coupling agent is added to couple the polymers; and (iii) a method in which a dilithium compound is used as an initiator, and the conjugated diene monomer, and then the aromatic vinyl monomer are sequentially polymerized.

In the case where a conjugated diene is used as the aliphatic unsaturated hydrocarbon monomer, by adding an organic Lewis base in the anionic polymerization, the amount of 1,2-bonds and the amount of 3,4-bonds in the thermoplastic elastomer can be increased, and therefore, the amount of 1,2-bonds and the amount of 3,4-bonds in the thermoplastic elastomer can be easily controlled by the addition amount of the organic Lewis base.

Examples of the organic Lewis base include esters such as ethyl acetate; amines such as triethylamine, N,N,N',N'-tetramethylethylenediamine (TMEDA), and N-methylmorpholine; nitrogen-containing heterocyclic aromatic compounds such as pyridine; amides such as dimethyl acetamide; ethers such as dimethyl ether, diethyl ether, tetrahydrofuran (THF), and dioxane; glycol ethers such as ethylene glycol dimethyl ether and diethylene glycol dimethyl ether; sulfoxides such as dimethyl sulfoxide; and ketones such as acetone and methyl ethyl ketone.

In the case where an unhydrogenated polystyrene-based elastomer is subjected to a hydrogenation reaction, the obtained unhydrogenated polystyrene-based elastomer is dissolved in a solvent inert to a hydrogenation catalyst, or the unhydrogenated polystyrene-based elastomer is used as it is without being isolated from the reaction mixture, and is reacted with hydrogen in the presence of a hydrogenation catalyst, whereby the hydrogenation can be carried out.

Examples of the hydrogenation catalyst include Raney nickel; a heterogeneous catalyst obtained by supporting a metal such as Pt, Pd, Ru, Rh, or Ni on a carrier such as carbon, alumina, or diatomaceous earth; a Ziegler catalyst composed of a transition metal compound and an alkyl aluminum compound, an alkyl lithium compound, or the like in combination; and a metallocene-based catalyst. The hydrogenation reaction can be generally performed under the conditions that the hydrogen pressure is 0.1 MPa or more and 20 MPa or less, the reaction temperature is 20° C. or higher and 250° C. or lower, and the reaction time is 0.1 hours or more and 100 hours or less.

The thickness of the layer A is preferably 20 µm or more, more preferably 30 µm or more, and further more preferably 50 µm or more. When the thickness of the layer A is less than the sound insulating properties tend to be deteriorated. In the case where a plurality of layers A are included in the interlayer film for laminated glass of the invention, it is preferred that the total thickness of the layers A satisfies the above conditions.

The thickness of the layer A is preferably 400 µm or less, more preferably 250 µm or less, and further more preferably 200 µm or less. When the thickness of the layer A exceeds 400 µm the case where a laminated glass is formed, the mechanical characteristics such as penetration resistance are deteriorated, and thus, the safety performance as a laminated glass tends to be impaired. In the case where a plurality of layers A are included in the interlayer film for laminated glass of the invention, it is preferred that the total thickness of the layers A satisfies the above conditions.

To the layer A, a resin other than the above-mentioned elastomer, or any of various additives such as a heat shielding material (for example, inorganic heat shielding fine particles or an organic heat shielding material having an infrared absorbing ability), an antioxidant, a UV absorber, a light stabilizer, a blocking inhibitor, a pigment, and a dye may be added as needed.

By incorporating the heat shielding material in a laminate constituting the interlayer film for laminated glass of the invention, a heat shielding function can be imparted to the laminate. In addition, in a laminated glass formed by sandwiching the interlayer film for laminated glass between two clear glasses with the total thickness of the glasses being 4 mm or less, the average transmittance of infrared light in the wavelength range of 800 to 1,100 nm can be decreased to 70% or less. The heat shielding material may be contained in any of the layer A, and the below-mentioned layer B and layer C, and may be contained in only one of these layers or may be contained in a plurality of layers. In the case where the heat shielding material is contained, from the viewpoint of suppressing optical unevenness, the heat shielding material is preferably contained in at least one layer A.

By incorporating the heat shielding material in the interlayer film constituting the interlayer film for laminated glass of the invention, a heat shielding function can be imparted to the interlayer film for laminated glass, and in a laminated glass formed by sandwiching the interlayer film for laminated glass between two green glasses with the total thickness of the glasses being 4 mm or less, the average transmittance of infrared light in the wavelength range of 800 to 1,100 nm can be decreased to 32% or less. The heat shielding material may be contained in any of the layer A, and the below-mentioned layer B and layer C, and may be contained in only one of these layers or may be contained in a plurality of layers. In the case where the heat shielding material is contained, from the viewpoint of suppressing optical unevenness, the heat shielding material is preferably contained in at least one layer A.

Examples of the heat shielding material include inorganic heat shielding fine particles of tin-doped indium oxide (ITO), antimony-doped tin oxide (ATO), aluminum-doped zinc oxide (AZO), metal-doped tungsten oxide represented by the general formula: $M_mWO_n$ (M represents a metal element, and m is 0.01 or more and 1.0 or less, and n is 2.2 or more and 3.0 or less), zinc antimonate ($ZnSb_2O_5$), lanthanum hexaboride, and the like, and organic heat shielding materials such as a phthalocyanine compound (NIOBP), a naphthalocyanine compound, a compound having an anthracyanine skeleton. Among these, ITO, ATO, and metal-doped tungsten oxide are preferred from the viewpoint of infrared absorbability, and metal-doped tungsten oxide is particularly preferred. Examples of the metal element represented by M in the metal-doped tungsten oxide include Cs, Tl, Rb, Na, and K, and in particular, CWO (cesium-doped tungsten oxide) constituted by Cs is preferred. From the viewpoint of heat shielding properties, the above m is preferably 0.2 or more, and more preferably 0.3 or more. Further, the above m is preferably 0.5 or less, and more preferably 0.4 or less. From the viewpoint of infrared absorbability, the phthalocyanine compound is preferably a compound coordinated with nickel (II).

The content of the heat shielding material is preferably 0.1 mass % or more, and more preferably 0.2 mass % or more, and also preferably 5 mass or less, and more preferably 3 mass % or less with respect to the total resin used in the layer constituting the interlayer film for laminated glass. When the heat shielding material is contained in an amount of more than 5 mass %, the visible light transmittance may be sometimes affected. The average particle diameter of the heat shielding material is preferably 100 nm or less, and more preferably 50 nm or less from the viewpoint of transparency. Incidentally, the average particle diameter of the heat shielding material as used herein refers to a value measured with a laser diffractometer.

In the case where the heat shielding material is contained in the layer A, the infrared absorbing ability of the heat shielding material is proportional to the optical path length (m) when infrared light passes through the layer A and the concentration ($g/m^3$) of the heat shielding material in the layer A. Therefore, the infrared absorbing ability of the heat shielding material is proportional to the area density ($g/m^2$) of the heat shielding material in the layer A.

In the case where metal-doped tungsten oxide (cesium-doped tungsten oxide) is used as the heat shielding material in the layer A, the area density ($g/m^2$) of the heat shielding material is preferably 0.10 or more, more preferably 0.15 or more, and further more preferably 0.20 or more. When the area density ($g/m^2$) of the heat shielding material in the layer A is less than 0.10, a sufficient heat shielding effect tends to be difficult to obtain. In the case where metal-doped tungsten oxide is used as the heat shielding material in the layer A, the area density ($g/m^2$) of the heat shielding material is preferably 1.00 or less, more preferably 0.70 or less, and further more preferably 0.50 or less. When the area density ($g/m^2$)

of the heat shielding material in the layer A is 1.00 or less, in the case where a laminated glass is formed, the visible light transmittance tends to be maintained, the haze tends to be improved, the weather resistance tends to be maintained, or the change in color difference tends to be suppressed.

In the case where tin-doped indium oxide is used as the heat shielding material in the layer A, the area density ($g/m^2$) of the heat shielding material is preferably 0.5 or more, more preferably 1.0 or more, further more preferably 1.50 or more, particularly preferably 2.25 or more, and more particularly preferably 3.00 or more. In the case where tin-doped indium oxide is used as the heat shielding material in the layer A, the area density ($g/m^2$) of the heat shielding material is preferably 15.00 or less, more preferably 10.50 or less, and further more preferably 7.50 or less.

In the case where antimony-doped tin oxide is used as the heat shielding material in the layer A, the area density ($g/m^2$) of the heat shielding material is preferably 1.00 or more, more preferably 1.50 or more, and furthermore preferably 2.00 or more. In the case where antimony-doped tin oxide is used as the heat shielding material in the layer A, the area density ($g/m^2$) of the heat shielding material is preferably 10.00 or less, more preferably 7.00 or less, and further more preferably 5.00 or less.

In the case where a phthalocyanine compound is used as the heat shielding material in the layer A, the area density ($g/m^2$) of the heat shielding material is preferably 0.010 or more, more preferably 0.015 or more, and further more preferably 0.020 or more. In the case where a phthalocyanine compound is used as the heat shielding material in the layer A, the area density ($g/m^2$) of the heat shielding material is preferably 0.100 or less, more preferably 0.070 or less, and further more preferably 0.050 or less.

In the case where aluminum-doped zinc oxide is used as the heat shielding material in the layer A, the area density ($g/m^2$) of the heat shielding material is preferably 1.00 or more, more preferably 1.50 or more, and furthermore preferably 2.00 or more. In the case where aluminum-doped zinc oxide is used as the heat shielding material in the layer A, the area density ($g/m^2$) of the heat shielding material is preferably 10.00 or less, more preferably 7.00 or less, and further more preferably 5.00 or less.

In the case where zinc antimonate is used as the heat shielding material in the layer A, the area density ($g/m^2$) of the heat shielding material is preferably 1.00 or more, more preferably 1.50 or more, and further more preferably 2.00 or more. In the case where zinc antimonate is used as the heat shielding material in the layer A, the area density ($g/m^2$) of the heat shielding material is preferably 10.00 or less, more preferably 7.00 or less, and further more preferably 5.00 or less.

In the case where lanthanum hexaboride is used as the heat shielding material in the layer A, the area density ($g/m^2$) of the heat shielding material is preferably 0.02 or more, more preferably 0.03 or more, and further more preferably 0.04 or more. In the case where lanthanum hexaboride is used as the heat shielding material in the layer A, the area density ($g/m^2$) of the heat shielding material is preferably 0.20 or less, more preferably 0.14 or less, and further more preferably 0.10 or less.

In the interlayer film for laminated glass of the invention, it is preferred that the heat shielding material is contained in the layer A. Further, it is preferred that a UV absorber is contained in at least one of the layers constituting the interlayer film for laminated glass, and in particular, it is more preferred that at least one type of UV absorber is contained in at least one layer B described below. By configuring the interlayer film for laminated glass as described above, for example, in the case where the layer A is used as an inner layer and the layer B is used as an outer layer, the thermoplastic elastomer in the layer A is protected from UV light, and also the heat shielding properties of the interlayer film for laminated glass can be enhanced, and also the optical unevenness can be suppressed.

The UV absorber which can be used in the invention is not particularly limited, however, examples thereof include benzotriazole-based UV absorbers such as 2-(5-chloro-2-benzotriazolyl)-6-tert-butyl-p-cresol, 2-(5-methyl-2-hydroxyphenyl)benzotriazole, 2-[2-hydroxy-3,5-bis(α,α'-dimethylbenzyl)phenyl]-2H-benzotriazole, 2-(3,5-di-t-butyl-2-hydroxyphenyl)benzotriazole, 2-(3-t-butyl-5-methyl-2-hydroxyphenyl)-5-chlorobenzotriazole, 2-(3,5-di-t-butyl-5-methyl-2-hydroxyphenyl)-5-chlorobenzotriazole, 2-(3,5-di-t-amyl-2-hydroxyphenyl)benzotriazole, and 2-(2'-hydroxy-5'-t-octylphenyl)benzotriazole; hindered amine-based UV absorbers such as 2,2,6,6-tetramethyl-4-piperidyl-benzoate, bis(2,2,6,6-tetramethyl-4-piperidyl)sebacate, bis(1,2,2,6,6-pentamethyl-4-piperidyl)-2-(3,5-di-t-butyl-4-hydroxybenzyl)-2-n-butylmalonate, and 4-(3-(3,5-di-t-butyl-4-hydroxyphenyl)propionyloxy)-1-(2-(3-(3,5-di-t-butyl-4-hydroxyphenyl)propionyloxy)ethyl)-2,2,6,6-tetramethylpiperidine; and benzoate-based UV absorbers such as 2,4-di-t-butylphenyl-3,5-di-t-butyl-4-hydroxybenzoate, and hexadecyl-3,5-di-t-butyl-4-hydroxybenzoate. Additional examples of the UV absorber include a triazine-based compound, a benzophenone-based compound, a malonic ester compound, and an oxalic anilide compound.

Examples of the triazine-based compound include 6-(4-hydroxy-3,5-di-t-butylanilino)-2,4-bis-octylthio-1,3,5-triazine, 6-(4-hydroxy-3,5-dimethylanilino)-2,4-bis-octylthio-1,3,5-triazine, 6-(4-hydroxy-3-methyl-5-t-butylanilino)-2,4-bis-octylthio-1,3,5-triazine, and 2-octylthio-4,6-bis-(3,5-di-t-butyl-4-oxyanilino)-1,3,5-triazine. In this description, the triazine-based compound is regarded as falling under the category of a UV absorber and is not regarded as falling under the category of an antioxidant.

Examples of the benzophenone-based compound include 2-hydroxy-4-methoxybenzophenone, 2,2'-dihydroxy-4-methoxybenzophenone, 2-hydroxy-4-methoxy-2-carboxybenzophenone, and 2-hydroxy-4-n-octoxybenzophenone.

Examples of the malonic ester compound include dimethyl 2-(p-methoxybenzylidene)malonate, tetraethyl-2,2-(1,4-phenylenedimethylidene)bismalonate, and 2-(p-methoxybenzylidene)-bis(1,2,2,6,6-pentamethyl-4-piperidinyl)malonate.

Examples of a commercially available product of the malonic ester compound include Hostavin B-CAP, Hostavin PR-25, and Hostavin PR-31 (all are manufactured by Clariant, Inc.).

Examples of the oxalic anilide compound include oxalicdiamides having an aryl group or the like substituted on a nitrogen atom such as N-(2-ethylphenyl)-N'-(2-ethoxy-5-t-butylphenyl)oxalicdiamide, N-(2-ethylphenyl)-N'-(2-ethoxy-phenyl)oxalicdiamide, and 2-ethyl-2'-ethoxy-oxyanilide ("Sanduvor VSU" manufactured by Clariant, Inc.).

In the case where a UV absorber is contained in the layer A, the area density ($g/m^2$) of the UV absorber in the layer A is preferably 0.1 or more, more preferably 0.2 or more, and further more preferably 0.5 or more. When the area density ($g/m^2$) of the UV absorber in the layer A is 0.1 or more, in the case where a laminated glass is formed, the haze tends to be improved, the weather resistance tends to be maintained, or the change in color difference tends to be suppressed.

In the case where a UV absorber is contained in the layer A, the area density (g/m$^2$) of the UV absorber in the layer A is preferably 10 or less, more preferably 9 or less, and further more preferably 8 or less. When the area density (g/m$^2$) of the UV absorber in the layer A exceeds 10, in the case where a laminated glass is formed, the visible light transmittance tends to be decreased, the haze tends to be deteriorated, the weather resistance tends to be decreased, or the change in color difference tends to be increased.

The addition amount of the UV absorber is preferably 10 ppm or more, and more preferably 100 ppm or more on a mass basis with respect to the resin contained in the layer A. When the addition amount is less than 10 ppm, it is sometimes difficult to exhibit a sufficient effect.

The addition amount of the UV absorber is preferably 50,000 ppm or less, and more preferably 10,000 ppm or less on a mass basis with respect to the resin contained in the layer A. Even if the addition amount is set to more than 50,000 ppm, a marked effect cannot be expected. Incidentally, it is also possible to use two or more types of UV absorbers in combination.

Examples of the antioxidant include a phenolic antioxidant, a phosphorus-based antioxidant, and a sulfur-based antioxidant. Among these, a phenolic antioxidant is preferred, and an alkyl-substituted phenolic antioxidant is particularly preferred.

Examples of the phenolic antioxidant include acrylate-based compounds such as 1,3,5-tris(4-tert-butyl-3-hydroxy-2,6-dimethylbenzyl)-1,3,5-triazine-2,4,6-(1H,3H,5H)-trione, 2-t-butyl-6-(3-t-butyl-2-hydroxy-5-methylbenzyl)-4-methylphenylacrylate, and 2,4-di-t-amyl-6-(1-(3,5-di-t-amyl-2-hydroxyphenyl)ethyl)phenylacrylate; and alkyl-substituted phenolic compounds such as 2,6-di-t-butyl-4-methylphenol, 2,6-di-t-butyl-4-ethylphenol, octadecyl-3-(3,5-)di-t-butyl-4-hydroxyphenyl)propionate, 2,2'-methylene-bis(4-methyl-6-t-butylphenol), 4,4'-butylidene-bis(4-methyl-6-t-butylphenol), 4,4'-butylidene-bis(6-t-butyl-m-cresol), 4,4'-thiobis(3-methyl-6-t-butylphenol), bis(3-cyclohexyl-2-hydroxy-5-methylphenyl)methane, 3,9-bis(2-(3-(3-t-butyl-4-hydroxy-5-methylphenyl)propionyloxy)-1,1-dimethylethyl)-2,4,8,10-tetraoxaspiro[5.5]undecane, 1,1,3-tris(2-methyl-4-hydroxy-5-t-butylphenyl)butane, 1,3,5-trimethyl-2,4,6-tris(3,5-di-t-butyl-4-hydroxybenzyl)benzene, tetrakis(methylene-3-(3',5'-di-t-butyl-4'-hydroxyphenyl)propionate)methane, and triethylene glycol bis(3-(3-t-butyl-4-hydroxy-5-methylphenyl)propionate).

Examples of the phosphorus-based antioxidant include monophosphite-based compounds such as tris(2,4-di-t-butylphenyl)phosphate, triphenylphosphite, diphenyliso-decylphosphite, phenyldiisodecylphosphite, tris(nonylphenyl)phosphite, tris(dinonylphenyl)phosphite, tris(2-t-butyl-4-methylphenyl)phosphite, tris(cyclohexylphenyl)phosphite, 2,2-methylenebis(4,6-di-t-butylphenyl)octylphosphite, 9,10-dihydro-9-oxa-10-phosphaphenanthrene-10-oxide, 10-(3,5-di-t-butyl-4-hydroxybenzyl)-9,10-dihydro-9-oxa-10-phosphaphenanthrene-10-oxide, and 10-decyloxy-9,10-dihydro-9-oxa-10-phosphaphenanthrene; and diphosphite-based compounds such as 4,4'-butylidene-bis(3-methyl-6-t-butylphenyl-di-tridecylphosphite), 4,4'-isopropylidene-bis(phenyl-di-C12-15-alkylphosphite), 4,4'-isopropylidene-bis(diphenyl-mono-C12-15-alkylphosphite), 1,1,3-tris(2-methyl-4-di-tridecylphosphite-5-t-butylphenyl) butane, and tetrakis(2,4-di-t-butylphenyl)-4,4'-biphenylene phosphite. Among these, monophosphite-based compounds are preferred.

Examples of the sulfur-based antioxidant include dilauryl 3,3'-thiodipropionate, distearyl 3,3-thiodipropionate, lauryl-stearyl 3,3'-thiodipropionate, pentaerythritol-tetrakis-(β-lauryl-thiopropionate), and 3,9-bis(2-dodecylthioethyl)-2,4,8,10-tetraoxaspiro[5.5]undecane.

The antioxidants can be used alone or two or more types can be used in combination. The area density of the antioxidant in the layer A is preferably 0.1 g/m$^2$ or more, more preferably 0.2 or more, and furthermore preferably 0.5 or more. When the area density of the antioxidant in the layer A is less than 0.1 g/m$^2$, the layer A is easily oxidized, and in the case where the laminated glass is used for a long period of time, the change in color difference is increased, and so on, and thus, the weather resistance tends to be decreased.

The area density of the antioxidant in the layer A is preferably 2.5 g/m$^2$ or less, more preferably 1.5 or less, and further more preferably 2.0 or less. When the area density of the antioxidant in the layer A exceeds 2.5 g/m$^2$, the color tone of the layer A tends to be impaired or the haze of the laminated glass tends to be decreased.

The blending amount of the antioxidant is preferably 0.001 parts by mass or more, and more preferably 0.01 parts by mass or more with respect to 100 parts by mass of the thermoplastic elastomer. When the amount of the antioxidant is less than 0.001 parts by mass, it is sometimes difficult to exhibit a sufficient effect.

The blending amount of the antioxidant is preferably 5 parts by mass or less, and more preferably 0.01 parts by mass or less with respect to 100 parts by mass of the thermoplastic elastomer. Even if the amount of the antioxidant is set to more than 5 parts by mass, a marked effect cannot be expected.

Examples of the light stabilizer include a hindered amine-based light stabilizer, for example, "ADEKA STAB LA-57 (trade name)" manufactured by ADEKA Corporation and "Tinuvin 622SF (trade name)" manufactured by Ciba Specialty Chemicals, Inc. The blending amount of the light stabilizer is preferably 0.01 parts by mass or more, and more preferably 0.05 parts by mass or more with respect to 100 parts by mass of the thermoplastic resin such as a polyvinyl acetal resin. When the amount of the light stabilizer is less than 0.001 parts by mass, it is sometimes difficult to exhibit a sufficient effect. Further, the content of the light stabilizer is preferably 10 parts by mass or less, and more preferably 5 parts by mass or less. Even if the amount of the light stabilizer is set to more than 10 parts by mass, a marked effect cannot be expected. The area density of the light stabilizer in the layer A is preferably 0.05 g/m$^2$ or more, and more preferably 0.5 g/m$^2$ or more. Further, the area density is preferably 70 g/m$^2$ or less, and more preferably 30 g/m$^2$ or less.

In order to adjust the adhesive strength between the layer A and the layer B, an adhesive strength adjusting agent may be added to the layer A or the layer B. Examples of the adhesive strength adjusting agent include polyolefins having an adhesive functional group such as a carboxyl group, a carboxyl group derivative group, an epoxy group, a boronic acid group, a boronic acid group derivative group, an alkoxyl group, or an alkoxyl group derivative group.

In particular, in the case where a polyvinyl acetal resin is used in the layer B, by adding a polyolefin having an adhesive functional group to the layer A and performing coextrusion molding of the layer A and the layer B, the adhesive strength between the layer A and the layer B can be favorably adjusted. The addition amount of the polyolefin having an adhesive functional group is preferably 20 parts by mass or less, more preferably 15 parts by mass or less, and further more preferably 10 parts by mass or less with respect to 100 parts by mass of the thermoplastic elastomer in the layer A. When the addition amount of the polyolefin having an adhesive functional group exceeds 20 parts by mass, in the case where a laminated glass is formed, the haze is sometimes deteriorated. As the polyolef in having an adhesive functional group, polypropylene containing a carboxyl group is preferred among the above-mentioned polyolefins from the viewpoint of ease of availability, ease of adjustment of the adhesiveness, and ease of adjustment of the haze.

In the case where a component other than the thermoplastic elastomer is contained in the layer A, the amount of the thermoplastic elastomer component in the composition containing the thermoplastic elastomer constituting the layer A is preferably 60 mass % or more, more preferably 70 mass % or more, further more preferably 80 mass % or more, particularly preferably 90 mass % or more, and most preferably 95 mass % or more. When the amount of the thermoplastic elastomer in the layer A is less than 60 mass %, the characteristics as the thermoplastic elastomer tend to be difficult to exhibit or the optical characteristics tend to be impaired.

In the invention, the thermoplastic elastomer is contained in the interlayer film for laminated glass in an amount of preferably 5 mass % or more, more preferably 10 mass % or more, and further more preferably 13 mass % or more. When the amount of the thermoplastic elastomer in the interlayer film for laminated glass is less than 5 mass %, the sound insulating properties tend to be deteriorated.

Figure 2:
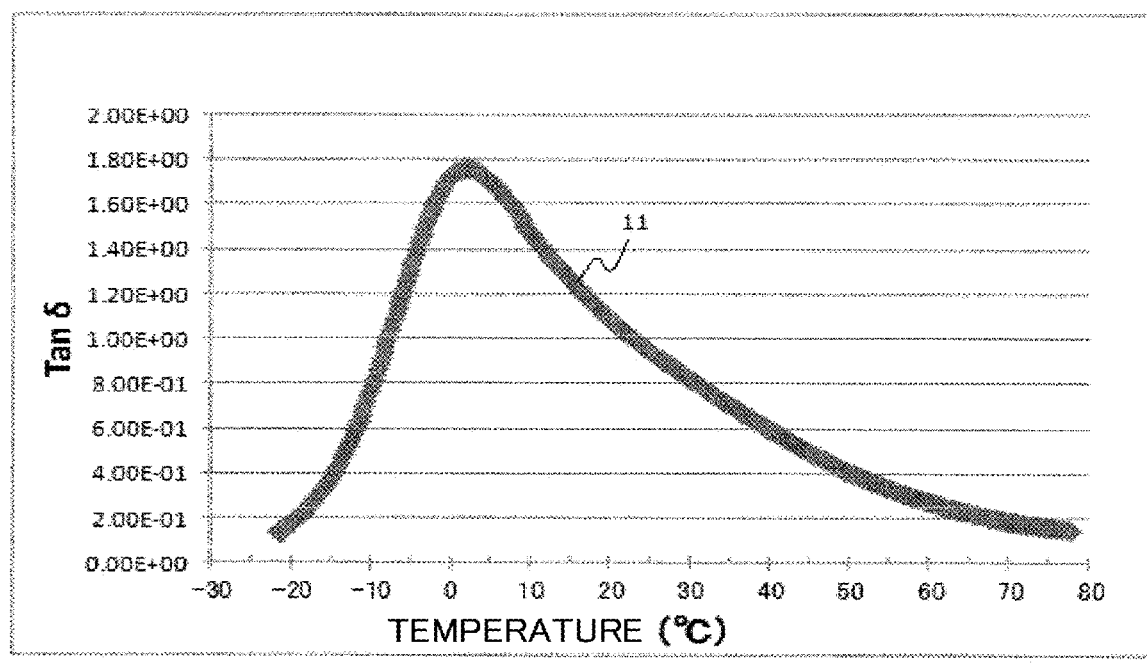
FIG. 2 shows an exemplary measurement result of the tan δ 11 of a layer A measured by performing a dynamic viscoelasticity test at a frequency of 1,000 Hz in accordance with ASTM D4065-06.
Figure 3:
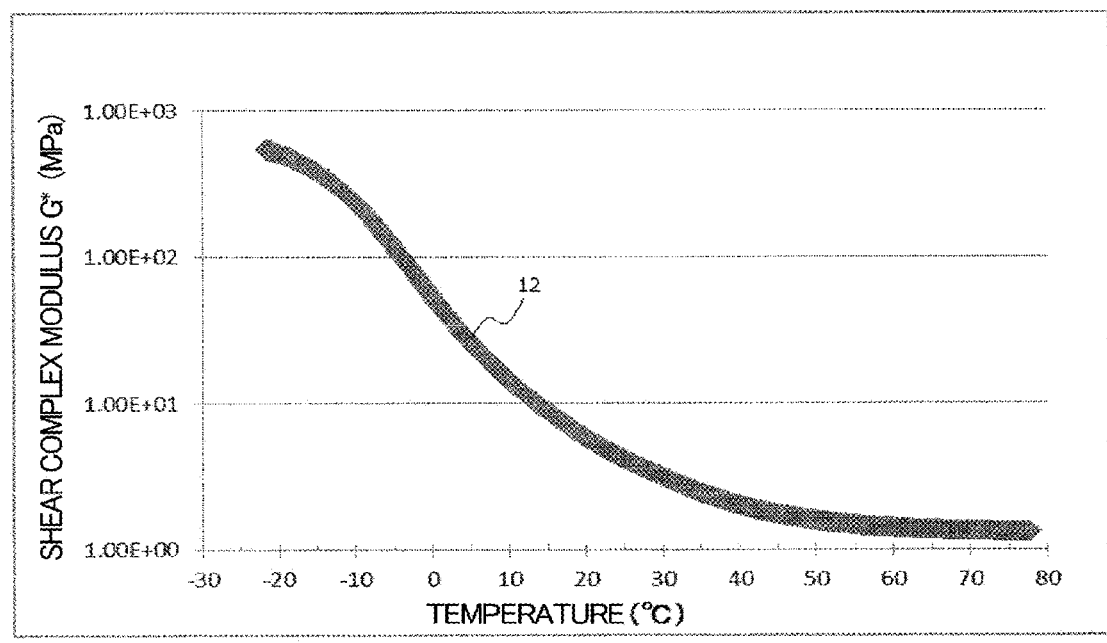
FIG. 3 shows an exemplary measurement result of the shear complex modulus G* 12 of the layer A measured by performing a dynamic viscoelasticity test at a frequency of 1,000 Hz in accordance with ASTM D4065-06.

The dynamic viscoelasticity of the interlayer film for laminated glass is defined in ASTM D4065-06, and can be measured with, for example, a mechanical spectrometer (model DMA/SDTA861e, manufactured by Mettler Toledo, Inc.). The measurement can be performed by a fixed sinusoidal shear oscillation at a frequency of 1,000 Hz with a maximum shear strain amplitude of 0.1%. As a test sample cut out from a polymer sheet obtained by compression molding, a sample having a cylindrical shape with a thickness of 1 mm (and with a diameter of 3 to 10 mm, which is determined according to the state of the sample) can be used. The measurement can be performed in the range of −20 to 60° C. at a temperature rising rate of 1° C./min. A shear storage modulus (G') and a shear loss modulus (G") can be obtained directly from the measurement. A "tan δ" to be used as an index of the damping properties of a polymer and a shear complex modulus (G*) to be used as an index of the dynamic shear stiffness of a polymer can be obtained from the above G' and G" as defined in ASTM D4092-07. In particular, the sensitivity of hearing in human beings is high in the frequency range of 1,000 to 5,000 Hz, and therefore, a tan δ and a shear modulus at 20° C. and 1,000 Hz can be used as the indices for determining the sound insulating properties of a polymer. The interlayer film for laminated glass having a high tan δ value and a low shear modulus is preferred from the viewpoint of high sound insulating properties and high damping properties. The exemplary measurement result of tan δ 11 of the layer A and the exemplary measurement result of shear complex modulus G* 12 of the layer A obtained in accordance with the above-mentioned measurement method are shown in FIG. 2 and FIG. 3, respectively.

(Shear Storage Modulus)

The shear storage modulus can be measured based on, for example, a complex shear viscosity test in accordance with JIS K 7244-10. The shear storage modulus is an index of a component stored inside an object in energy generated from an external force and strain applied to the object and is obtained from a relationship between a dynamic modulus and a temperature at a constant temperature rising rate of the measurement temperature using a strain-controlled dynamic viscoelasticity apparatus.

The measurement conditions for the shear storage modulus can be appropriately set, however, for example, the shear storage modulus can be measured by setting the frequency to 1 Hz and the temperature to −40° C. or higher and 100° C. or lower. In JIS K 7244-10, there are a stress-controlled testing method and a strain-controlled testing method.

In JIS K 7244-10, as a testing apparatus, a parallel-plate oscillatory rheometer can be used. The parallel-plate oscillatory rheometer is composed of two coaxial and rigid parallel disks. A test sheet is placed between the disks, and one disk is fixed and the other disk is oscillated at a constant frequency, whereby dynamic viscoelasticity characteristics such as a shear loss modulus and a shear storage modulus can be measured.

The diameter of the disk is generally 20 mm or more and 50 mm or less, and the thickness of a test sheet is defined as a distance between the disks. In order to minimize the measurement error, a test sheet with a weight of about 3 g or more and 5 g or less is used, and the thickness of the test sheet is desirably in the range of 0.5 mm or more and 3 mm or less. Further, the ratio of the diameter of the disk to the thickness of the test sheet is desirably in the range of 10 or more and 50 or less. The test sheet is formed into a disk shape by injection molding, compression molding, or cutting out from the sheet. Alternatively, a pellet, a liquid, or a molten polymer may be filled between the disks. Further, the gap between the two plates is completely filled with the test sheet.

In a strain-controlled testing method, a sinusoidal displacement at a fixed angular frequency is applied, and the resulting sinusoidal torque and the phase difference between the torque and the angular displacement are measured. A torque measuring apparatus is connected to one plate and measures a torque necessary for deforming the test sheet. An angular displacement measuring apparatus is connected to the movable-side plate and measures an angular displacement and a frequency. To the test sheet, either a sinusoidal torque or an angular displacement is applied at a constant frequency, and from the measured torque and displacement, and the dimensions of the test sheet, the shear loss modulus and shear storage modulus are determined.

Further, it is necessary to bring the testing apparatus into a thermal equilibrium state by heating it to a test temperature. The test temperature is desirably measured by bringing a thermometer into contact with the fixed-side disk or burying a thermometer therein. The heating is performed by forced convection, high frequency heating, or an appropriate method. The test sheet and the disks are sufficiently maintained at the test temperature until they reach a thermal equilibrium state so that the measured values of the shear loss modulus and the shear storage modulus do not change. The equilibration time is desirably 15 minutes or more and 30 minutes or less.

The tan δ of the layer A containing a thermoplastic elastomer can be measured by performing a dynamic viscoelasticity test at a frequency of 1,000 Hz in accordance with ASTM D4065-06. The temperature at which the peak maximum in tan δ (frequency: 1,000 Hz) of the layer A appears is preferably −10° C. or higher, more preferably −5° C. or higher, and further more preferably 0° C. or higher. When the peak maximum in tan δ (frequency: 1,000 Hz) of the layer A appears at a temperature of −10° C. or higher, the sound insulating properties tend to be easily exhibited in a temperature range in which it is used as a laminated glass, particularly, in a low temperature range.

The temperature at which the peak maximum in tan δ (frequency: 1,000 Hz) of the layer A appears is preferably 30° C. or lower, more preferably 29° C. or lower, and further more preferably 28° C. or lower. When the peak maximum in tan δ (frequency: 1,000 Hz) of the layer A appears at a temperature of 30° C. or lower, the sound insulating properties tend to be easily exhibited in a temperature range in which it is used as a laminated glass, particularly, in a high temperature range.

From the viewpoint of further improving the sound insulating properties, the glass transition temperature of the thermoplastic elastomer to be used in the layer A is preferably 10° C. or lower, and more preferably −5° C. or lower. The lower limit of the glass transition temperature of the thermoplastic elastomer is not particularly limited, however, the glass transition temperature of the thermoplastic elastomer is preferably −50° C. or higher, and more preferably −40° C. or higher. As a measurement method for the glass transition temperature, differential scanning calorimetry (DSC) may be used.

For the layer A in the interlayer film for laminated glass of the invention, the height of the peak maximum in tan δ as measured by performing a dynamic viscoelasticity test at a frequency of 1,000 Hz in accordance with ASTM D4065-06 is preferably 1.3 or more, more preferably 1.5 or more, further more preferably 1.6 or more, and particularly preferably 1.7 or more. When the height of the peak in tan δ (frequency: 1,000 Hz) under the above conditions is 1.3 or more, the sound insulating properties of an interlayer film for laminated glass to be obtained tend to be increased, and particularly, the sound insulating properties are exhibited in a thin laminated glass.

[Layer B]

An interlayer film for laminated glass constituting the interlayer film for laminated glass of the invention preferably has a layer B containing a thermoplastic resin on at least one surface of the layer A. The thermoplastic resin refers to a polymer compound which is softened to exhibit plasticity when heated and is solidified when cooled, and is distinguished from a thermoplastic elastomer. By incorporating the thermoplastic resin in the layer B, the weather resistance or strength of the interlayer film for laminated glass tends to be improved or the bending strength or penetration resistance of the laminated glass tends to be improved.

The type of the thermoplastic resin is not particularly limited, however, examples thereof include a polyvinyl acetal, an ionomer, an ethylene-vinyl acetate copolymer, a vinyl chloride resin, a urethane resin, and a polyamide resin.

From the viewpoint of improving the weather resistance or strength of the interlayer film for laminated glass or improving the bending strength or penetration resistance of the laminated glass, the thermoplastic resin to be used in an outer layer is particularly preferably a polyvinyl acetal resin or an ionomer.

The temperature at which the peak maximum in tan δ of the layer B as measured by performing a dynamic viscoelasticity test at a frequency of 1,000 Hz in accordance with ASTM D4065-06 appears is preferably 30° C. or higher, more preferably 35° C. or higher, and further more preferably 40° C. or higher. When the temperature at which the peak maximum in tan δ appears is lower than 30° C., the penetration resistance or impact resistance tends to be difficult to exhibit in a temperature range in which it is used as a laminated glass.

The layer B of the interlayer film for laminated glass constituting the interlayer film for laminated glass of the invention is not particularly limited as long as it satisfies the above conditions, however, for example, from the viewpoint that a safety glass which is less likely to shatter when damaged can be formed or the like when it is practically used as the interlayer film for laminated glass, it is preferably a polyvinyl acetal layer composed of a composition containing a polyvinyl acetal resin.

As the thermoplastic resin to be used in the layer B, as described above, an ethylene-vinyl acetate copolymer, an ionomer, or the like can also be used in place of the polyvinyl acetal resin.

The ionomer is not particularly limited as long as it is a resin, which has an ethylene-derived constituent unit and an α, β-unsaturated carboxylic acid-derived constituent unit, and in which the α, β-unsaturated carboxylic acid is at least partially neutralized with a metal ion. Examples of the metal ion include a sodium ion. In an ethylene-α, β-unsaturated carboxylic acid copolymer to be used as a base polymer, the content ratio of the α, β-unsaturated carboxylic acid constituent unit is preferably 2 mass % or more, and more preferably 5 mass % or more. Further, the content ratio of the α, β-unsaturated carboxylic acid constituent unit is preferably 30 mass % or less, and more preferably 20 mass % or less. In the invention, from the viewpoint of ease of availability, an ionomer of an ethylene-acrylic acid copolymer and an ionomer of an ethylene-methacrylic acid copolymer are preferred. As examples of an ethylene-based ionomer, a sodium ionomer of an ethylene-acrylic acid copolymer and a sodium ionomer of an ethylene-methacrylic acid copolymer can be exemplified as particularly preferred examples.

Examples of the α, β-unsaturated carboxylic acid constituting the ionomer include acrylic acid, methacrylic acid, maleic acid, monomethyl maleate, monoethyl maleate, and maleic anhydride. However, acrylic acid and methacrylic acid are particularly preferred.

In the case where a composition containing a thermoplastic resin such as a polyvinyl acetal resin is used as the layer B, the layer B contains the thermoplastic resin such as a polyvinyl acetal resin in an amount of preferably 40 mass % or more, more preferably 50 mass % or more, further more preferably 60 mass % or more, particularly preferably 80 mass % or more, and still further more preferably 90 mass % or more, and the layer B may be composed only of the thermoplastic resin such as a polyvinyl acetal resin. When the content of the polyvinyl acetal resin in the layer B is less than 40 mass %, a desired shear storage modulus tends to be difficult to obtain.

The polyvinyl acetal resin is preferably a polyvinyl acetal resin having an average acetalization degree of 40 mol % or more. When the average acetalization degree of the polyvinyl acetal resin is less than 40 mol %, the compatibility with a solvent such as a plasticizer is not favorable. The average acetalization degree of the polyvinyl acetal resin is more preferably 60 mol % or more, and further more preferably 65 mol % or more from the viewpoint of water resistance.

The polyvinyl acetal resin is preferably a polyvinyl acetal resin having an average acetalization degree of 90 mol % or less. When the average acetalization degree of the polyvinyl acetal resin exceeds 90 mol %, it takes a long time for a reaction for obtaining the polyvinyl acetal resin, and therefore, such an average acetalization degree is not preferred from the viewpoint of the process. The average acetalization degree of the polyvinyl acetal resin is more preferably 85 mol % or less, and further more preferably 80 mol % or less from the viewpoint of water resistance.

The polyvinyl acetal resin is preferably a polyvinyl acetal resin in which the content of the vinyl acetate unit in the polyvinyl acetal resin is 30 mol % or less. When the content of the vinyl acetate unit exceeds 30 mol %, blocking is likely to occur when producing the resin, and therefore, it becomes difficult to produce the resin. The content of the vinyl acetate unit in the polyvinyl acetal resin is preferably 20 mol % or less.

The polyvinyl acetal resin is generally constituted by a vinyl acetal unit, a vinyl alcohol unit, and a vinyl acetate unit, and the amount of each of these units can be measured in accordance with, for example, JIS K 6728 "Testing method for polyvinyl butylal" or by nuclear magnetic resonance spectroscopy (NMR).

In the case where the polyvinyl acetal resin contains a unit other than the vinyl acetal unit, the amount of a vinyl alcohol unit and the amount of a vinyl acetate unit are measured, and the total amount of these units is subtracted from the amount of the vinyl acetal unit in the case where a unit other than the vinyl acetal unit is not contained, whereby the amount of the residual vinyl acetal unit can be calculated.

The polyvinyl acetal resin can be produced by a conventionally known method, and typically produced by acetalization of polyvinyl alcohol using an aldehyde. Specific examples include the following method. Polyvinyl alcohol is dissolved in warm water, and while maintaining the resulting aqueous solution at a predetermined temperature, for example, 0° C. or higher and 90° C. or lower, preferably 10° C. or higher and 20° C. or lower, a necessary acid catalyst and an aldehyde are added thereto, and an acetalization reaction is allowed to proceed while stirring the resulting mixture. Then, the reaction temperature is increased to 70° C. to effect aging, and thus, the reaction is completed. Thereafter, neutralization, washing with water, and drying are performed, whereby a polyvinyl acetal resin powder is obtained.

The viscosity-average polymerization degree of the polyvinyl alcohol to be used as a starting material of the polyvinyl acetal resin is preferably 100 or more, more preferably 300 or more, further more preferably 400 or more, still further more preferably 600 or more, particularly preferably 700 or more, and most preferably 750 or more. When the viscosity-average polymerization degree of the polyvinyl alcohol is too low, the penetration resistance and heat creep resistance, particularly the heat creep resistance under high-temperature and high-humidity conditions such as 85° C. and 85% RH are sometimes deteriorated. Further, the viscosity-average polymerization degree of the polyvinyl alcohol is preferably 5,000 or less, more preferably 3,000 or less, further more preferably 2,500 or less, particularly preferably 2,300 or less, and most preferably 2,000 or less. When the viscosity-average polymerization degree of the polyvinyl alcohol exceeds 5,000, it becomes difficult to mold a resin layer.

Incidentally, the viscosity-average polymerization degree of the polyvinyl acetal resin coincides with the viscosity-average polymerization degree of the polyvinyl alcohol to be used as the starting material, and therefore, the preferred viscosity-average polymerization degree of the above-mentioned polyvinyl alcohol coincides with the preferred viscosity-average polymerization degree of the polyvinyl acetal resin.

It is preferred to set the amount of the vinyl acetate unit in the obtained polyvinyl acetal resin to 30 mol % or less, and therefore, it is preferred to use polyvinyl alcohol having a saponification degree of 70 mol % or more. When the saponification degree of the polyvinyl alcohol is less than 70 mol %, the transparency or heat resistance of the resin is sometimes deteriorated, and also the reactivity with an aldehyde is sometimes decreased. The saponification degree thereof is more preferably 95 mol % or more.

The viscosity-average polymerization degree and the saponification degree of the polyvinyl alcohol can be measured in accordance with, for example, JIS K 6726 "Testing method for polyvinyl alcohol".

The aldehyde to be used for acetalization of the polyvinyl alcohol is preferably an aldehyde having a carbon number of 1 or more and 12 or less. When the number of carbon atoms in the aldehyde exceeds 12, the acetalization reactivity is decreased, and moreover, during the reaction, a resin block is likely to be formed, and thus, the synthesis of the resin is likely to involve difficulties.

The aldehyde is not particularly limited, and examples thereof include aliphatic, aromatic, and alicyclic aldehydes such as formaldehyde, acetaldehyde, propionaldehyde, n-butyraldehyde, isobutyraldehyde, valeraldehyde, n-hexylaldehyde, 2-ethylbutyraldehyde, n-heptylaldehyde, n-octylaldehyde, n-nonylaldehyde, n-decylaldehyde, benzaldehyde, and cinnamaldehyde. Among these, an aliphatic aldehyde having a carbon number of 2 or more and 6 or less is preferred, and above all, butyraldehyde is particularly preferred. Further, the above aldehydes may be used alone or two or more types may be used in combination. In addition, small amounts of multifunctional aldehydes, aldehydes having other functional groups, and the like may be used in combination within the range of 20 mass % or less of the total aldehydes.

To the layer B, as a component other than the thermoplastic resin such as a polyvinyl acetal resin, further a heat shielding material, a UV absorber, a plasticizer, an antioxidant, a light stabilizer, an adhesive strength adjusting agent and/or any of various additives for adjusting the adhesiveness, a blocking inhibitor, a pigment, a dye, or the like may be added as needed.

The heat shielding material (for example, inorganic heat shielding fine particles or an organic heat shielding material) may be contained in the layer B. As the heat shielding material, the same heat shielding material as the one which can be contained in the layer A can be used.

In the case where the heat shielding material is contained in the layer B, the infrared absorbing ability of the heat shielding material is proportional to the optical path length (m) when infrared light passes through the layer B and the concentration ($g/m^3$) of the heat shielding material in the layer B. Therefore, the infrared absorbing ability of the heat shielding material is proportional to the area density ($g/m^2$) of the heat shielding material in the layer B.

In the case where metal-doped tungsten oxide (cesium-doped tungsten oxide) is used as the heat shielding material in the layer B, the area density ($g/m^2$) of the heat shielding material is preferably 0.10 or more, more preferably 0.15 or more, and further more preferably 0.20 or more. When the area density ($g/m^2$) of the heat shielding material in the layer B is less than 0.10, a sufficient heat shielding effect tends to be difficult to obtain. In the case where metal-doped tungsten oxide (cesium-doped tungsten oxide) is used as the heat shielding material in the layer B, the area density ($g/m^2$) of the heat shielding material is preferably 1.00 or less, more preferably 0.70 or less, and further more preferably 0.50 or less. When the area density ($g/m^2$) of the heat shielding material in the layer B exceeds 1.00, in the case where a laminated glass is formed, the visible light transmittance tends to be decreased, the haze tends to be deteriorated, the weather resistance tends to be decreased, or the change in color difference tends to be increased.

In the case where tin-doped indium oxide is used as the heat shielding material in the layer B, the area density ($g/m^2$) of the heat shielding material is preferably 0.5 or more, more preferably 1.0 or more, further more preferably 1.50 or more, particularly preferably 2.25 or more, and most preferably 3.00 or more. In the case where tin-doped indium oxide is used as the heat shielding material in the layer B, the area density ($g/m^2$) of the heat shielding material is preferably 15.00 or less, more preferably 10.50 or less, and further more preferably 7.50 or less.

In the case where antimony-doped tin oxide is used as the heat shielding material in the layer B, the area density ($g/m^2$) of the heat shielding material is preferably 1.00 or more, more preferably 1.50 or more, and furthermore preferably 2.00 or more. In the case where antimony-doped tin oxide is used as the heat shielding material in the layer B, the area density ($g/m^2$) of the heat shielding material is preferably 10.00 or less, more preferably 7.00 or less, and further more preferably 5.00 or less.

In the case where a phthalocyanine compound is used as the heat shielding material in the layer B, the area density ($g/m^2$) of the heat shielding material is preferably 0.010 or more, more preferably 0.015 or more, and further more preferably 0.020 or more. In the case where a phthalocyanine compound is used as the heat shielding material in the layer B, the area density ($g/m^2$) of the heat shielding material is preferably 0.100 or less, more preferably 0.070 or less, and further more preferably 0.050 or less.

In the case where aluminum-doped zinc oxide is used as the heat shielding material in the layer B, the area density ($g/m^2$) of the heat shielding material is preferably 1.00 or more, more preferably 1.50 or more, and furthermore preferably 2.00 or more. In the case where aluminum-doped zinc oxide is used as the heat shielding material in the layer B, the area density ($g/m^2$) of the heat shielding material is preferably 10.00 or less, more preferably 7.00 or less, and further more preferably 5.00 or less.

In the case where zinc antimonate is used as the heat shielding material in the layer B, the area density ($g/m^2$) of the heat shielding material is preferably 1.00 or more, more preferably 1.50 or more, and further more preferably 2.00 or more. In the case where zinc antimonate is used as the heat shielding material in the layer B, the area density ($g/m^2$) of the heat shielding material is preferably 10.00 or less, more preferably 7.00 or less, and further more preferably 5.00 or less.

In the case where lanthanum hexaboride is used as the heat shielding material in the layer B, the area density ($g/m^2$) of the heat shielding material is preferably 0.02 or more, more preferably 0.03 or more, and further more preferably 0.04 or more. In the case where lanthanum hexaboride is used as the heat shielding material in the layer B, the area density ($g/m^2$) of the heat shielding material is preferably 0.20 or less, more preferably 0.14 or less, and further more preferably 0.10 or less.

In the interlayer film for laminated glass of the invention, it is preferred that the heat shielding material is contained in the layer B, and at least one type of UV absorber is contained in at least the layer B. By configuring the interlayer film for laminated glass as described above, for example, in the case where the layer A is used as an inner layer and the layer B is used as an outer layer, the thermoplastic elastomer in the layer A is protected from UV light, and also the heat shielding properties of the interlayer film for laminated glass can be enhanced.

In the case where the interlayer film for laminated glass of the invention has a three-layer structure of layer B/layer A/layer B using the layer B as an outer layer, by adopting an embodiment in which a heat shielding material is contained in the layer B, infrared light passes through the optical path length of the two layers B, and therefore, the heat shielding properties can be enhanced without deteriorating the visible light transmittance or haze of the laminated glass.

In the interlayer film for laminated glass of the invention, it is further preferred that a UV absorber is contained in at least the layer B. By incorporating the UV absorber in at least the layer B, when the layer A is used as an inner layer, the layer A can be protected from UV light. As a result, in the case where a laminated glass is formed, the deterioration of the haze or the decrease in the weather resistance can be prevented, or the change in color difference can be suppressed.

Examples of the UV absorber which can be used in the layer B include the same UV absorbers as the ones which may be contained in the layer A.

The area density ($g/m^2$) of the UV absorber in the layer B is preferably 0.1 or more, more preferably 0.2 or more, further more preferably 0.5 or more, and particularly preferably 0.7 or more. When the area density ($g/m^2$) of the UV absorber in the layer B is 0.1 or more, in the case where a laminated glass is formed, the haze tends to be improved, the weather resistance tends to be maintained, or the change in color difference tends to be suppressed.

The area density ($g/m^2$) of the UV absorber in the layer B is preferably 10 or less, more preferably 9 or less, and further more preferably 8 or less. When the area density ($g/m^2$) of the UV absorber in the layer B exceeds 10, in the case where a laminated glass is formed, the visible light transmittance tends to be decreased, the haze tends to be deteriorated, the weather resistance tends to be decreased, or the change in color difference tends to be increased.

The addition amount of the UV absorber is preferably 10 ppm or more, and more preferably 100 ppm or more on a mass basis with respect to the thermoplastic resin contained in the layer B. When the addition amount is less than 10 ppm, it is sometimes difficult to exhibit a sufficient effect. Incidentally, as the UV absorber, two or more types can be used in combination.

The addition amount of the UV absorber is preferably 50,000 ppm or less, and more preferably 10,000 ppm or less on a mass basis with respect to the thermoplastic resin contained in the layer B. Even if the addition amount is set to more than 50,000 ppm, a marked effect cannot be expected.

(Plasticizer)

The type of plasticizer to be used in the layer B of the invention is not particularly limited, and for example, a carboxylic acid ester-based plasticizer such as a monovalent carboxylic acid ester-based plasticizer or a polyvalent carboxylic acid ester-based plasticizer; a phosphoric acid ester-based plasticizer, an organic phosphite-based plasticizer, or the like, and other than these, a polymeric plasticizer such as a carboxylic acid polyester-based plasticizer, a carbonic acid polyester-based plasticizer, or a polyalkylene glycol-based plasticizer; or a hydroxycarboxylic acid ester-based plasticizer such as an ester compound of a hydroxycarboxylic acid and a polyhydric alcohol such as castor oil or an ester compound of a hydroxycarboxylic acid and a monohydric alcohol can also be used.

The monovalent carboxylic acid ester-based plasticizer is a compound obtained by a condensation reaction of a monovalent carboxylic acid such as butanoic acid, isobutanoic acid, hexanoic acid, 2-ethylbutanoic acid, heptanoic acid, octylic acid, 2-ethylhexanoic acid, or lauric acid with a polyhydric alcohol such as ethylene glycol, diethylene glycol, triethylene glycol, tetraethylene glycol, polyethylene glycol, polypropylene glycol, or glycerin, and specific examples of the compound include triethylene glycol di-2-diethylbutanoate, triethylene glycol diheptanoate, triethylene glycol di-2-ethylhexanoate, triethylene glycol dioctanoate, tetraethylene glycol di-2-ethylbutanoate, tetraethylene glycol diheptanoate, tetraethylene glycol di-2-ethylhexanoate, tetraethylene glycol dioctanoate, diethylene glycol di-2-ethylhexanoate, PEG 400 di-2-ethylhexanoate, triethylene glycol mono-2-ethylhexanoate, and a completely or partially esterified product of glycerin or diglycerin with 2-ethylhexanoic acid. Here, the "PEG 400" refers to polyethylene glycol having an average molecular weight of 350 to 450.

Examples of the polyvalent carboxylic acid ester-based plasticizer include compounds obtained by a condensation reaction of a polyvalent carboxylic acid such as adipic acid, succinic acid, azelaic acid, sebacic acid, phthalic acid, isophthalic acid, terephthalic acid, or trimellitic acid with an alcohol having 1 to 12 carbon atoms such as methanol, ethanol, butanol, hexanol, 2-ethylbutanol, heptanol, octanol, 2-ethylhexanol, decanol, dodecanol, butoxyethanol, butoxyethoxyethanol, or benzyl alcohol. Specific examples of the compound include dihexyl adipate, di-2-ethylbutyl adipate, diheptyl adipate, dioctyl adipate, di-2-ethylhexyl adipate, di(butoxyethyl) adipate, di(butoxyethoxyethyl) adipate, mono(2-ethylhexyl) adipate, dibutyl sebacate, dihexyl sebacate, di-2-ethylbutyl sebacate, dibutyl phthalate, dihexyl phthalate, di(2-ethylbutyl) phthalate, dioctyl phthalate, di(2-ethylhexyl) phthalate, benzylbutyl phthalate, and didodecyl phthalate.

Examples of the phosphoric acid-based plasticizer or the phosphorous acid-based plasticizer include compounds obtained by a condensation reaction of phosphoric acid or phosphorous acid with an alcohol having 1 to 12 carbon atoms such as methanol, ethanol, butanol, hexanol, 2-ethylbutanol, heptanol, octanol, 2-ethylhexanol, decanol, dodecanol, butoxyethanol, butoxyethoxyethanol, or benzyl alcohol. Specific examples of the compound include trimethyl phosphate, triethyl phosphate, tripropyl phosphate, tributyl phosphate, tri(2-ethylhexyl) phosphate, tri(butoxyethyl) phosphate, and tri(2-ethylhexyl) phosphite.

The carboxylic acid polyester-based plasticizer may be a carboxylic acid polyester obtained by alternating copolymerization of a polyvalent carboxylic acid such as oxalic acid, malonic acid, succinic acid, adipic acid, suberic acid, sebacic acid, dodecanedioic acid, 1,2-cyclohexanedicarboxylic acid, 1,3-cyclohexanedicarboxylic acid, or 1,4-cyclohexanedicarboxylic acid with a polyhydric alcohol such as ethylene glycol, diethylene glycol, triethylene glycol, tetraethylene glycol, 1,2-propylene glycol, 1,3-propylene glycol, 1,2-butylene glycol, 1,3-butylene glycol, 1,4-butylene glycol, 1,2-pentanediol, 1,5-pentanediol, 2,4-pentanediol, 1,2-hexanediol, 1,6-hexanediol, 3-methyl-1,5-pentanediol, 3-methyl-2,4-pentanediol, 1,2-heptanediol, 1,7-heptanediol, 1,2-octanediol, 1,8-octanediol, 1,2-nonanediol, 1,9-nonanediol, 2-methyl-1,8-octanediol, 1,2-decanediol, 1,10-decanediol, 1,2-dodecanediol, 1,12-dodecanediol, 1,2-cyclohexanediol, 1,3-cyclohexanediol, 1,4-cyclohexanediol, 1,2-bis(hydroxymethyl) cyclohexane, 1,3-bis(hydroxymethyl) cyclohexane, or 1,4-bis(hydroxymethyl) cyclohexane; a polymer of a hydroxycarboxylic acid (hydroxycarboxylic acid polyester) such as an aliphatic hydroxycarboxylic acid (such as glycolic acid, lactic acid, 2-hydroxybutyric acid, 3-hydroxybutyric acid, 4-hydroxybutyric acid, 6-hydroxyhexanoic acid, 8-hydroxyhexanoic acid, 10-hydroxydecanoic acid, or 12-hydroxydodecanoic acid), or a hydroxycarboxylic acid having an aromatic ring [such as 4-hydroxybenzoic acid or 4-(2-hydroxyethyl)benzoic acid]; or a carboxylic acid polyester obtained by ring-opening polymerization of a lactone compound such as an aliphatic lactone compound (such as γ-butyrolactone, γ-valerolactone, δ-valerolactone, β-methyl-δ-valerolactone, δ-hexanolactone, ε-caprolactone, or lactide) or a lactone compound having an aromatic ring (such as phthalide). The terminal structure of such a carboxylic acid polyester is not particularly limited and may be a hydroxy group or a carboxyl group, or the terminal hydroxy group or the terminal carboxyl group may be reacted with a monovalent carboxylic acid or a monohydric alcohol to form an ester bond.

Examples of the carbonic acid polyester-based plasticizer include a carbonic acid polyester obtained by alternating copolymerization of a polyhydric alcohol such as ethylene glycol, diethylene glycol, triethylene glycol, tetraethylene glycol, 1,2-propylene glycol, 1,3-propylene glycol, 1,2-butylene glycol, 1,3-butylene glycol, 1,4-butylene glycol, 1,2-pentanediol, 1,5-pentanediol, 2,4-pentanediol, 1,2-hexanediol, 1,6-hexanediol, 3-methyl-1,5-pentanediol, 3-methyl-2,4-pentanediol, 1,2-heptanediol, 1,7-heptanediol, 1,2-octanediol, 1,8-octanediol, 1,2-nonanediol, 1,9-nonanediol, 2-methyl-1,8-octanediol, 1,2-decanediol, 1,10-decanediol, 1,2-dodecanediol, 1,12-dodecanediol, 1,2-cyclohexanediol, 1,3-cyclohexanediol, 1,4-cyclohexanediol, 1,2-bis(hydroxymethyl)cyclohexane, 1,3-bis(hydroxymethyl) cyclohexane, or 1,4-bis(hydroxymethyl)cyclohexane with a carbonic acid ester such as dimethyl carbonate or diethyl carbonate through a transesterification reaction. The terminal structure of such a carbonic acid polyester compound is not particularly limited, but may be a carbonic acid ester group, a hydroxy group, or the like.

Examples of the polyalkylene glycol-based plasticizer include a polymer obtained by ring-opening polymerization of an alkylene oxide such as ethylene oxide, propylene oxide, butylene oxide, or oxetane using a monohydric alcohol, a polyhydric alcohol, a monovalent carboxylic acid, or a polyvalent carboxylic acid as an initiator.

As the hydroxycarboxylic acid ester-based plasticizer, a monohydric alcohol ester of a hydroxycarboxylic acid (such as methyl ricinoleate, ethyl ricinoleate, butyl ricinoleate, methyl 6-hydroxyhexanoate, ethyl 6-hydroxyhexanoate, or butyl 6-hydroxyhexanoate), or a polyhydric alcohol ester of a hydroxycarboxylic acid [such as ethylene glycol di(6-hydroxyhexanoic acid) ester, diethylene glycol di(6-hydroxyhexanoic acid) ester, triethylene glycol di(6-hydroxyhexanoic acid) ester, 3-methyl-1,5-pentanediol di(6-hydroxyhexanoic acid) ester, 3-methyl-1,5-pentanediol di(2-hydroxybutyric acid) ester, 3-methyl-1,5-pentanediol di(3-hydroxybutyric acid) ester, 3-methyl-1,5-pentanediol di(4-hydroxybutyric acid) ester, triethylene glycol di(2-hydroxybutyric acid) ester, glycerin tri(ricinoleic acid) ester, di(1-(2-ethylhexyl)) L-tartrate, or castor oil], and other than these, a compound in which hydroxycarboxylic acid-derived groups in number of k in a polyhydric alcohol ester of a hydroxycarboxylic acid have been substituted with a carboxylic acid-derived group containing no hydroxy groups or a hydrogen atom can also be used, and as the hydroxycarboxylic acid esters, those obtained by a conventionally known method can be used.

In the invention, these plasticizers may be used alone or a two or more types may be used in combination.

In the case where a plasticizer is contained in the layer B, from the viewpoint of compatibility of the plasticizer with the resin (particularly the polyvinyl acetal resin) to be used in the layer B, a low transferability to another layer, and the enhancement of nontransferability, it is preferred to use an ester-based plasticizer or an ether-based plasticizer which has a melting point of 30° C. or lower and a hydroxyl value of 15 mgKOH/g or more and 450 mgKOH/g or less, or an ester-based plasticizer or an ether-based plasticizer which is amorphous and has a hydroxyl value of 15 mgKOH/g or more and 450 mgKOH/g or less. Here, the term "amorphous" refers to that the melting point is not observed at a temperature of −20° C. or higher. The hydroxyl value is preferably 15 mgKOH/g or more, more preferably 30 mgKOH/g or more, and most suitably 45 mgKOH/g or more. Further, the hydroxyl value is preferably 450 mgKOH/g or less, more preferably 360 mgKOH/g or less, and most suitably 280 mgKOH/g or less. Examples of the ester-based plasticizer include polyesters (the above-mentioned carboxylic acid polyester-based plasticizer, carbonic acid polyester-based plasticizer, and the like) and hydroxycarboxylic acid ester compounds (the above-mentioned hydroxycarboxylic acid ester-based plasticizer and the like) satisfying the above conditions, and examples of the ether-based plasticizer include polyether compounds (the above-mentioned polyalkylene glycol-based plasticizer and the like) satisfying the above conditions.

The content of the plasticizer is preferably 50 parts by mass or less, more preferably 25 parts by mass or less, further more preferably 20 parts by mass or less, particularly preferably 10 parts by mass or less, more particularly preferably 6 parts by mass or less, and most preferably 0 parts by mass (that is, the plasticizer is not contained) with respect to 100 parts by mass of the thermoplastic resin such as a polyvinyl acetal resin or an ethylene-vinyl acetate copolymer or an ionomer. When the content of the plasticizer exceeds 50 parts by mass, the shear storage modulus of the layer B and the interlayer film for laminated glass tends to be decreased. Further, two or more types of plasticizers may be used in combination.

As the plasticizer, a compound having a hydroxy group can be used, however, the ratio of the content of the compound having a hydroxy group with respect to the total amount of the plasticizer to be used in the layer B is preferably 10 mass % or more, more preferably 12 mass % or more, further more preferably 15 mass % or more, and particularly preferably 20 mass % or more. The ratio of the content of the compound having a hydroxy group with respect to the total amount of the plasticizer to be used in the layer B is preferably 100 mass % or less, more preferably 99 mass % or less, and further more preferably 98 mass % or less. The compound having a hydroxy group has high compatibility with a polyvinyl acetal resin and has low transferability to another resin layer, and therefore, the compound having a hydroxy group can be favorably used.

As the antioxidant which may be contained in the layer B, the same antioxidant as the one which is contained in the layer A is used.

The antioxidants can be used alone or two or more types can be used in combination. The area density of the antioxidant in the layer B is preferably 0.1 g/m$^2$ or more, more preferably 0.2 or more, and furthermore preferably 0.5 or more. When the area density of the antioxidant in the layer B is less than 0.1 g/m$^2$, the layer B is easily oxidized, and in the case where the laminated glass is used for a long period of time, the change in color difference is increased, and so on, and thus, the weather resistance tends to be decreased.

The area density of the antioxidant in the layer B is preferably 2.5 g/m$^2$ or less, more preferably 1.5 or less, and further more preferably 2.0 or less. When the area density of the antioxidant in the layer B exceeds 2.5 g/m$^2$, the color tone of the layer B tends to be impaired or the haze of the laminated glass tends to be decreased.

The blending amount of the antioxidant is preferably 0.001 parts by mass or more, and more preferably 0.01 parts by mass or more with respect to 100 parts by mass of the thermoplastic resin such as a polyvinyl acetal resin. When the amount of the antioxidant is less than 0.001 parts by mass, it is sometimes difficult to exhibit a sufficient effect.

The blending amount of the antioxidant is preferably 5 parts by mass or less, more preferably 4 parts by mass or less, and most preferably 3 parts by mass or less with respect to 100 parts by mass of the thermoplastic resin such as a polyvinyl acetal resin. Even if the amount of the antioxidant is set to more than 5 parts by mass, a marked effect cannot be expected.

As the light stabilizer which may be contained in the layer B, the same light stabilizer as the one which is contained in the layer A is used.

The blending amount of the light stabilizer is preferably 0.01 parts by mass or more, and more preferably 0.05 parts by mass or more with respect to 100 parts by mass of the thermoplastic resin such as a polyvinyl acetal resin to be contained in the layer B. When the amount of the light stabilizer is less than 0.01 parts by mass, it is sometimes difficult to exhibit a sufficient effect. Further, the content of the light stabilizer is preferably 10 parts by mass or less, and more preferably 5 parts by mass or less with respect to 100 parts by mass of the resin to be contained in the layer B. Even if the amount of the light stabilizer is set to more than 10 parts by mass, a marked effect cannot be expected. The area density of the light stabilizer in the layer B is preferably 0.05 g/m$^2$ or more, and more preferably 0.5 g/m$^2$ or more. Further, the area density is preferably 70 g/m$^2$ or less, and more preferably 30 g/m$^2$ or less.

Further, in order to control the adhesiveness of the interlayer film for laminated glass to a glass or the like, an adhesive strength adjusting agent and/or any of various additives for adjusting the adhesiveness may be contained in the layer B as needed.

As the various additives for adjusting the adhesiveness, those disclosed in WO 03/033583 can be used, and an alkali metal salt or an alkaline earth metal salt is preferably used, and examples thereof include salts of potassium, sodium, magnesium, and the like. Examples of the salts include salts of organic acids such as carboxylic acids such as octanoic acid, hexanoic acid, butyric acid, acetic acid, and formic acid; and inorganic acids such as hydrochloric acid and nitric acid.

The most suitable addition amount of each of the adhesive strength adjusting agent and/or the various additives for adjusting the adhesiveness varies depending on the additive to be used, however, it is preferred to adjust the adhesive strength of the interlayer film for laminated glass to be obtained to a glass as measured by the Pummel test (described in WO 03/033583) to generally 3 or more and 10 or less, and to 3 or more and 6 or less in the case where particularly high penetration resistance is needed, and to 7 or more and 10 or less in the case where high shatterproof properties are needed. In the case where high shatterproof properties are required, a method in which the adhesive strength adjusting agent and/or any of various additives for adjusting the adhesiveness are/is not added is also a useful method.

From the viewpoint of improving the bending strength when a laminated glass is formed using the interlayer film for laminated glass of the invention, the layer B has a shear storage modulus at a temperature of 25° C. as measured by performing a complex shear viscosity test at a frequency of 1 Hz in accordance with JIS K 7244-10 of preferably 10.0 MPa or more, more preferably 20.0 MPa or more, further more preferably 40.0 MPa or more, particularly preferably 60.0 MPa or more, and most preferably 80.0 MPa or more. The layer B having a shear storage modulus of 10.0 MPa or more can be obtained by, for example, setting the amount of the plasticizer to 25 parts by mass or less with respect to 100 parts by mass of the thermoplastic resin such as a polyvinyl acetal resin. Further, the upper limit of the shear storage modulus at 25° C. thereof is not particularly limited, but is preferably 900 MPa or less from the viewpoint of the moldability and handleability of the interlayer film for laminated glass.

[Interlayer Film for Laminated Glass]

The interlayer film for laminated glass of the invention is an interlayer film for laminated glass including at least one layer A containing a thermoplastic elastomer, wherein the thermoplastic elastomer includes a hard segment block and a soft segment block, the layer A has a sea-island phase separated structure in which the hard segment block is included as an island component and the soft segment block is included as a sea component, and the layer A has a specific degree of orientation which is obtained by small-angle X-ray scattering measurement. The interlayer film for laminated glass of the invention preferably has a layer B containing a thermoplastic resin on at least one surface of the layer A, and is also preferably composed of an interlayer film for laminated glass in which the layer A described above is laminated between at least two layers B described above.

Further, in the interlayer film for laminated glass of the invention, as described above, it is preferred that the island component of the layer A has a specific size. In addition, it is preferred that a laminated glass in which the interlayer film for laminated glass is sandwiched between two glasses has a birefringence phase difference of 0 to 140 nm. Since the orientation of the island components of the interlayer film for laminated glass of the invention is presumed to be low, it can be favorably used as an interlayer film for laminated glass having low shrinkability.

From the viewpoint of improving the color tone while achieving both sound insulating properties and heat shielding properties when a laminated glass is formed, the interlayer film for laminated glass of the invention is preferably such that in the case where a laminated glass in which the interlayer film is sandwiched between two clear glasses with the total thickness of the clear glasses being 4 mm or less is formed, the visible light transmittance thereof is 70% or more and the average transmittance of infrared light in the wavelength range of 800 to 1,100 nm thereof is 70% or less. In order to form an interlayer film for laminated glass satisfying the above configuration, it is preferred to form an interlayer film for laminated glass in which at least one layer A containing a thermoplastic elastomer is included and the above-mentioned heat shielding material is contained in at least one layer.

From the viewpoint of ensuring the visibility when a laminated glass is formed with a clear glass, the visible light transmittance thereof is preferably 70% or more, and more preferably 72% or more. When the visible light transmittance in the case where a laminated glass is formed is less than 70%, the visibility of the laminated glass tends to be impaired.

Similarly, from the viewpoint of further improving the heat shielding properties when a laminated glass is formed with a clear glass, the average transmittance of infrared light in the wavelength range of 800 to 1,100 nm thereof is preferably 70% or less, more preferably 69% or less, further more preferably 68% or less, and particularly preferably 65% or less. When the average transmittance of infrared light in the wavelength range of 800 to 1,100 nm in the case where a laminated glass is formed exceeds 70%, the heat shielding properties tend to be decreased.

From the viewpoint of improving the color tone while achieving both sound insulating properties and heat shielding properties when a laminated glass is formed, the interlayer film for laminated glass of the invention is preferably such that in the case where a laminated glass in which the interlayer film is sandwiched between two green glasses with the total thickness of the green glasses being 4 mm or less is formed, the visible light transmittance thereof is 70% or more and the average transmittance of infrared light in the wavelength range of 800 to 1,100 nm thereof is 32% or less. In order to form an interlayer film for laminated glass satisfying the above configuration, it is preferred to form an interlayer film for laminated glass in which at least one layer A containing a thermoplastic elastomer is included and the above-mentioned heat shielding material is contained in at least one layer.

From the viewpoint of ensuring the visibility when a laminated glass is formed with a green glass, the visible light transmittance thereof is preferably 70% or more, and more preferably 72% or more. When the visible light transmittance in the case where a laminated glass is formed is less than 70%, the color tone of the laminated glass tends to be impaired.

Similarly, from the viewpoint of further improving the heat shielding properties when a laminated glass is formed with a green glass, the average transmittance of infrared light in the wavelength range of 800 to 1,100 nm thereof is preferably 32% or less, and more preferably 31% or less. When the average transmittance of infrared light in the wavelength range of 800 to 1,100 nm in the case where a laminated glass is formed exceeds 32%, the heat shielding properties tend to be decreased.

From the viewpoint of improving the weather resistance and suppressing the change in color difference, the interlayer film for laminated glass of the invention is preferably such that in the case where a laminated glass in which the interlayer film is sandwiched between two glasses with the total thickness of the glasses being 4 mm or less is formed and a weathering test is performed for the laminated glass by exposure for 200 hours under the conditions that the irradiance is 180 W/m$^2$, the black panel temperature is 60° C., and the relative humidity is 50%, the change in color difference $\Delta E^*ab$ in accordance with JIS Z 8781-4: 2013 for the laminated glass between before and after the weathering test is 2.0 or less. In order to form an interlayer film for laminated glass satisfying the above configuration, it is preferred to form an interlayer film for laminated glass in which at least one layer A containing a thermoplastic elastomer is included and the above-mentioned heat shielding material is contained in at least one layer.

From the viewpoint of further improving the weather resistance and further suppressing the change in color difference when a laminated glass is formed, the change in color difference $\Delta E^*ab$ thereof is preferably 1.8 or less, and more preferably 1.5 or less. When the change in color difference $\Delta E^*ab$ thereof under the above conditions exceeds 2.0, the laminated glass tends to be easily discolored yellow by the long-term use thereof.

The interlayer film for laminated glass of the invention is preferably such that in the case where a laminated glass in which the interlayer film is sandwiched between two glasses with the total thickness of the glasses being 4 mm or less is formed, the haze thereof is 5 or less.

From the viewpoint of forming a laminated glass having a higher transparency, the haze thereof is more preferably 4 or less, further more preferably 3 or less, particularly preferably 2 or less, more particularly preferably 1 or less, and most preferably 0.6 or less. In the case where a laminated glass is formed, when the haze thereof exceeds 5, the transparency is decreased, so that it tends not to be suitable for a laminated glass for a car or the like.

The interlayer film for laminated glass of the invention is preferably such that in the case where a laminated glass in which the interlayer film is sandwiched between two glasses is formed, the sound transmission loss thereof at 4,000 Hz as measured under the conditions of ASTM E 90-09 (Standard Test Method for Laboratory Measurement of Airborne Sound Transmission Loss of Building Partitions and Elements) is 37 dB or more. From the viewpoint of forming a laminated glass having higher sound insulating properties, the sound transmission loss thereof at 4,000 Hz as measured under the conditions of ASTM E 90-09 is more preferably 38 dB or more, and further more preferably 40 dB or more. Also in the case where a laminated glass in which the interlayer film is sandwiched between two glasses with the total thickness of the glasses being 4 mm or less is formed, it is preferred to satisfy the above sound insulating properties.

The ratio of the total thickness of the layer A to the total thickness of the layer B (the total thickness of the layer A/the total thickness of the layer B) is preferably 1/30 or more, more preferably 1/15 or more, and further more preferably 1/5 or more. When the ratio is 1/30 or more, the sound insulating effect of the interlayer film for laminated glass tends to be improved.

The ratio of the total thickness of the layer A to the total thickness of the layer B (the total thickness of the layer A/the total thickness of the layer B) is preferably 1/1 or less, more preferably 1/2 or less, and further more preferably 1/3 or less. When the ratio is 1/1 or less, the heat creep resistance of the interlayer film for laminated glass and the bending strength when a laminated glass is formed tend to be improved.

The interlayer film for laminated glass of the invention may have a two-layer structure of layer A/layer B, or can have a laminated structure in which the layer A (1) is sandwiched between the layer B (2a) and the layer B (2b) as shown in FIG. 1. The laminated structure of the interlayer film for laminated glass can be determined according to the intended use, however, other than a laminated structure of layer B/layer A/layer B, a laminated structure of layer B/layer A/layer B/layer A or layer B/layer A/layer B/layer A/layer B may be adopted.

Further, at least one layer (named "layer C") other than the layer A and the layer B may be included, and for example, a laminated structure of layer B/layer A/layer C/layer B, layer B/layer A/layer B/layer C, layer B/layer C/layer A/layer C/layer B, layer B/layer C/layer A/layer B/layer C, layer C/layer B/layer A/layer B/layer C, layer C/layer B/layer A/layer C/layer B/layer C/layer A/layer B/layer C, or the like may be adopted. Further, in the above laminated structure, the components in the layer C may be the same or different. The same shall apply also to the components in the layer A or the layer B. Also in the above-mentioned structures, the structure is preferably a laminated structure in which the layer A described above is disposed between at least two layers B described above. It is also preferred that the layer B constitutes at least one outermost layer.

As the layer C, a layer composed of a known resin can be used, and for example, polyethylene, polypropylene, polyvinyl chloride, polystyrene, polyvinyl acetate, polyurethane, polytetrafluoroethylene, an acrylic resin, polyamide, polyacetal, polycarbonate, polyester (polyethylene terephthalate or polybutylene terephthalate), a cyclic polyolefin, polyphenylene sulfide, polytetrafluoroethylene, polysulfone, polyethersulfone, polyarylate, a liquid crystalline polymer, polyimide, or the like can be used. Further, also to the layer C, an additive such as a plasticizer, an antioxidant, a UV absorber, a light stabilizer, an adhesive strength adjusting agent, a blocking inhibitor, a pigment, a dye, or a heat shielding material (for example, inorganic heat shielding fine particles or an organic heat shielding material having an infrared absorbing ability) may be added as needed. As the additives, the same additives as the ones which are used in the layer A or the layer B can be used.

[Production Method for Laminate (Interlayer Film for Laminated Glass)]

The interlayer film for laminated glass of the invention can be produced by a melting method. In the above-mentioned thermoplastic resin or thermoplastic elastomer, another additive is blended as needed, and the resulting mixture is uniformly kneaded, and then, an interlayer film for laminated glass is produced by a melting method. By doing this, the orientation of the island components is decreased, and thus, the shrinkability can be decreased.

In the case where the interlayer film for laminated glass is produced by a melting method, it is preferred to set the resin molding temperature to 180 to 250° C. By performing the melting method under the above conditions, the orientation of the island components is decreased, and thus, the shrinkability can be decreased.

Further, as the melting method, it is more preferred to use a melt extrusion method using a T die. In the above-mentioned thermoplastic resin or thermoplastic elastomer, another additive is blended as needed, and the resulting mixture is uniformly kneaded, and then, an interlayer film for laminated glass is produced by a melt extrusion method using a T die. By doing this, the orientation of the island components is further decreased, and thus, the shrinkability can be further decreased.

In the case where the interlayer film for laminated glass is produced by a melt extrusion method using a T die, it is preferred to set the resin molding temperature to 180 to 250° C. Further, it is preferred to set the ejection amount to 10 to 300 kg/hr. By performing the melt extrusion method using a T die under the above conditions, the orientation of the island components is further decreased, and thus, the shrinkability can be further decreased.

As the melt extrusion method using a T die, it is more preferred to produce the interlayer film for laminated glass by a coextrusion method. In the case where the interlayer film for laminated glass is produced by a coextrusion method, it is preferred to set the temperature of a cooling roll to 5 to 30° C. Further, it is preferred to set the take-up speed to 1 to 10 m/min. By performing the coextrusion under the above conditions, the orientation of the island components is further decreased, and thus, the shrinkability can be further decreased.

Other than the above-mentioned methods, the interlayer film for laminated glass of the invention may be produced by forming the respective layers such as the layer A and the layer B by a known film forming method such as an extrusion method, a calendaring method, a pressing method, a casting method, or an inflation method, and laminating these layers.

In the case where a film (sheet) is produced using an extruder, the resin temperature during extrusion is preferably 150° C. or higher, and more preferably 170° C. or higher. Further, the resin temperature during extrusion is preferably 250° C. or lower, and more preferably 230° C. or lower. When the resin temperature is too high, there is a concern that the polyvinyl acetal resin and the thermoplastic elastomer are decomposed to deteriorate the resin. On the other hand, when the temperature is too low, the ejection from the extruder is not stable to cause a mechanical problem. In order to efficiently remove a volatile substance, it is preferred to remove the volatile substance by reducing pressure from the vent port of the extruder.

Further, it is preferred to form a concave-convex structure on the surface of the laminate constituting the interlayer film for laminated glass of the invention by a conventionally known method such as melt fracture or embossment. The shape formed by melt fracture or embossment is not particularly limited, and a conventionally known one can be adopted.

The thickness of the laminate is preferably 20 μm or more, and more preferably 100 μm or more. When the thickness of the laminate is too thin, lamination cannot be favorably performed when a laminated glass is formed in some cases. Further, the thickness of the laminate is preferably 10,000 μm or less, and more preferably 3,000 μm or less. When the thickness of the laminate is too thick, the cost is increased, and therefore, such a thickness is not preferred.

The sound insulting properties of a laminated glass can be evaluated based on a loss factor obtained by a damping test using a central exciting method. The damping test is a test for evaluating how the loss factor changes depending on the frequency or temperature. The loss factor which reaches the maximum in a certain temperature range when the frequency is set constant is referred to as "maximum loss factor". The maximum loss factor is an index indicating the goodness of the damping properties, and specifically is an index representing how fast the bending vibration generated on a plate-shaped object is damped. That is, it can be said that the maximum loss factor is used as an index of the sound insulating properties, and as the maximum loss factor of a laminated glass is higher, the sound insulating properties of the laminated glass is higher.

In the invention, a laminated glass is formed using the laminate as the interlayer film for laminated glass, and in the case where a damping test is performed for the obtained laminated glass by a central exciting method, the maximum loss factor at a frequency of 2,000 Hz and a temperature of 0° C. or higher and 50° C. or lower is preferably 0.20 or more, more preferably 0.25 or more, and further more preferably 0.28 or more. When the maximum loss factor under the above conditions is less than 0.20, the sound insulating properties of the laminated glass is poor, so that it tends not to be suitable for use for the purpose of sound insulation. The laminated glass having a maximum loss factor as measured under the above conditions of 0.20 or more can be obtained by, for example, laminating a layer A including a composition containing an elastomer which has a peak maximum in tan δ in the range of −40 to 30° C. and a plurality of layers B having a shear storage modulus at a temperature of 25° C. as measured by performing a complex shear viscosity test of 10.0 MPa or more such that the layer A is laminated between at least two layers B.

[Laminated Glass]

From the viewpoint of achieving both sound insulating properties and heat shielding properties, the laminated glass of the invention is preferably a laminated glass which includes an interlayer film for laminated glass, in which at least one layer A containing a thermoplastic elastomer is included and a heat shielding material is contained in at least one layer, sandwiched between at least two clear glasses, and has a visible light transmittance of 70% or more and an average transmittance of infrared light in the wavelength range of 800 to 1,100 nm of 70% or less. In order to form a laminated glass satisfying the above configuration, it is preferred to form a laminated glass using an interlayer film for laminated glass in which at least one layer A containing a thermoplastic elastomer is included and the above-mentioned heat shielding material is contained in at least one layer.

Further, from the viewpoint of achieving both sound insulating properties and heat shielding properties, the laminated glass of the invention is preferably a laminated glass which includes an interlayer film for laminated glass, in which at least one layer A containing a thermoplastic elastomer is included and a heat shielding material is contained in at least one layer, sandwiched between at least two green glasses, and has a visible light transmittance of 70% or more and an average transmittance of infrared light in the wavelength range of 800 to 1,100 nm of 32% or less. In order to form a laminated glass satisfying the above configuration, it is preferred to form a laminated glass using an interlayer film for laminated glass in which at least one layer A containing a thermoplastic elastomer is included and the above-mentioned heat shielding material is contained in at least one layer.

By having the structure of the interlayer film for laminated glass of the invention inside the laminated glass, a laminated glass having excellent bending strength can be obtained. Due to this, the laminated glass of the invention can be favorably used for a glass for a windshield of a car, side windows of a car, a sunroof of a car, a head-up display, and the like. Further, the laminated glass of the invention can also be favorably used as a glass for construction. In the case where the laminated glass having the structure of the interlayer film for laminated glass of the invention therein is applied to a glass for a head-up display, the shape of the cross section of the interlayer film for laminated glass to be used is preferably thick on one end face side and thin on the other end face side. In such a case, the shape of the cross section may be a wedge as a whole such that the thickness gradually decreases from one end face side to the other end face side, or a part of the cross section may have the shape of a wedge such that the thickness is the same from one end face to an arbitrary position between the one end face and the other end face, and the thickness gradually decreases from the arbitrary position to the other end face.

In the laminated glass of the invention, generally two glasses are used. The thickness of the glass constituting the laminated glass of the invention is not particularly limited, but is preferably 100 mm or less. Further, since the interlayer film for laminated glass of the invention has excellent bending strength, even when the laminated glass is formed using a thin plate glass having a thickness of 2.8 mm or less, the strength of the laminated glass is not impaired, and thus, the reduction in the weight of the laminated glass can be realized. From the viewpoint of reduction in the weight, the thickness of at least one glass is preferably 2.8 mm or less, more preferably 2.5 mm or less, further more preferably 2.0 mm or less, and particularly preferably 1.8 mm or less.

The thicknesses of the two glasses may be the same or different. For example, even when the thickness of one glass is set to 1.8 mm or more and the thickness of the other glass is set to 1.8 mm or less, and a difference in the thickness between the two glasses is set to 0.2 mm or more, a laminated glass which has low shrinkability and achieves the reduction in thickness and weight can be formed without deteriorating the sound insulating properties, heat shielding properties, weather resistance, or the like of the laminated glass.

[Production Method for Laminated Glass]

The laminated glass of the invention can be produced by a conventionally known method. Examples of the method include a method using a vacuum laminator device, a method using a vacuum bag, a method using a vacuum ring, and a method using a nip roll. Further, a method of applying an autoclave step after temporary pressure bonding can also be additionally performed.

In the case of using a vacuum laminator device, for example, a known apparatus to be used in the production of a solar battery is used, and lamination is performed under a reduced pressure of $1 \times 10^{-6}$ MPa or more and $3 \times 10^{-2}$ MPa or less at a temperature of 100° C. or higher and 200° C. or lower, particularly at a temperature of 130° C. or higher and 170° C. or lower. The method using a vacuum bag or a vacuum ring is described in, for example, European Patent No. 1235683, and for example, lamination is performed under a pressure of about $2 \times 10^{-2}$ MPa at a temperature of 130° C. or higher and 145° C. or lower.

Examples of the production method for the laminated glass include, in the case where a nip roll is used, a method in which first temporary pressure bonding is performed at a temperature equal to or lower than the flow initiation temperature of the polyvinyl acetal resin, and thereafter temporary pressure bonding is further performed under the conditions of a temperature close to the flow initiation temperature. Specific examples thereof include a method in which heating is performed at 30° C. or higher and 100° C. or lower by an infrared heater or the like, and thereafter, air is removed with a roll, and further heating is performed at 50° C. or higher and 150° C. or lower, and then, bonding or temporary bonding is performed by pressure bonding with a roll.

Further, the laminated glass may be formed by putting glasses in which the layer B is applied to both surfaces of the layer A together and laminating the glasses so that the interlayer film for laminated glass of the invention is included inside the laminated glass.

The autoclave step to be performed additionally after temporary pressure bonding is performed, for example, under a pressure of about 1 MPa or more and 15 MPa or less at a temperature of 130° C. or higher and 155° C. or lower for about 0.5 hours or more and 2 hours or less, although depending on the thickness or structure of a module.

The glass to be used when forming the laminated glass with the interlayer film for laminated glass of the invention is not particularly limited, and an inorganic glass such as a float plate glass, a polished plate glass, a figured plate glass, a wire-reinforced plate glass, or a heat-absorbing plate glass, and other than these, a conventionally known organic glass such as poly(methyl methacrylate) or polycarbonate, or the like can be used, and these may be either colorless or colored, or either transparent or non-transparent. These may be used alone or two or more types may be used in combination. Further, the thickness of the glass is not particularly limited, but is preferably 100 mm or less.

EXAMPLES

Hereinafter, the invention will be specifically described by way of Examples and Comparative Examples, however, the invention is not limited to these Examples.

Incidentally, as the polyvinyl butyral resin (PVB) used in the following Examples and Comparative Examples, a resin obtained by acetalization of polyvinyl alcohol having a viscosity-average polymerization degree (a viscosity-average polymerization degree measured in accordance with JIS K 6726 "Testing method for polyvinyl alcohol") which is the same as the desired viscosity-average polymerization degree with n-butyl aldehyde in the presence of a hydrochloric acid catalyst was used.

Example 1

Preparation of Composition of Layer A

In a pressure resistant container purged with nitrogen and dried, 50.0 kg of cyclohexane as a solvent and 76 g of sec-butyllithium as an anionic polymerization initiator were placed, and then, 313 g of tetrahydrofuran as a Lewis base was placed (sec-butyllithium contains a 10.5 mass % cyclohexane solution, and therefore, the substantial addition amount of sec-butyllithium is 8.0 g). After the temperature inside the pressure resistant container was increased to 50° C., 0.5 kg of styrene was added thereto and polymerization was performed for 1 hour. Subsequently, a mixed liquid composed of 8.2 kg of isoprene and 6.5 kg of butadiene was added thereto and polymerization was performed for 2 hours, and further 1.5 kg of styrene was added thereto and polymerization was performed for 1 hour, whereby a reaction mixture containing a polystyrene-poly(isoprene/butadiene)-polystyrene triblock copolymer was obtained.

To the reaction mixture, a Ziegler-based hydrogenation catalyst formed from nickel octylate and trimethyl aluminum was added under a hydrogen atmosphere, and a reaction was performed for 5 hours under the conditions of a hydrogen pressure of 1 MPa and 80° C. The reaction mixture was left to cool and depressurize, and then, the metal catalyst was removed by washing with water, followed by vacuum drying, whereby a hydrogenated product of the polystyrene-poly(isoprene/butadiene)-polystyrene triblock copolymer (hereinafter referred to as "TPE-1") was obtained.

In TPE-1, cesium tungsten oxide (manufactured by Sumitomo Metal Mining Co., Ltd., hereinafter referred to as "CWO") as a heat shielding material, Tinuvin 326 as a UV absorber, Cyanox 2777 as an antioxidant, and Tinuvin 622SF as a light stabilizer were mixed, whereby a composition constituting the layer A was prepared. The blending amounts were adjusted so that the area density of the heat shielding material in the layer A was 0.25 g/m$^2$, the area density of the UV absorber in the layer A was 1.0 g/m$^2$, the area density of the antioxidant in the layer A was 0.20 g/m$^2$, and the area density of the light stabilizer in the layer A was 1.6 g/m$^2$.

Incidentally, Tinuvin 326 used as the UV absorber is 2-(5-chloro-2-benzotriazolyl)-6-tert-butyl-p-cresol (manufactured by Ciba Specialty Chemicals, Inc.). Cyanox 2777 used as the antioxidant is a mixture of 1,3,5-tris(4-tert-butyl-3-hydroxy-2,6-dimethylbenzyl)-1,3,5-triazine-2,4,6-(1H,3H,5H)-trione and tris(2,4-di-t-butylphenyl)phosphate (manufactured by Cytec Industries Incorporated). Tinuvin 622SF used as the light stabilizer is a polymer of dimethyl succinate and 4-hydroxy-2,2,6,6-tetramethyl-1-piperidine ethanol (manufactured by Ciba Specialty Chemicals, Inc.).

Further, maleic anhydride-modified polypropylene (Youmex 1010, manufactured by Sanyo Chemical Industries, Ltd.) was added as an agent for adjusting the adhesive strength to the layer B in an amount of 5 parts by mass with respect to 100 parts by mass of TPE-1, whereby a composition for the layer A containing TPE-1 as a main component was prepared. Here, the main component refers to a component whose mass is the largest in the composition, and in the case where a plasticizer is contained, the component also including the plasticizer is referred to as "main component".

(Preparation of Composition for Layer B)

As the main component of the layer B, polyvinyl butyral (PVB-1) having a viscosity-average polymerization degree of about 1,100, an acetalization degree of 68.7 mol %, a vinyl acetate unit content of 0.8 mol %, and a vinyl alcohol unit content of 30.5 mol % was used.

In the above PVB-1, Tinuvin 326 as a UV absorber was mixed, whereby a composition constituting the layer B was prepared. The composition was prepared by adjusting the blending amount so that the area density of the UV absorber in the layer B was 5.1 g/m$^2$.

(Formation of Interlayer Film for Laminated Glass)

The composition for the layer A was introduced into a T die (a multi-manifold type with a width of 500 mm) at 205° C. under the conditions of a temperature of 210° C. and an ejection amount of 4 kg/h using a vent-type single-screw extruder with a diameter of 50 mm, and the composition for the layer B was introduced into the T die under the conditions of a temperature of 205° C. and an ejection amount of 24 kg/h using a vent-type single-screw extruder with a diameter of 65 mm. The molded material coextruded from the T die was nipped by two metallic mirror finish rolls, one of which was heated to 50° C. and the other of which was heated to 60° C., and an interlayer film for laminated glass (760 μm) having a three-layer structure of layer B/layer A/layer B (330 μm/100 μm/330 μm) was molded at a take-up speed of 1.2 m/min.

(Formation of Laminated Glass)

The interlayer film for laminated glass obtained in Example 1 was sandwiched between two commercially available clear glasses (50 mm (length)×50 mm (width)×1.6 mm (thickness)), and by using a vacuum laminator (1522N, manufactured by Nisshinbo Mechatronics, Inc.), a laminated glass was formed under the conditions that a hot plate temperature was 165° C., a vacuuming time was 12 minutes, a pressing pressure was 50 kPa, and a pressing time was 17 minutes. The obtained laminated glass was used for measuring each of the visible light transmittance and the average infrared transmittance.

Further, a laminated glass was formed under the same conditions as described above except that instead of using the clear glass, a commercially available green glass (50 mm (length)×50 mm (width)×1.6 mm (thickness)) was used. The obtained laminated glass was used for measuring each of the visible light transmittance, the average infrared transmittance, the weathering test (change in color difference), and the haze.

1. Evaluation of Physical Properties (Calculation of Degree of Orientation)

The layer A was taken out from the interlayer film for laminated glass and cut into a size of a length of 5 mm and a width of 5 mm, whereby a sample for small-angle X-ray scattering measurement was prepared. The sample was placed in a small-angle X-ray scattering apparatus (NANO-Viewer, manufactured by Rigaku Corporation) such that the normal line of the cut-out face coincided with the X-ray irradiation direction, and the total X-ray transmission length was set to 1 mm. The distance between the sample and the detector (camera distance) was set to 1,000 mm, and the slit diameter was set to 0.40 mm, 0.20 mm, and 0.45 mm in order from the upstream side.

As an X-ray source, Cu-Kα was used, and a filament current was set to 20 mA, and a filament voltage was set to 40 kV. As an X-ray detector, a two-dimensional X-ray detector (PILATUS-100K, manufactured by Rigaku Corporation) was used. The sample was irradiated with an X-ray with a diameter sufficiently larger than that of a grain of a microphase-separated structure composed of the hard segment block and the soft segment block, and periodic (coherent) scattering from the sample was observed by setting the exposure time to 20 minutes.

The background scattering (scattering by the slit or air) obtained under the same X-ray irradiation conditions as described above was subtracted from the periodic (coherent) scattering from the sample, and the azimuthal intensity distribution of periodic (coherent) scattering by the microphase-separated structure composed of the hard segment block and the soft segment block was obtained. Incidentally, the azimuthal intensity distribution of periodic (coherent) scattering was obtained from the primary scattering in the periodic (coherent) scattering.

The degree of orientation (1) and the degree of orientation (2) were calculated according to the following formulae from the maximum intensity value and the minimum intensity value in the obtained azimuthal intensity distribution. The calculation results of the degree of orientation (1) and the degree of orientation (2) are shown in Table 3.

Degree of orientation (1)=(maximum intensity value−minimum intensity value)/(maximum intensity value+minimum intensity value)

Degree of orientation (2)=maximum intensity value/minimum intensity value

2. Evaluation of Physical Properties (Measurement of Phase Separation Size of Layer A)

A central area in the thickness direction of the layer A of the interlayer film for laminated glass obtained in Example 1 was sliced in an atmosphere at −100° C. using a glass knife Ultramicrotome (Leica EM UC7, manufactured by Leica Microsystems GmbH), whereby a smooth section of the layer A was prepared. An image of the obtained sliced surface of the central area in the thickness direction of the layer A was taken with a scan size of 200 nm×200 nm in a dynamic force mode (DFM) using an atomic force microscope (E-Sweep and NanoNavill Station, manufactured by SII Nanotechnology, Inc.), whereby a phase image of the sliced surface of the layer A was obtained. As a cantilever, SI-DF20 (manufactured by SII Nanotechnology, Inc.) was used. An image of a region in the range of 200 nm×200 nm was taken at each of 5 sites on the sliced surface of the layer A, and an island component having a largest major axis size was selected from each image. The average of the major axis size of the selected island components was calculated, and the calculated average was used as a phase separation size. The measurement result of the phase separation size of the layer A is shown in Table 3.

3. Evaluation of Physical Properties (Measurement of Birefringence Phase Difference)

The interlayer film for laminated glass obtained in Example 1 was cut into a size of a length of 50 mm and a width of 50 mm. The cut interlayer film for laminated glass was sandwiched between two commercially available float glasses cut into a size of a length of 50 mm, a width of 50 mm, and a thickness of 1.6 mm, and a laminated glass was formed by the same production method as described above. The formed 50-mm square laminated glass was used as a sample for measuring the birefringence phase difference. By using a wide-range birefringence evaluation system (WPA-100, manufactured by Photonic Lattice, Inc.), a polarization state distribution of a light source provided with a circular polarization filter was obtained and a base line was obtained. Thereafter, the above 50-mm square laminated glass sample was placed in the measurement section of WPA-100, and a polarization state distribution after the light from the light source provided with a circular polarization filter was transmitted through the sample was obtained. The birefringence phase difference was calculated from the change of the polarization state distribution of the sample from the polarization state distribution of the base line. The calculation result of the birefringence phase difference is shown in Table 3.

4. Evaluation of Physical Properties (Evaluation of Shrinkability)

A laminated glass was formed under the same conditions as described above except that instead of using the clear glass with a size of a length of 50 mm and a width of 50 mm, a clear glass with a size of a length of 300 mm and a width of 300 mm was used. The obtained laminated glass was left for 1 week in an oven at 80° C. The largest distance from the edge of the laminated glass to the edge of the layer A after the laminated glass was left under the above conditions was measured. The distance was evaluated according to the following criteria, which was regarded as the evaluation of the shrinkability. The evaluation result of the shrinkability is shown in Table 3.

<Evaluation Criteria>

A: The layer A did not shrink at all.

B: The layer A shrank by 0.5 mm or less.

C: The layer A shrank by more than 0.5 mm.

5. Evaluation of Physical Properties (Evaluation of Heat Creep Resistance of Laminated Glass)

Figure 7:
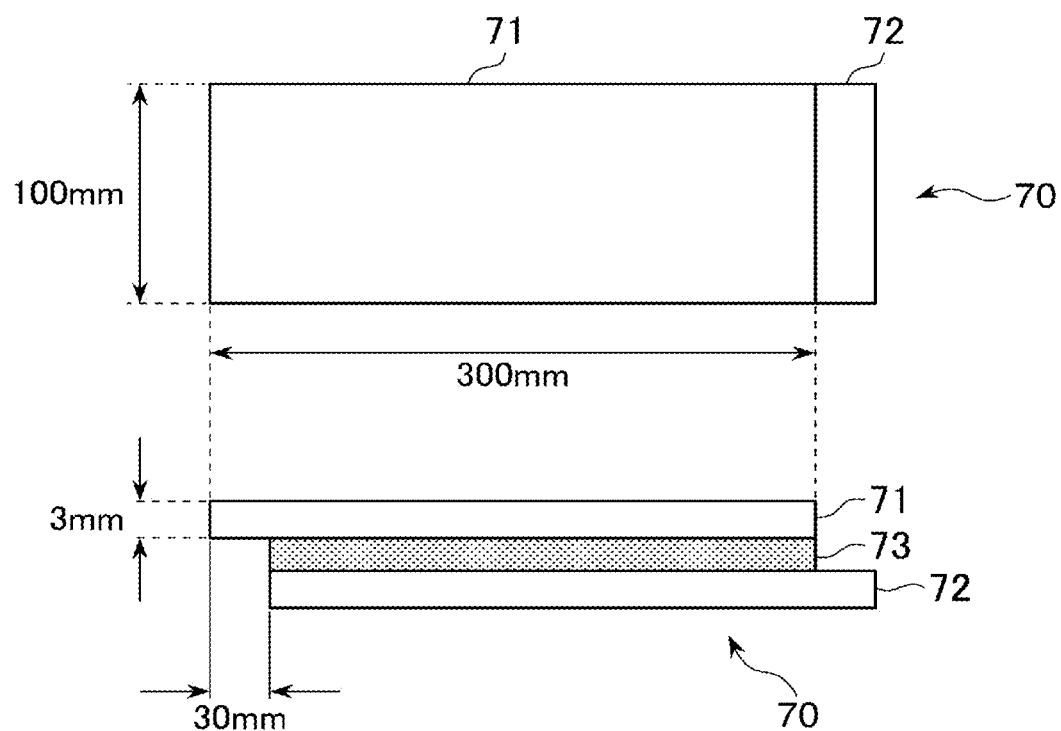
FIG. 7 is an exemplary schematic view of a laminated glass to be used for evaluation of heat creep resistance.

As shown in FIG. 7, the interlayer film for laminated glass 73 obtained in Example 1 was sandwiched between float glasses 71 and 72 having a length of 300 mm, a width of 100 mm, and a thickness of 3 mm, and by using a vacuum laminator (1522N, manufactured by Nisshinbo Mechatronics, Inc.), a laminated glass 70 was formed under the conditions that a hot plate temperature was 165° C., a vacuuming time was 12 minutes, a pressing pressure was 50 kPa, and a pressing time was 17 minutes.

Figure 8:
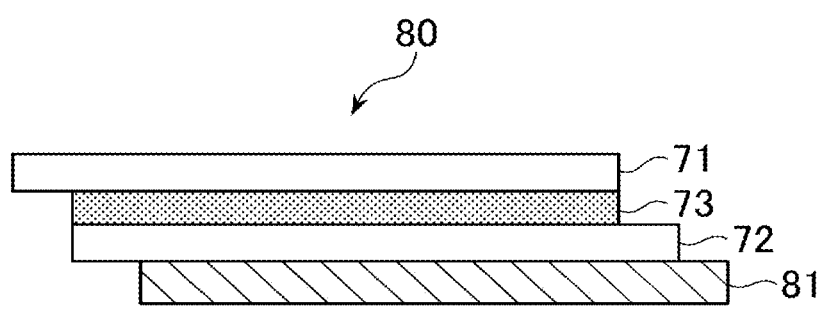
FIG. 8 is an exemplary schematic view in the case where an iron plate is bonded to the laminated glass to be used for evaluation of heat creep resistance.

As shown in FIG. 8, an iron plate 81 with a weight of 1 kg was bonded to one surface of the glass 72 using an instant adhesive, whereby a laminated glass 80 having an iron plate bonded thereto was formed.

Figure 9:
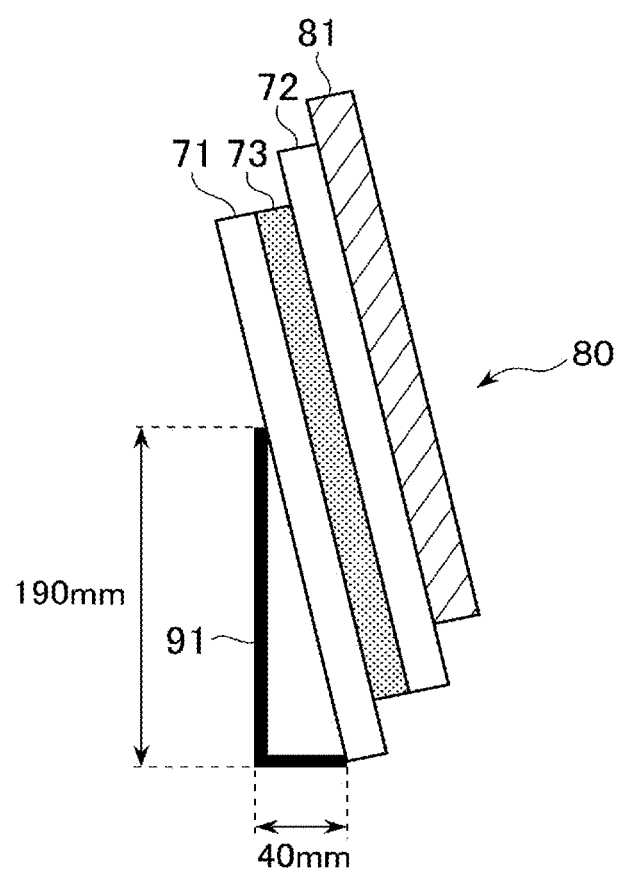
FIG. 9 is an exemplary schematic view in the case where the laminated glass to which the iron plate is bonded is leaned against a stand for evaluation of heat creep resistance.

As shown in FIG. 9, the laminated glass 80 was leaned against a stand 91 and left for 1 week in a chamber at 100° C. Thereafter, a distance that the glass 72 slid down was measured, and the distance was evaluated according to the following criteria, and the evaluation was regarded as the evaluation of the heat creep resistance.

<Evaluation Criteria>

A: The distance that the glass 72 slid down is 1 mm or less.

B: The distance that the glass 72 slid down exceeds 1 mm.

6. Evaluation of Physical Properties (Calculation of Amount of Residual Double Bonds Derived from Conjugated Diene Monomer Unit)

An iodine value was measured before and after the hydrogenation of the block copolymer obtained in Example 1, and calculation was performed from the measured values. The calculation result of the amount of residual double bonds is shown in Table 2.

7. Evaluation of Physical Properties (Calculation of Sum of Contents of 1,2-Bonds and 3,4-Bonds in Isoprene Unit and Butadiene Unit)

50 mg of the hydrogenated product of the block copolymer obtained in Example 1 was dissolved in deuterated chloroform, and $^1$H-NMR measurement was performed. The contents of 1,2-bonds and 3,4-bonds in an isoprene unit and a butadiene unit were measured, respectively, and summed up, whereby the sum of the contents of 1,2-bonds and 3,4-bonds in an isoprene unit and a butadiene unit was calculated. The calculation result of the sum of the contents of 1,2-bonds and 3,4-bonds in an isoprene unit and a butadiene unit is shown in Table 2.

8. Evaluation of Physical Properties (Tan δ Peak Height and Peak Temperature of Layer A and Layer B)

A mechanical spectrometer (model: DMA/SDTA861e, manufactured by Mettler Toledo, Inc.) was used for measuring the dynamic viscoelasticity of the interlayer film for laminated glass in accordance with ASTM D4065-06. The composition for the layer A, the composition for the Layer B, and the main components of the layer A and the layer B (here, the polymer in each layer is the main component, however, as for the layers containing a plasticizer in the below-mentioned Examples and Comparative Examples, the polymer and the plasticizer are the main component) were separately hot-pressed at 210° C. and 5 MPa for 5 minutes, whereby samples for evaluation were formed, and each sample was cut into a cylindrical shape having a thickness of 1 mm and a diameter of 3 to 10 mm (the diameter does not affect the result) and used as a test sample.

To each of the above test samples, a fixed sinusoidal shear oscillation at a frequency of 1,000 Hz with a maximum shear strain amplitude of 0.1% was applied, and the measurement temperature was increased from −20° C. to 60° C. at a constant rate of 1° C./min. In accordance with the definition of ASTM D4092-07, the tan δ peak heights and peak temperatures of the layer A and the layer B were obtained. The measurement results of the tan δ peak heights and peak temperatures of the layer A and the layer B, and the tan δ peak heights and peak temperatures of the main component of the layer A and the main component of the layer B are shown in Table 3.

9. Evaluation of Physical Properties (Measurement of Visible Light Transmittance of Laminated Glass)

With respect to the laminated glass formed using the clear glass and the laminated glass formed using the green glass, a visible light transmittance was measured at 20° C. using a spectrometer U-4100 (manufactured by Hitachi High-Tech Science Corporation) in accordance with JIS R 3106. The measurement result of the visible light transmittance is shown in Table 3.

10. Evaluation of Physical Properties (Measurement of Average Transmittance of Infrared Light in Wavelength Range of 800 to 1,100 nm of Laminated Glass)

With respect to the laminated glass formed using the clear glass and the laminated glass formed using the green glass, an average transmittance of infrared light in the wavelength range of 800 to 1,100 nm was measured at 20° C. using a spectrometer U-4100. The measurement result of the average transmittance of infrared light in the wavelength range of 800 to 1,100 nm is shown in Table 3.

11. Evaluation of Physical Properties (Evaluation of Change in Color Difference ΔE*ab of Laminated Glass)

[Weathering Test]

With respect to the laminated glass formed using the green glass, a weathering test was performed by exposure for 200 hours under the conditions that the irradiance was 180 W/m$^2$, the black panel temperature was 60° C., and the relative humidity was 50% using a weathering testing machine (Super Xenon Weather Meter SX75, manufactured by Suga Test Instruments Co., Ltd.).

[Measurement of Change in Color Difference ΔE*ab]

In accordance with JIS Z 8781-4: 2013, the color difference of the laminated glass was measured using a color-difference meter (SM-T, manufactured by Suga Test Instruments Co., Ltd.) before and after the weathering test. A value obtained by subtracting the color difference of the laminated glass after the weathering test from the color difference of the laminated glass before the weathering test was determined as the change in the color difference ΔE*ab. The measurement result of the change in the color difference ΔE*ab is shown in Table 3.

12. Evaluation of Physical Properties (Evaluation of Sound Transmission Loss of Laminated Glass)

The sound transmission loss of the laminated glass formed using the green glass was measured by a method defined in ASTM E 90-09 (Standard Test Method for Laboratory Measurement of Airborne Sound Transmission Loss of Building Partitions and Elements). The measurement result of the sound transmission loss is shown in Table 3.

13. Evaluation of Physical Properties (Evaluation of Haze of Laminated Glass)

The haze of the laminated glass formed using the green glass was measured in accordance with JIS K 7105. The measurement result of the haze of the laminated glass is shown in Table 3.

Example 2

An interlayer film for laminated glass and a laminated glass were formed in the same manner as in Example 1 except that instead of blending CWO in the layer A, CWO was blended in the layer B, and the area density thereof in the layer B was set to 0.28 g/m$^2$, and the evaluation of the respective physical properties was performed. The composition and the thickness of the interlayer film for laminated glass are shown in Table 2, and the evaluation results of the respective physical properties are shown in Table 3.

Example 3

An interlayer film for laminated glass and a laminated glass were formed in the same manner as in Example 1 except that in the layer B, instead of using 100 parts by mass of PVB-1, a mixture of 100 parts by mass of PVB-2 (shown in Table 1) and 15 parts by mass of a polyester polyol was used, and the evaluation of the respective physical properties was performed. The composition and the thickness of the interlayer film for laminated glass are shown in Table 2, and the evaluation results of the respective physical properties are shown in Table 3. Incidentally, as the polyester polyol, Kuraray Polyol P-510 (poly[ (3-methyl-1,5-pentanediol)-alt-(adipic acid)], manufactured by Kuraray Co., Ltd.) was used.

Example 4

An interlayer film for laminated glass and a laminated glass were formed in the same manner as in Example 1 except that in the layer B, instead of using 100 parts by mass of PVB-1, a mixture of 100 parts by mass of PVB-2 and 37 parts by mass of a polyester polyol was used, and the evaluation of the respective physical properties was performed. The composition and the thickness of the interlayer film for laminated glass are shown in Table 2, and the evaluation results of the respective physical properties are shown in Table 3.

Example 5

In a pressure resistant container purged with nitrogen and dried, 50 kg of cyclohexane as a solvent and 130 g of sec-butyllithium as an anionic polymerization initiator were placed, and then, 290 g of tetrahydrofuran as a Lewis base was placed (sec-butyllithium contains a 10.5 mass % cyclohexane solution, and therefore, the substantial addition amount of sec-butyllithium is 13.9 g). After the temperature inside the pressure resistant container was increased to 50° C., 1.8 kg of styrene was added thereto and polymerization was performed for 1 hour. Subsequently, 13.2 kg of isoprene was added thereto and polymerization was performed for 2 hours, and further 1.8 kg of styrene was added thereto and polymerization was performed for 1 hour, whereby a reaction mixture containing a polystyrene-polyisoprene-polystyrene triblock copolymer was obtained.

To the reaction mixture, a Ziegler-based hydrogenation catalyst formed from nickel octylate and trimethyl aluminum was added under a hydrogen atmosphere, and a reaction was performed for 5 hours under the conditions of a hydrogen pressure of 1 MPa and 80° C. The reaction mixture was left to cool and depressurize, and then, the catalyst was removed by washing with water, followed by vacuum drying, whereby a hydrogenated product of the polystyrene-polyisoprene-polystyrene triblock copolymer (hereinafter referred to as "TPE-2") was obtained. Then, TPE-2 and TPE-1 were melt-kneaded at 200° C. at a mass ratio of 1:1, whereby TPE-3 was obtained.

An interlayer film for laminated glass and a laminated glass were formed in the same manner as in Example 1 except that as the main component of the layer A, TPE-3 was used in place of TPE-1, the thickness of the layer A was set to 160 μm, and the thickness of the layer B was set to 300 μm, and the evaluation of the respective physical properties was performed. The composition and the thickness of the interlayer film for laminated glass are shown in Table 2, and the evaluation results of the respective physical properties are shown in Table 3.

Figure 4:
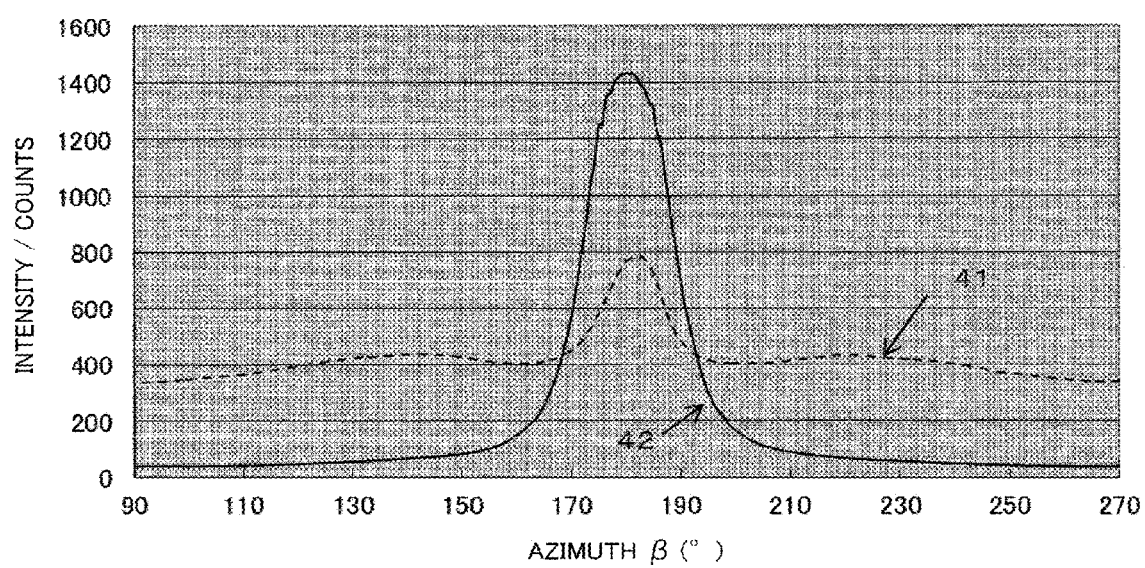
FIG. 4 is a graph showing the azimuthal intensity distribution of periodic (coherent) scattering from the layers A according to Example 5 and Comparative Example 1.

Incidentally, a graph showing the azimuthal intensity distribution of periodic (coherent) scattering from the layer A obtained in Example 5 is as shown in FIG. 4 indicated by 41. In FIG. 4, the vertical axis represents the scattering intensity of periodic (coherent) scattering, and the horizontal axis represents the azimuth (from 90° to 270°.

TABLE 1

| PVB | Acetalization degree (mol %) | Vinyl acetate unit (mol %) | Vinyl alcohol unit (mol %) | Polymerization degree |
|---|---|---|---|---|
| PVB-1 | 68.7 | 0.8 | 30.5 | 1100 |
| PVB-2 | 68.9 | 0.8 | 30.3 | 1700 |

TABLE 2

|  |  |  |  | Example 1 | Example 2 | Example 3 | Example 4 | Example 5 |
|---|---|---|---|---|---|---|---|---|
| Layer A | Main component | Polymer | Type | TPE-1 | TPE-1 | TPE-1 | TPE-1 | TPE-3 |
|  |  |  | Content of polymer block (a) (mass %) | 12 | 12 | 12 | 12 | 16 |
|  |  |  | Content of polymer block (b) (mass %) | 88 | 88 | 88 | 88 | 84 |
|  |  |  | Mass ratio of monomers of polymer block (b) | Bd:Ip = 45:55 | Bd:Ip = 45:55 | Bd:Ip = 45:55 | Bd:Ip = 45:55 | Bd:Ip = 22.5:77.5 |
|  |  |  | Sum of contents of 1,2-bonds and 3,4-bonds (mol %) | 60 | 60 | 60 | 60 | 57.5 |
|  |  |  | Amount of residual double bonds (mol %) | 8.5 | 8.5 | 8.5 | 8.5 | 10.3 |
|  |  |  | Content (parts by mass) | 100 | 100 | 100 | 100 | 100 |
|  | Additive | Heat shielding material | Type | CWO | — | CWO | CWO | CWO |
|  |  |  | Area density (g/m$^2$) | 0.25 | — | 0.25 | 0.25 | 0.25 |
|  |  | UV absorber | Type | Tinuvin 326 | Tinuvin 326 | Tinuvin 326 | Tinuvin 326 | Tinuvin 326 |
|  |  |  | Area density (g/m$^2$) | 1.0 | 1.0 | 1.0 | 1.0 | 1.0 |
|  |  | Antioxidant | Type | Cyanox 2777 | Cyanox 2777 | Cyanox 2777 | Cyanox 2777 | Cyanox 2777 |
|  |  |  | Area density (g/m$^2$) | 0.20 | 0.20 | 0.20 | 0.20 | 0.20 |
|  |  | Light stabilizer | Type | Tinuvin 622SF | Tinuvin 622SF | Tinuvin 622SF | Tinuvin 622SF | Tinuvin 622SF |
|  |  |  | Area density (g/m$^2$) | 1.6 | 1.6 | 1.6 | 1.6 | 1.6 |
|  |  | Adhesive strength adjusting agent | Content (parts by mass) | 5 | 5 | 5 | 5 | 5 |
| Layer B | Main component | Polymer | Type | PVB-1 | PVB-1 | PVB-2 | PVB-2 | PVB-1 |
|  |  |  | Content (parts by mass) | 100 | 100 | 100 | 100 | 100 |
|  |  | Plasticizer | Type | — | — | P-510 | P-510 | — |
|  |  |  | Content (parts by mass) | — | — | 15 | 37 | — |
|  | Additive | Heat shielding material | Type | — | CWO | — | — | — |
|  |  |  | Area density (g/m$^2$) | — | 0.28 | — | — | — |
|  |  | UV absorber | Type | Tinuvin 326 | Tinuvin 326 | Tinuvin 326 | Tinuvin 326 | Tinuvin 326 |
|  |  |  | Area density (g/m$^2$) | 5.1 | 5.1 | 5.1 | 5.1 | 5.1 |
|  | Thickness of each layer |  | Layer B/layer A/layer B (μm) | 330/100/330 | 330/100/330 | 330/100/330 | 330/100/330 | 300/160/300 |

*Ip: isoprene unit, Bd: butadiene unit
*P-510: polyester polyol

TABLE 3

|  |  |  | Example 1 | Example 2 | Example 3 | Example 4 | Example 5 |
|---|---|---|---|---|---|---|---|
| Layer A | Degree of orientation (1) |  | 0.103 | 0.112 | 0.108 | 0.101 | 0.411 |
|  | Degree of orientation (2) |  | 1.23 | 1.25 | 1.24 | 1.22 | 2.40 |
|  | Phase separation size |  | 28 | 24 | 25 | 26 | 53 |
|  | Tan δ peak temperature (° C.) |  | 3.1 | 3.0 | 3.1 | 3.1 | 11.3 |
|  | Tan δ peak value |  | 1.52 | 1.53 | 1.52 | 1.52 | 1.45 |
|  | Main component | Tan δ peak temperature (° C.) | 2.0 | 2.0 | 2.0 | 2.0 | 10.1 |
|  |  | Tan δ peak value | 1.75 | 1.75 | 1.75 | 1.75 | 1.68 |
| Layer B | Tan δ peak temperature (° C.) |  | 88.9 | 89.2 | 70.7 | 49.9 | 88.9 |
|  | Tan δ peak value |  | 1.67 | 1.68 | 1.56 | 1.42 | 1.67 |
|  | Main component | Tan δ peak temperature (° C.) | 90.0 | 90.0 | 70.8 | 50.0 | 90.0 |
|  |  | Tan δ peak value | 1.69 | 1.69 | 1.57 | 1.43 | 1.69 |
| Laminated glass | Shrinkability |  | A | A | A | A | B |
|  | Heat creep resistance |  | A | A | A | A | A |
|  | Visible light transmittance (%) (clear glass) |  | 84.7 | 84.3 | 84.6 | 84.5 | 84.6 |
|  | Average infrared transmittance (%) (clear glass) |  | 64.8 | 63.7 | 64.7 | 64.6 | 64.7 |
|  | Visible light transmittance (%) (green glass) |  | 78.3 | 77.9 | 78.2 | 78.4 | 78.1 |
|  | Average infrared transmittance (%) (green glass) |  | 28.0 | 26.9 | 27.9 | 28.1 | 27.8 |
|  | Change in color difference (ΔE*ab) |  | 0.8 | 1.0 | 0.9 | 0.8 | 0.8 |
|  | Haze |  | 0.9 | 0.8 | 0.9 | 0.9 | 0.9 |
|  | Phase difference (nm) |  | 99 | 84 | 54 | 17 | 129 |
|  | Sound transmission loss [4,000 Hz] (dB) |  | 41.5 | 41.5 | 41.6 | 41.5 | 40.8 |

Example 6

An interlayer film for laminated glass and a laminated glass were formed in the same manner as in Example 1 except that in the layer A, instead of setting the area density of CWO to 0.25 g/m$^2$, the area density of CWO was set to 0.16 g/m$^2$, and further, ITO (tin-doped indium oxide, manufactured by Mitsubishi Materials Electronic Chemicals Co., Ltd.) was added and the area density of ITO was set to 0.75 g/m$^2$, and the evaluation of the respective physical properties was performed. The configuration of the interlayer film for laminated glass and the evaluation results of the respective physical properties are shown in Table 4 or 5.

Example 7

An interlayer film for laminated glass and a laminated glass were formed in the same manner as in Example 1 except that in the layer A, ITO was used in place of CWO, and the area density of ITO was set to 1.50 g/m$^2$, and the evaluation of the respective physical properties was performed. The configuration of the interlayer film for laminated glass and the evaluation results of the respective physical properties are shown in Table 4 or 5.

Example 8

An interlayer film for laminated glass and a laminated glass were formed in the same manner as in Example 7 except that in the layer A, the area density of ITO was set to 4.70 g/m$^2$, and the evaluation of the respective physical properties was performed. The configuration of the interlayer film for laminated glass and the evaluation results of the respective physical properties are shown in Table 4 or 5.

TABLE 4

| | | | | Example 6 | Example 7 | Example 8 |
|---|---|---|---|---|---|---|
| Layer A | Main component | Polymer | Type | TPE-1 | TPE-1 | TPE-1 |
| | | | Content of polymer block (a) (mass %) | 12 | 12 | 12 |
| | | | Content of polymer block (b) (mass %) | 88 | 88 | 88 |
| | | | Mass ratio of monomers of polymer block (b) | Bd:Ip = 45:55 | Bd:Ip = 45:55 | Bd:Ip = 45:55 |
| | | | Sum of contents of 1,2-bonds and 3,4-bonds (mol %) | 60 | 60 | 60 |
| | | | Amount of residual double bonds (mol %) | 8.5 | 8.5 | 8.5 |
| | | | Content (parts by mass) | 100 | 100 | 100 |
| | Additive | Heat shielding material | Type | CWO/ITO | ITO | ITO |
| | | | Area density (g/m$^2$) | 0.16/0.75 | 1.50 | 4.70 |
| | | UV absorber | Type | Tinuvin 326 | Tinuvin 326 | Tinuvin 326 |
| | | | Area density (g/m$^2$) | 1.0 | 1.0 | 1.0 |
| | | Antioxidant | Type | Cyanox 2777 | Cyanox 2777 | Cyanox 2777 |
| | | | Area density (g/m$^2$) | 0.20 | 0.20 | 0.20 |
| | | Light stabilizer | Type | Tinuvin 622SF | Tinuvin 622SF | Tinuvin 622SF |
| | | | Area density (g/m$^2$) | 1.6 | 1.6 | 1.6 |
| | | Adhesive stength adjusting agent | Content (parts by mass) | 5 | 5 | 5 |
| Layer B | Main component | Polymer | Type | PVB-1 | PVB-1 | PVB-1 |
| | | | Content (parts by mass) | 100 | 100 | 100 |
| | | Plasticizer | Type | — | — | — |
| | | | Content (parts by mass) | — | — | — |
| | Additive | Heat shielding material | Type | — | — | — |
| | | | Area density (g/m$^2$) | — | — | — |
| | | UV absorber | Type | Tinuvin 326 | Tinuvin 326 | Tinuvin 326 |
| | | | Area density (g/m$^2$) | 5.1 | 5.1 | 5.1 |
| | Thickness of each layer | | Layer B/layer A/layer B (μm) | 330/100/330 | 330/100/330 | 330/100/330 |

*Ip: isoprene unit, Bd: butadiene unit

TABLE 5

| | | | Example 6 | Example 7 | Example 8 |
|---|---|---|---|---|---|
| Layer A | Degree of orientation (1) | | 0.102 | 0.104 | 0.107 |
| | Degree of orientation (2) | | 1.23 | 1.23 | 1.24 |
| | Phase separation size | | 28 | 28 | 28 |
| | Tan δ peak temperature (° C.) | | 3.3 | 3.4 | 3.5 |
| | Tan δ peak value | | 1.51 | 1.53 | 1.54 |
| | Main component | Tan δ peak temperature (° C.) | 2.0 | 2.0 | 2.0 |
| | | Tan δ peak value | 1.75 | 1.75 | 1.75 |
| Layer B | Tan δ peak temperature (° C.) | | 88.9 | 88.9 | 88.9 |
| | Tan δ peak value | | 1.67 | 1.67 | 1.67 |
| | Main component | Tan δ peak temperature (° C.) | 90.0 | 90.0 | 90.0 |
| | | Tan δ peak value | 1.69 | 1.69 | 1.69 |
| Laminated glass | Shrinkability | | A | A | A |
| | Heat creep resistance | | A | A | A |
| | Visible light transmittance (%) (clear glass) | | 84.7 | 84.9 | 81.6 |
| | Average infrared transmittance (%) (clear glass) | | 67.8 | 71.6 | 69.9 |

TABLE 5-continued

|  | Example 6 | Example 7 | Example 8 |
|---|---|---|---|
| Visible light transmittance (%) (green glass) | 78.4 | 78.6 | 75.2 |
| Average infrared transmittance (%) (green glass) | 31.0 | 34.9 | 33.1 |
| Change in color difference (ΔE*ab) | 0.6 | 0.7 | 1.4 |
| Haze | 0.7 | 0.8 | 1.1 |
| Phase difference (nm) | 103 | 105 | 109 |
| Sound transmission loss [4,000 Hz] (dB) | 41.5 | 41.5 | 41.5 |

Comparative Example 1

An interlayer film for laminated glass and a laminated glass were formed in the same manner as in Example 1 except that as the main component of the layer A, TPE-2 was used in place of TPE-1, the thickness of the layer A was set to 330 μm, and the thickness of the layer B was set to 215 μm, and the evaluation of the respective physical properties was performed. The composition and the thickness of the interlayer film for laminated glass are shown in Table 6, and the evaluation results of the respective physical properties are shown in Table 7.

Incidentally, a graph showing the azimuthal intensity distribution of periodic (coherent) scattering from the layer A obtained in Comparative Example 1 is as shown in FIG. 4 indicated by 42.

Figure 6:
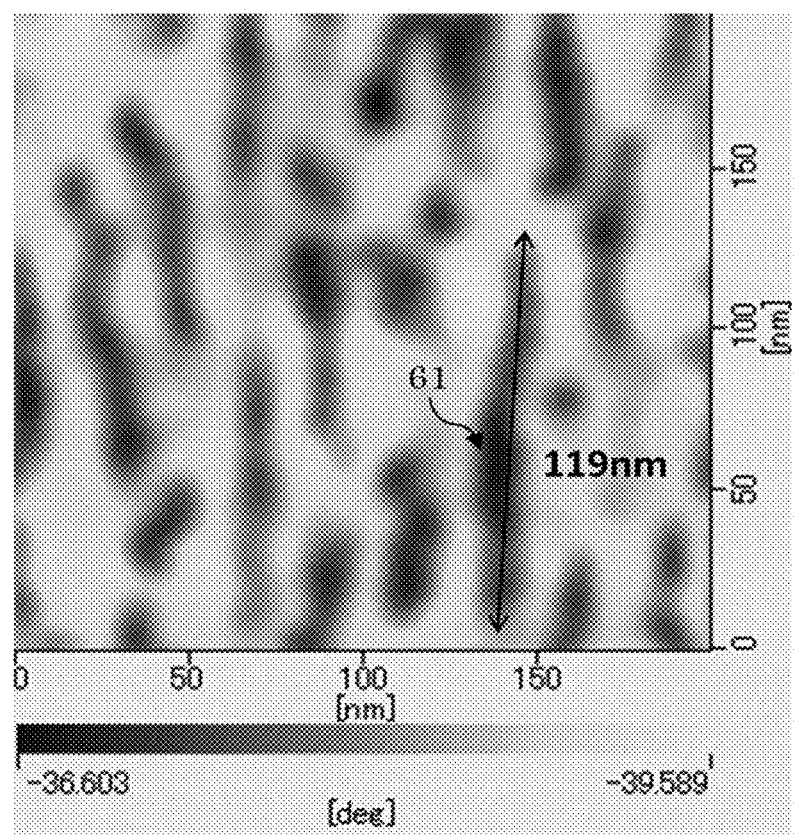
FIG. 6 is an image of a sliced surface obtained by slicing the layer A of an interlayer film for laminated glass according to Comparative Example 1 taken with a scan size of 200 nm×200 nm with an atomic force microscope.

Here, the phase image of the sliced surface of the layer A is shown in FIG. 6. In the phase image shown in FIG. 6, the island component having a largest major axis size is an island component 61. The largest major axis size of the island component 61 was 119 nm. Further, the average of the major axis size of the island components having a largest major axis size was 123 nm.

Comparative Example 2

An interlayer film for laminated glass and a laminated glass were formed in the same manner as in Example 2 except that as the main component of the layer A, TPE-2 was used in place of TPE-1, the thickness of the layer A was set to 330 μm, and the thickness of the layer B was set to 215 μm, and the evaluation of the respective physical properties was performed. The composition and the thickness of the interlayer film for laminated glass are shown in Table 6, and the evaluation results of the respective physical properties are shown in Table 7.

TABLE 6

|  |  |  |  | Comparative Example 1 | Comparative Example 2 |
|---|---|---|---|---|---|
| Layer A | Main component | Polymer | Type | TPE-2 | TPE-2 |
|  |  |  | Content of polymer block (a) (mass %) | 20 | 20 |
|  |  |  | Content of polymer block (b) (mass %) | 80 | 80 |
|  |  |  | Mass ratio of monomers of polymer block (b) | Ip = 100 | Ip = 100 |
|  |  |  | Sum of contents of 1,2-bonds and 3,4-bonds (mol %) | 55 | 55 |
|  |  |  | Amount of residual double bonds (mol %) | 12 | 12 |
|  |  |  | Content (parts by mass) | 100 | 100 |
|  | Additive | Heat shielding material | Type | CWO | — |
|  |  |  | Area density (g/m$^2$) | 0.25 | — |
|  |  | UV absorber | Type | Tinuvin 326 | Tinuvin 326 |
|  |  |  | Area density (g/m$^2$) | 1.0 | 1.0 |
|  |  | Antioxidant | Type | Cyanox 2777 | Cyanox 2777 |
|  |  |  | Area density (g/m$^2$) | 0.20 | 0.20 |
|  |  | Light stabilizer | Type | Tinuvin 622SF | Tinuvin 622SF |
|  |  |  | Area density (g/m$^2$) | 1.6 | 1.6 |
|  |  | Adhesive strength adjusting agent | Content (parts by mass) | 5 | 5 |
| Layer B | Main component | Polymer | Type | PVB-1 | PVB-1 |
|  |  |  | Content (parts by mass) | 100 | 100 |
|  |  | Plasticizer | Type | — | — |
|  |  |  | Content (parts by mass) | — | — |
|  | Additive | Heat shielding material | Type | — | CWO |
|  |  |  | Area density (g/m$^2$) | — | 0.28 |
|  |  | UV absorber | Type | Tinuvin 326 | Tinuvin 326 |
|  |  |  | Area density (g/m$^2$) | 5.1 | 5.1 |
| Thickness of each layer |  |  | Layer B/layer A/layer B (μm) | 215/330/215 | 215/330/215 |

*Ip: isoprene unit, Bd: butadiene unit

TABLE 7

|  |  | Comparative Example 1 | Comparative Example 2 |
|---|---|---|---|
| Layer A | Degree of orientation (1) | 0.934 | 0.941 |
|  | Degree of orientation (2) | 29.30 | 32.90 |
|  | Phase separation size | 123 | 125 |
|  | Tan δ peak temperature (° C.) | 19.4 | 19.5 |
|  | Tan δ peak value | 1.38 | 1.39 |
|  | Main component  Tan δ peak temperature (° C.) | 18.3 | 18.3 |
|  | Tan δ peak value | 1.60 | 1.60 |
| Layer B | Tan δ peak temperature (° C.) | 88.9 | 89.2 |
|  | Tan δ peak value | 1.67 | 1.68 |
|  | Main component  Tan δ peak temperature (° C.) | 90.0 | 90.0 |
|  | Tan δ peak value | 1.69 | 1.69 |
| Laminated glass | Shrinkability | C | C |
|  | Heat creep resistance | A | A |
|  | Visible light transmittance (%) (clear glass) | 84.7 | 84.3 |
|  | Average infrared transmittance (%) (clear glass) | 64.8 | 63.7 |
|  | Visible light transmittance (%) (green glass) | 78.3 | 77.9 |
|  | Average infrared transmittance (%) (green glass) | 28.0 | 26.9 |
|  | Change in color difference (ΔE*ab) | 1.1 | 1.0 |
|  | Haze | 2.0 | 0.9 |
|  | Phase difference (nm) | 158 | 166 |
|  | Sound transmission loss [4,000 Hz] (dB) | 38.3 | 38.2 |

Example 9

An interlayer film for laminated glass and a laminated glass were formed in the same manner as in Example 1 except that in the layer A, the adhesive strength adjusting agent was not used, and in the layer B, instead of using PVB-1, an ionomer (SentryGlas (R) interlayer film, manufactured by DuPont, Inc.) was used, and the evaluation of the respective physical properties was performed. The composition and the thickness of the interlayer film for laminated glass are shown in Table 8, and the evaluation results of the respective physical properties are shown in Table 9.

Example 10

An interlayer film for laminated glass and a laminated glass were formed in the same manner as in Example 5 except that in the layer A, the adhesive strength adjusting agent was not used, and in the layer B, instead of using PVB-1, an ionomer (SentryGlas (R) interlayer film, manufactured by DuPont, Inc.) was used, and the evaluation of the respective physical properties was performed. The composition and the thickness of the interlayer film for laminated glass are shown in Table 8, and the evaluation results of the respective physical properties are shown in Table 9.

Example 11

TPE-1 and TPE-2 were melt-kneaded at 200° C. at a mass ratio of 1:3, whereby TPE-4 was obtained. Then, an interlayer film for laminated glass and a laminated glass were formed in the same manner as in Example 1 except that in the layer A, TPE-4 was used in place of TPE-1, and the adhesive strength adjusting agent was not used, and in the layer B, an ionomer (SentryGlas (R) interlayer film, manufactured by DuPont, Inc.) was used in place of PVB-1, and the thickness of the layer A was set to 220 μm, and the thickness of the layer B was set to 270 μm, and the evaluation of the respective physical properties was performed. The composition and the thickness of the interlayer film for laminated glass are shown in Table 8, and the evaluation results of the respective physical properties are shown in Table 9.

Figure 5:
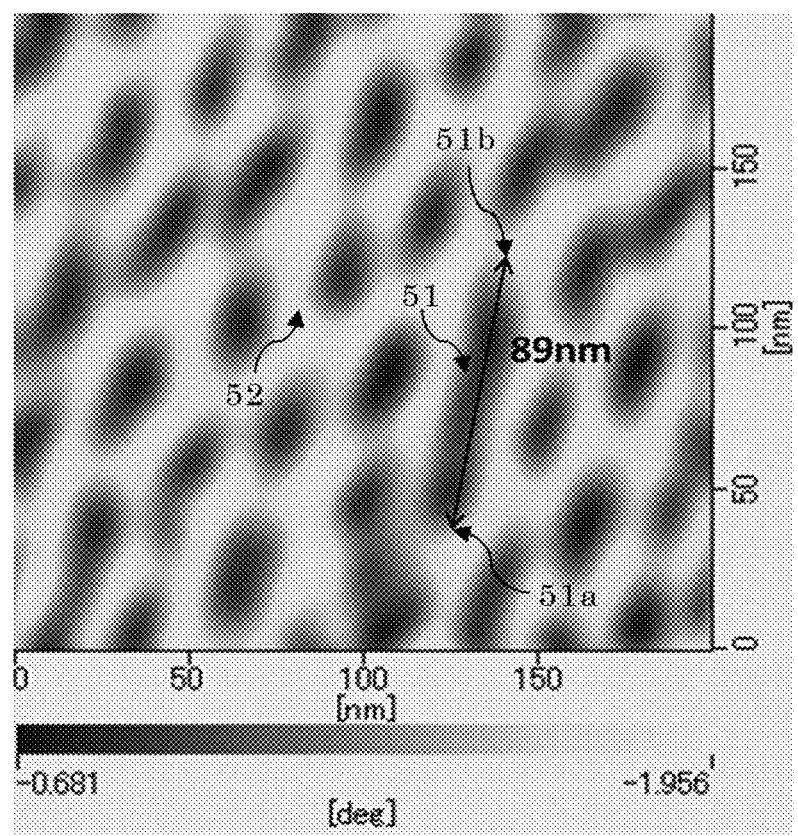
FIG. 5 is an image of a sliced surface obtained by slicing the layer A of an interlayer film for laminated glass according to Example 11 taken with a scan size of 200 nm×200 nm with an atomic force microscope.

Here, the phase image of the sliced surface of the layer A is shown in FIG. 5. In FIG. 5, the island components 51 are scattered in the sea component 52. In the phase image shown in FIG. 5, the island component having a largest major axis size is an island component 51. The major axis size of the island component 51 is the length of a segment connecting one end 51a and the other end 51b, and was 89 nm. Further, the average of the major axis size of the island components having a largest major axis size was 82 nm.

Example 12

An interlayer film for laminated glass and a laminated glass were formed in the same manner as in Example 11 except that instead of blending CWO in the layer A, CWO was blended in the layer B, and the area density thereof in the layer B was set to 0.28 g/m$^2$, and the evaluation of the respective physical properties was performed. The composition and the thickness of the interlayer film for laminated glass are shown in Table 8, and the evaluation results of the respective physical properties are shown in Table 9.

Comparative Example 3

An interlayer film for laminated glass and a laminated glass were formed in the same manner as in Comparative Example 1 except that in the layer A, the adhesive strength adjusting agent was not used, and in the layer B, an ionomer (SentryGlas (R) interlayer film, manufactured by DuPont, Inc.) was used in place of PVB-1, and the evaluation of the respective physical properties was performed. The composition and the thickness of the interlayer film for laminated glass are shown in Table 8, and the evaluation results of the respective physical properties are shown in Table 9.

Comparative Example 4

An interlayer film for laminated glass and a laminated glass were formed in the same manner as in Comparative Example 2 except that in the layer A, the adhesive strength adjusting agent was not used, and in the layer B, an ionomer (SentryGlas (R) interlayer film, manufactured by DuPont, Inc.) was used in place of PVB-1, and the evaluation of the respective physical properties was performed. The composition and the thickness of the interlayer film for laminated glass are shown in Table 8, and the evaluation results of the respective physical properties are shown in Table 9.

TABLE 8

| | | | | Example 9 | Example 10 | Example 11 | Example 12 | Comparative Example 3 | Comparative Example 4 |
|---|---|---|---|---|---|---|---|---|---|
| Layer A | Main component | Polymer | Type | TPE-1 | TPE-3 | TPE-4 | TPE-4 | TPE-2 | TPE-2 |
| | | | Content of polymer block (a) (mass %) | 12 | 16 | 18 | 18 | 20 | 20 |
| | | | Content of polymer block (b) (mass %) | 88 | 84 | 82 | 82 | 80 | 80 |
| | | | Mass ratio of monomers of polymer block (b) | Bd:Ip = 45:55 | Bd:Ip = 22.5:77.5 | Bd:Ip = 11.3:88.7 | Bd:Ip = 11.3:88.7 | Ip = 100 | Ip = 100 |
| | | | Sum of contents of 1,2-bonds and 3,4-bonds (mol %) | 60.0 | 57.5 | 56.3 | 56.3 | 55.0 | 55.0 |
| | | | Amount of residual double bonds (mol %) | 8.5 | 10.3 | 11.1 | 11.1 | 12 | 12 |
| | | | Content (parts by mass) | 100 | 100 | 100 | 100 | 100 | 100 |
| | Additive | Heat shielding material | Type | CWO | CWO | CWO | — | CWO | — |
| | | | Area density (g/m$^2$) | 0.25 | 0.25 | 0.25 | — | 0.25 | — |
| | | UV absorber | Type | Tinuvin 326 | Tinuvin 326 | Tinuvin 326 | Tinuvin 326 | Tinuvin 326 | Tinuvin 326 |
| | | | Area density (g/m$^2$) | 1.0 | 1.0 | 1.0 | 1.0 | 1.0 | 1.0 |
| | | Antioxidant | Type | Cyanox 2777 | Cyanox 2777 | Cyanox 2777 | Cyanox 2777 | Cyanox 2777 | Cyanox 2777 |
| | | | Area density (g/m$^2$) | 0.20 | 0.20 | 0.20 | 0.20 | 0.20 | 0.20 |
| | | Light stabilizer | Type | Tinuvin 622SF | Tinuvin 622SF | Tinuvin 622SF | Tinuvin 622SF | Tinuvin 622SF | Tinuvin 622SF |
| | | | Area density (g/m$^2$) | 1.6 | 1.6 | 1.6 | 1.6 | 1.6 | 1.6 |
| | | Adhesive strength adjusting agent | Content (parts by mass) | — | — | — | — | — | — |
| Layer B | Main component | Polymer | Type | Ionomer | Ionomer | Ionomer | Ionomer | Ionomer | Ionomer |
| | | | Content (parts by mass) | 100 | 100 | 100 | 100 | 100 | 100 |
| | | Plasticizer | Type | — | — | — | — | — | — |
| | | | Content (parts by mass) | — | — | — | — | — | — |
| | Additive | Heat shielding material | Type | — | — | — | CWO | — | CWO |
| | | | Area density (g/m$^2$) | — | — | — | 0.28 | — | 0.28 |
| | | UV absorber | Type | Tinuvin 326 | Tinuvin 326 | Tinuvin 326 | Tinuvin 326 | Tinuvin 326 | Tinuvin 326 |
| | | | Area density (g/m$^2$) | 5.1 | 5.1 | 5.1 | 5.1 | 5.1 | 5.1 |
| Thickness of each layer | | | Layer B/layer A/layer B (μm) | 330/100/330 | 300/160/300 | 270/220/270 | 270/220/270 | 215/330/215 | 215/330/215 |

*Ip: isoprene unit, Bd: butadiene unit

TABLE 9

| | | | Example 9 | Example 10 | Example 11 | Example 12 | Comparative Example 3 | Comparative Example 4 |
|---|---|---|---|---|---|---|---|---|
| Layer A | Degree of orientation (1) | | 0.111 | 0.413 | 0.684 | 0.682 | 0.947 | 0.945 |
| | Degree of orientation (2) | | 1.25 | 2.41 | 5.33 | 5.29 | 36.74 | 35.36 |
| | Phase separation size | | 27 | 55 | 82 | 86 | 133 | 128 |
| | Tan δ peak temperature (° C.) | | 3.0 | 11.2 | 17.1 | 17.3 | 19.3 | 19.2 |
| | Tan δ peak value | | 1.60 | 1.53 | 1.49 | 1.50 | 1.45 | 1.46 |
| | Main component | Tan δ peak temperature (° C.) | 2.0 | 10.1 | 12.4 | 12.4 | 18.3 | 18.3 |
| | | Tan δ peak value | 1.75 | 1.68 | 1.64 | 1.64 | 1.60 | 1.60 |
| Layer B | Tan δ peak temperature (° C.) | | 82.8 | 82.8 | 82.8 | 82.9 | 82.8 | 82.9 |
| | Tan δ peak value | | 0.58 | 0.58 | 0.58 | 0.59 | 0.58 | 0.59 |
| | Main component | Tan δ peak temperature (° C.) | 83.0 | 83.0 | 83.0 | 83.0 | 83.0 | 83.0 |
| | | Tan δ peak value | 0.60 | 0.60 | 0.60 | 0.60 | 0.60 | 0.60 |
| Laminated glass | Shrinkability | | A | B | B | B | C | C |
| | Heat creep resistance | | A | A | A | A | A | A |
| | Visible light transmittance (%) (clear glass) | | 84.7 | 84.7 | 84.7 | 84.3 | 84.7 | 84.3 |
| | Average infrared transmittance (%) (clear glass) | | 64.7 | 64.7 | 64.7 | 63.7 | 64.8 | 63.7 |
| | Visible light transmittance (%) (green glass) | | 78.3 | 78.3 | 78.3 | 77.9 | 78.3 | 77.9 |
| | Average infrared transmittance (%) (green glass) | | 28.0 | 28.0 | 28.0 | 26.9 | 28.0 | 26.9 |
| | Change in color difference (ΔE*ab) | | 0.8 | 0.8 | 0.9 | 1.1 | 1.1 | 1.1 |
| | Haze | | 0.9 | 0.9 | 1.1 | 0.5 | 2.0 | 2.0 |
| | Phase difference (nm) | | 45 | 55 | 59 | 63 | 151 | 163 |
| | Sound transmission loss [4,000 Hz] (dB) | | 41.5 | 40.8 | 39.2 | 39.1 | 38.3 | 38.3 |

Example 13

In a pressure resistant container purged with nitrogen and dried, 50 kg of cyclohexane as a solvent and 90 g of sec-butyllithium as an anionic polymerization initiator were placed, and then, 30 g of N,N,N',N'-tetramethylethylenediamine (hereinafter referred to as "TMEDA") as a Lewis base was placed (sec-butyllithium contains a 10.5 mass % cyclohexane solution, and therefore, the substantial addition amount of sec-butyllithium is 9.5 g). After the temperature inside the pressure resistant container was increased to 50° C., 1.0 kg of styrene was added thereto and polymerization was performed for 1 hour. Subsequently, 14.6 kg of butadiene was added thereto and polymerization was performed for 2 hours, and further 1.0 kg of styrene was added thereto and polymerization was performed for 1 hour, whereby a reaction mixture containing a polystyrene-polybutadiene-polystyrene triblock copolymer was obtained.

To the reaction mixture, a Ziegler-based hydrogenation catalyst formed from nickel octylate and trimethyl aluminum was added under a hydrogen atmosphere, and a reaction was performed for 5 hours under the conditions of a hydrogen pressure of 1 MPa and 80° C. The reaction mixture was left to cool and depressurize, and then, the catalyst was removed by washing with water, followed by vacuum drying, whereby a hydrogenated product of the polystyrene-polybutadiene-polystyrene triblock copolymer (hereinafter referred to as "TPE-5") was obtained.

An interlayer film for laminated glass and a laminated glass were formed in the same manner as in Example 1 except that in the layer A, TPE-5 was used in place of TPE-1 and the adhesive strength adjusting agent was not used, and in the layer B, an ionomer was used in place of PVB-1, and the evaluation of the respective physical properties was performed. The configuration of the interlayer film for laminated glass and the evaluation results of the respective physical properties are shown in Table 10 or 11.

Example 14

In a pressure resistant container purged with nitrogen and dried, 50 kg of cyclohexane as a solvent and 82 g of sec-butyllithium as an anionic polymerization initiator were placed, and then, 110 g of tetrahydrofuran as a Lewis base was placed (sec-butyllithium contains a 10.5 mass % cyclohexane solution, and therefore, the substantial addition amount of sec-butyllithium is 8.6 g). After the temperature inside the pressure resistant container was increased to 50° C., 0.5 kg of styrene was added thereto and polymerization was performed for 1 hour. Subsequently, 8.2 kg of isoprene and 6.5 kg of butadiene were added thereto and polymerization was performed for 2 hours, and further 1.5 kg of styrene was added thereto and polymerization was performed for 1 hour, whereby a reaction mixture containing a polystyrene-poly(isoprene/butadiene)-polystyrene triblock copolymer was obtained.

To the reaction mixture, a Ziegler-based hydrogenation catalyst formed from nickel octylate and trimethyl aluminum was added under a hydrogen atmosphere, and a reaction was performed for 5 hours under the conditions of a hydrogen pressure of 1 MPa and 80° C. The reaction mixture was left to cool and depressurize, and then, the catalyst was removed by washing with water, followed by vacuum drying, whereby a hydrogenated product of the polystyrene-poly(isoprene/butadiene)-polystyrene triblock copolymer (hereinafter referred to as "TPE-6") was obtained.

An interlayer film for laminated glass and a laminated glass were formed in the same manner as in Example 13 except that in the layer A, TPE-6 was used in place of TPE-5, and the evaluation of the respective physical properties was performed. The configuration of the interlayer film for laminated glass and the evaluation results of the respective physical properties are shown in Table 10 or 11.

Comparative Example 5

In a pressure resistant container purged with nitrogen and dried, 50 kg of cyclohexane as a solvent and 217 g of sec-butyllithium as an anionic polymerization initiator were placed, and then, 80 g of tetrahydrofuran as a Lewis base was placed (sec-butyllithium contains a 10.5 mass % cyclohexane solution, and therefore, the substantial addition amount of sec-butyllithium is 22.8 g). After the temperature inside the pressure resistant container was increased to 50° C., 2.5 kg of styrene was added thereto and polymerization was performed for 1 hour. Subsequently, 11.7 kg of butadiene was added thereto and polymerization was performed for 2 hours, and further 2.5 kg of styrene was added thereto and polymerization was performed for 1 hour, whereby a reaction mixture containing a polystyrene-polybutadiene-polystyrene triblock copolymer was obtained.

To the reaction mixture, a Ziegler-based hydrogenation catalyst formed from nickel octylate and trimethyl aluminum was added under a hydrogen atmosphere, and a reaction was performed for 5 hours under the conditions of a hydrogen pressure of 1 MPa and 80° C. The reaction mixture was left to cool and depressurize, and then, the catalyst was removed by washing with water, followed by vacuum drying, whereby a hydrogenated product of the polystyrene-polybutadiene-polystyrene triblock copolymer (hereinafter referred to as "TPE-7") was obtained.

An interlayer film for laminated glass and a laminated glass were formed in the same manner as in Example 13 except that in the layer A, TPE-7 was used in place of TPE-5, and the evaluation of the respective physical properties was performed. The configuration of the interlayer film for laminated glass and the evaluation results of the respective physical properties are shown in Table 10 or 11.

Example 15

An interlayer film for laminated glass and a laminated glass were formed in the same manner as in Example 1 except that in the hydrogenation treatment of the block copolymer used in the layer A, the supply amount of hydrogen was set to 50 mol % with respect to the amount of double bonds in the block copolymer so that a hydrogenated product in which the amount of residual double bonds is 50 mol % (hereinafter referred to as "TPE-8") was formed, and the evaluation of the respective physical properties was performed. The configuration of the interlayer film for laminated glass and the evaluation results of the respective physical properties are shown in Table 10 or 11.

Example 16

An interlayer film for laminated glass and a laminated glass were formed in the same manner as in Example 1 except that in the hydrogenation treatment of the block copolymer used in the layer A, instead of setting the hydrogen pressure to 1 MPa, the hydrogen pressure was set to 10 MPa so that a hydrogenated product in which the amount of residual double bonds is 1 mol % (hereinafter referred to as "TPE-9") was formed, and the evaluation of the respective physical properties was performed. The configuration of the interlayer film for laminated glass and the evaluation results of the respective physical properties are shown in Table 10 or 11.

TABLE 10

| | | | | Example 13 | Example 14 | Comparative Example 5 | Example 15 | Example 16 |
|---|---|---|---|---|---|---|---|---|
| Layer A | Main component | Polymer | Type | TPE-5 | TPE-6 | TPE-7 | TPE-8 | TPE-9 |
| | | | Content of polymer block (a) (mass %) | 12 | 12 | 30 | 12 | 12 |
| | | | Content of polymer block (b) (mass %) | 88 | 88 | 70 | 88 | 88 |
| | | | Mass ratio of monomers of polymer block (b) | Bd = 100 | Bd:Ip = 45:55 | Bd = 100 | Bd:Ip = 45:55 | Bd:Ip = 45:55 |
| | | | Sum of contents of 1,2-bonds and 3,4-bonds (mol %) | 77 | 47 | 48 | 60 | 60 |
| | | | Amount of residual double bonds (mol %) | 3.0 | 8.5 | 3.0 | 50 | 1 |
| | | | Content (parts by mass) | 100 | 100 | 100 | 100 | 100 |
| | Additive | Heat shielding material | Type | CWO | CWO | CWO | CWO | CWO |
| | | | Area density (g/m$^2$) | 0.25 | 0.25 | 0.25 | 0.25 | 0.25 |
| | | UV absorber | Type | Tinuvin 326 | Tinuvin 326 | Tinuvin 326 | Tinuvin 326 | Tinuvin 326 |
| | | | Area density (g/m$^2$) | 1.0 | 1.0 | 1.0 | 1.0 | 1.0 |
| | | Antioxidant | Type | Cyanox 2777 | Cyanox 2777 | Cyanox 2777 | Cyanox 2777 | Cyanox 2777 |
| | | | Area density (g/m$^2$) | 0.20 | 0.20 | 0.20 | 0.20 | 0.20 |
| | | Light stabilizer | Type | Tinuvin 622SF | Tinuvin 622SF | Tinuvin 622SF | Tinuvin 622SF | Tinuvin 622SF |
| | | | Area density (g/m$^2$) | 1.6 | 1.6 | 1.6 | 1.6 | 1.6 |
| | | Adhesive strength adjusting agent | Content (parts by mass) | — | — | — | 5 | 5 |
| Layer B | Main component | Polymer | Type | Ionomer | Ionomer | Ionomer | PVB-1 | PVB-1 |
| | | | Content (parts by mass) | 100 | 100 | 100 | 100 | 100 |
| | | Plasticizer | Type | — | — | — | — | — |
| | | | Content (parts by mass) | — | — | — | — | — |
| | Additive | Heat shielding material | Type | — | — | — | — | — |
| | | | Area density (g/m$^2$) | — | — | — | — | — |
| | | UV absorber | Type | Tinuvin 326 | Tinuvin 326 | Tinuvin 326 | Tinuvin 326 | Tinuvin 326 |
| | | | Area density (g/m$^2$) | 5.1 | 5.1 | 5.1 | 5.1 | 5.1 |
| Thickness of each layer | | | Layer B/layer A/layer B (μm) | 330/100/330 | 330/100/330 | 330/100/330 | 330/100/330 | 330/100/330 |

*Ip: isoprene unit, Bd: butadiene unit

TABLE 11

| | | | Example 13 | Example 14 | Comparative Example 5 | Example 15 | Example 16 |
|---|---|---|---|---|---|---|---|
| Layer A | Degree of orientation (1) | | 0.101 | 0.102 | 0.968 | 0.104 | 0.100 |
| | Degree of orientation (2) | | 1.22 | 1.23 | 61.50 | 1.23 | 1.22 |
| | Phase separation size | | 28 | 22 | 172 | 26 | 29 |
| | Tan δ peak temperature (° C.) | | −5.5 | −9.3 | −16.1 | 3.1 | 3.1 |
| | Tan δ peak value | | 1.40 | 1.22 | 0.09 | 1.52 | 1.52 |
| | Main component | Tan δ peak temperature (° C.) | −6.0 | −10.0 | −17.0 | 2.0 | 2.0 |
| | | Tan δ peak value | 1.53 | 1.33 | 0.10 | 1.75 | 1.75 |
| Layer B | Tan δ peak temperature (° C.) | | 82.8 | 82.8 | 82.8 | 88.9 | 88.9 |
| | Tan δ peak value | | 0.58 | 0.58 | 0.58 | 1.67 | 1.67 |
| | Main component | Tan δ peak temperature (° C.) | 83 | 83 | 83 | 90 | 90 |
| | | Tan δ peak value | 0.60 | 0.60 | 0.60 | 1.69 | 1.69 |
| Laminated glass | Shrinkability | | A | A | C | A | A |
| | Heat creep resistance | | A | A | A | A | B |
| | Visible light transmittance (%) (clear glass) | | 84.6 | 84.5 | 84.8 | 84.7 | 84.7 |
| | Average infrared transmittance (%) (clear glass) | | 64.7 | 64.6 | 64.9 | 64.8 | 64.8 |
| | Visible light transmittance (%) (green glass) | | 78.2 | 78.1 | 78.5 | 78.3 | 78.3 |
| | Average infrared transmittance (%) (green glass) | | 27.9 | 27.8 | 28.2 | 28.0 | 28.0 |
| | Change in color difference (ΔE*ab) | | 0.8 | 1.1 | 1.2 | 5.8 | 0.4 |
| | Haze | | 0.9 | 1.4 | 1.8 | 0.2 | 0.2 |
| | Phase difference (nm) | | 48 | 55 | 172 | 98 | 97 |
| | Sound transmission loss [4,000 Hz] (dB) | | 37.5 | 37.0 | 32.1 | 41.5 | 41.5 |

REFERENCE SIGNS LIST

1 Layer A
2a Layer B
2b Layer B
Tan δ of layer A
12 Shear complex modulus G* of layer A
41 Azimuthal intensity distribution of periodic (coherent) scattering from the layer A obtained in Example 5
42 Azimuthal intensity distribution of periodic (coherent) scattering from the layer A obtained in Comparative Example 1
51 Island component
52 Sea component
61 Island component
70 Laminated glass
71 Glass
72 Glass
73 Interlayer film for laminated glass
80 Laminated glass
81 Iron plate
91 Stand

The invention claimed is:

1. An interlayer film, comprising a layer A comprising a thermoplastic elastomer and a layer B comprising a thermoplastic resin provided on both surfaces of the layer A, wherein
the thermoplastic elastomer comprises a hard segment block and a soft segment block,
the layer A has a sea-island phase separated structure in which the hard segment block is included as an island component and the soft segment block is included as a sea component, and
when a degree of orientation (1) is defined by a formula (i) based on the maximum intensity value and the minimum intensity value in an arbitrary azimuth range of 180° including the azimuth at which the intensity reaches the maximum in the azimuthal intensity distribution of periodic scattering or coherent scattering by the hard segment block or the soft segment block obtained for the layer A by small-angle X-ray scattering measurement, the degree of orientation (1) is 0.9 or less:

Degree of orientation (1)=(maximum intensity value−minimum intensity value)/(maximum intensity value+minimum intensity value)  (i)

wherein the ratio of the total thickness of the layer A to the total thickness of the layers B ranges from 1/30 to 1/1,
wherein the amount of the thermoplastic elastomer in the layer A is 95 mass % or more, and
wherein thermoplastic resin in the layers B is an ionomer.

2. The interlayer film according to claim 1, wherein when a degree of orientation (2) is defined by a formula (ii), the degree of orientation (2) is 10 or less:

Degree of orientation (2)=maximum intensity value/minimum intensity value  (ii).

3. The interlayer film according to claim 1, wherein when an island component having a largest major axis size is selected from island components having a substantially elliptical shape or a substantially continuous linear shape in each phase image obtained by observation with an atomic force microscope of a region in the range of 200 nm×200 nm at arbitrary 5 sites on a sliced surface obtained by slicing a central area in the thickness direction of the layer A along a plane substantially parallel to the layer A, the average of the major axis size of the selected island components is 100 nm or less.

4. The interlayer film according to claim 1, wherein a laminated glass in which the interlayer film is sandwiched between two glasses has a birefringence phase difference of 0 to 140 nm.

5. The interlayer film according to claim 1, wherein
the thermoplastic elastomer is a hydrogenated product of a block copolymer having a polymer block (a) comprising 60 mol % or more of an aromatic vinyl monomer unit and a polymer block (b) comprising 60 mol % or more of a conjugated diene monomer unit,
the polymer block (b) comprises 50 mol % or more in total of an isoprene unit and a butadiene unit as the conjugated diene monomer unit.

6. The interlayer film according to claim 1, wherein a content of the hard segment block in the thermoplastic elastomer is less than 20 mass %.

7. The interlayer film according to claim 1, wherein a peak maximum in tan δ of the layer A as measured by performing a dynamic viscoelasticity test at a frequency of 1,000 Hz in accordance with ASTM D4065-06 appears in the range of −10 to 30° C.

8. The interlayer film according to claim 1, wherein a peak maximum in tan δ of the layer A as measured by performing a dynamic viscoelasticity test at a frequency of 1,000 Hz in accordance with ASTM D4065-06 is 1.3 or more.

9. The interlayer film according to claim 8, wherein the peak maximum in tan δ is 1.5 or more.

10. The interlayer film according to claim 1, wherein the layers B comprises a plasticizer in a content of 50 parts by mass or less with respect to 100 parts by mass of the thermoplastic resin.

11. The interlayer film according to claim 1, wherein the thermoplastic resin in the layers B is polyvinyl acetal.

12. The interlayer film according to claim 1, wherein a laminated glass in which the interlayer film is sandwiched between two glasses with a total thickness of the glasses being 4 mm or less has a sound transmission loss at 4,000 Hz as measured under the conditions of ASTM E 90-09 of 37 dB or more.

13. The interlayer film according to claim 1, wherein the hard segment block is a polystyrene block or a polymethyl methacrylate block.

14. The interlayer film according to claim 1, wherein a heat shielding material is contained in at least one of the layers constituting the interlayer film.

15. The interlayer film according to claim 1, wherein a laminated glass in which the interlayer film for laminated glass is sandwiched between two clear glasses with a total thickness of the clear glasses being 4 mm or less has a visible light transmittance of 70% or more and an average transmittance of infrared light in the wavelength range of 800 to 1,100 nm of 70% or less.

16. The interlayer film according to claim 1, wherein a laminated glass in which the interlayer film for laminated glass is sandwiched between two green glasses with a total thickness of the green glasses being 4 mm or less has a visible light transmittance of 70% or more and an average transmittance of infrared light in the wavelength range of 800 to 1,100 nm of 32% or less.

17. The interlayer film according to claim 14, wherein the heat shielding material is at least one material selected from the group consisting of tin-doped indium oxide, antimony-doped tin oxide, zinc antimonate, metal-doped tungsten oxide, a phthalocyanine compound, aluminum-doped zinc oxide, and lanthanum hexaboride.

18. The interlayer film according to claim 17, wherein the metal-doped tungsten oxide is cesium-doped tungsten oxide.

19. The interlayer film according to claim 14, wherein the heat shielding material is contained in at least one layer selected from the group consisting of the layer A and the layers B.

20. The interlayer film according to claim 1, wherein a UV absorber is contained in at least the layers B.

21. The interlayer film according to claim 20, wherein the UV absorber comprises at least one compound selected from the group consisting of a benzotriazole-based compound, a benzophenone-based compound, a triazine-based compound, a benzoate-based compound, a malonic ester-based compound, and an oxalic anilide-based compound.

22. The interlayer film according to claim 1, wherein a laminated glass in which the interlayer film is sandwiched between two glasses with a total thickness of the glasses being 4 mm or less has a haze of 5 or less.

23. A laminated glass, comprising the interlayer film according to claim 1 disposed between two glasses.

\* \* \* \* \*